United States Patent
Morishige et al.

(10) Patent No.: US 10,601,526 B2
(45) Date of Patent: Mar. 24, 2020

(54) COMMUNICATION SYSTEM, BASE STATION DEVICE AND COMMUNICATION TERMINAL DEVICE

(71) Applicant: Mitsubishi Electric Corporation, Chiyoda-ku (JP)

(72) Inventors: Hideki Morishige, Tokyo (JP); Masayuki Nakazawa, Tokyo (JP); Mitsuru Mochizuki, Tokyo (JP); Yoshitaka Hara, Tokyo (JP); Kuniyuki Suzuki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/417,752

(22) Filed: May 21, 2019

(65) Prior Publication Data
US 2019/0273565 A1    Sep. 5, 2019

Related U.S. Application Data

(63) Continuation of application No. 15/565,359, filed as application No. PCT/JP2016/061190 on Apr. 6, 2016, now Pat. No. 10,348,422.

(30) Foreign Application Priority Data

Apr. 10, 2015  (JP) ................... 2015-081060

(51) Int. Cl.
*H04W 72/04* (2009.01)
*H04B 17/12* (2015.01)
(Continued)

(52) U.S. Cl.
CPC ........... *H04B 17/12* (2015.01); *H01Q 3/2605* (2013.01); *H04B 7/0413* (2013.01);
(Continued)

(58) Field of Classification Search
CPC ... H04W 72/048; H04W 48/08; H04W 88/06; H04L 5/0007; H04B 17/12
See application file for complete search history.

(56) References Cited

U.S. PATENT DOCUMENTS 6,624,784 B1  9/2003 Yamaguchi
2002/0155818 A1  10/2002 Boros
(Continued)

FOREIGN PATENT DOCUMENTS

JP  2003-264418 A  9/2003
JP  2012-182804 A  9/2012
(Continued)

OTHER PUBLICATIONS

International Search Report dated Jun. 28, 2016, in PCT/JP2016/061190 filed Apr. 6, 2016.
(Continued)

*Primary Examiner* — Wei Zhao
(74) *Attorney, Agent, or Firm* — Oblon, McClelland, Maier & Neustadt, L.L.P.

(57) ABSTRACT

A signal is transmitted and received between a base station device and a communication terminal device that are included in a communication system, through a multi-element antenna including a plurality of antenna elements. At least one of the base station device and the communication terminal device includes a PHY processing unit that is a calibration unit that performs calibration of phases and amplitudes of beams formed by the antenna elements when the signal is transmitted and received. The PHY processing unit obtains a correction value for the phases and the amplitudes of the beams in the respective antenna elements so that the phases and the amplitudes of the beams are identical among the antenna elements, and performs the calibration based on the obtained correction value.

8 Claims, 41 Drawing Sheets

(51) Int. Cl.
| | | |
|---|---|---|
| H04B 7/06 | (2006.01) | |
| H04B 7/0413 | (2017.01) | |
| H04B 7/10 | (2017.01) | |
| H01Q 3/26 | (2006.01) | |
| H04W 16/28 | (2009.01) | |
| H04B 7/08 | (2006.01) | |

(52) U.S. Cl.
CPC ......... *H04B 7/0617* (2013.01); *H04B 7/0634* (2013.01); *H04B 7/10* (2013.01); *H04W 16/28* (2013.01); *H04W 72/04* (2013.01); *H04W 72/042* (2013.01); *H04B 7/0842* (2013.01)

(56) References Cited

U.S. PATENT DOCUMENTS

| | | | |
|---|---|---|---|
| 2005/0014474 | A1 | 1/2005 | Jitsukawa et al. |
| 2008/0198793 | A1* | 8/2008 | Lysejko ............... H04W 16/28 370/328 |
| 2009/0196365 | A1 | 8/2009 | Takano |
| 2010/0093282 | A1* | 4/2010 | Martikkala ............ H04B 17/14 455/63.4 |
| 2010/0150013 | A1 | 6/2010 | Hara et al. |
| 2010/0158331 | A1 | 6/2010 | Jacobs |
| 2013/0077708 | A1 | 3/2013 | Sorrells et al. |
| 2013/0170435 | A1* | 7/2013 | Dinan .................... H04L 45/50 370/328 |
| 2016/0142124 | A1 | 5/2016 | O'Keeffe |

FOREIGN PATENT DOCUMENTS

| | | |
|---|---|---|
| JP | 2014-57328 | 3/2014 |
| WO | WO 03/049322 A1 | 6/2003 |

OTHER PUBLICATIONS

3GPP TS 36.300, V12.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", (Release 12) (Dec. 2014), 251 pages.
3GPP TSG-SA1 , #42, S1-083461, "LS on HNB/HeNB Open Access Mode", 3GPP SA WG1, (Oct. 2008), 2 pages.
3GPP TSG-RAN WG 2, meeting #62, R2-082899, "LS on CSG cell identification", RAN2, (May 2008), 2 pages.
3GPP TR 36.814, V9.0.0, "3rd Generation Partnership Project; Technical Specification Group Radio Access Network; Evolved Universal Terrestrial Radio Access (E-UTRA); Further advancements for E-UTRA physical layer aspects", (Release 9), (Mar. 2010), 104 pages.
3GPP TR 36.912, V10.0.0, "3rd Generation Partnership Project; Technical Specification Group Radio Access Network; Feasibility study for Further Advancements for E-UTRA (LTE-Advanced)", (Release 10), (Mar. 2011), 252 pages.
3GPP TR 36.819, V11.2.0, "3rd Generation Partnership Project; Technical Specification Group Radio Access Network; Coordinated multi-point operation for LTE physical layer aspects", (Release 11), (Sep. 2013), 70 pages.
3GPP TS 36.141, V12.6.0, "3rd Generation Partnership Project; Technical Specification Group Radio Access Network; Evolved Universal Terrestrial Radio Access (E-UTRA); Base Station (BS) conformance testing", (Release 12), (Dec. 2014), 266 pages.
International Preliminary Report on Patentability and Written Opinion dated Oct. 19, 2017 in PCT/JP2016/061190 (with English translation).
GPP TR 36.842, V12.0.0, "3rd Generation Partnership Project; Technical Specification Group Radio Access Network; Study on Small Cell enhancements for E-UTRA and E-UTRAN; Higher layer aspects", (Release 12), (Dec. 2013), 71 pages.
3GPP TS 36.304, V12.4.0, "3rd Generation Partnership Project; Technical Specification Group Radio Access Network; Evolved Universal Terrestrial Radio Access (E-UTRA); User Equipment (UE) procedures in idle mode", (Release 12), (Mar. 2015), 38 pages.
Popovski et al., METIS, Document No. ICT-317669-METIS/D1.1, Version 1, "Mobile and wireless communications Enablers for the Twenty-twenty Information Society (METIS)", "Scenarios, requirements and KPIs for 5G mobile and wireless system", (Apr. 2013), 84 pages.
Mano et al., "A Method for Measuring Amplitude and Phase of Each Radiating Element of a Phased Array Antenna", The Transactions of the Institute of Electronics and Communication Engineers of Japan, vol. J65-B, No. 5, (May 1982), pp. 555-560.
Hara et al., "Antenna Calibration using Frequency Selection in OFDMA/TDD Systems", The Institute of Electronics, Information and Communication Engineers, IEICE Technical Report RCS2007-143, (Jan. 2008), pp. 55-60.
Nouda et al., "An Antenna Array Auto-Calibration method with Bidirectional Channel Measurement for TDD Systems", The Institute of Electronics, Information and Communication Engineers, IEICE Technical Report RCS2008, (May 2008), pp. 69-74.
Hou et al., "Experimental Study of Advanced MU-MIMO Scheme with Antenna Calibration for the Evolving LTE TDD System", IEEE 23$^{rd}$ International Symposium on Personal, Indoor and Mobile Radio Communcation—(PIMRC), (2012), pp. 2443-2448.
Extended Search Report dated Oct. 25, 2018 in European Patent Application No. 16776541.1.
Office Action dated Jan. 7, 2020 in Japanese Application No. 2017-511002 (w/English translation).

* cited by examiner

F I G . 1
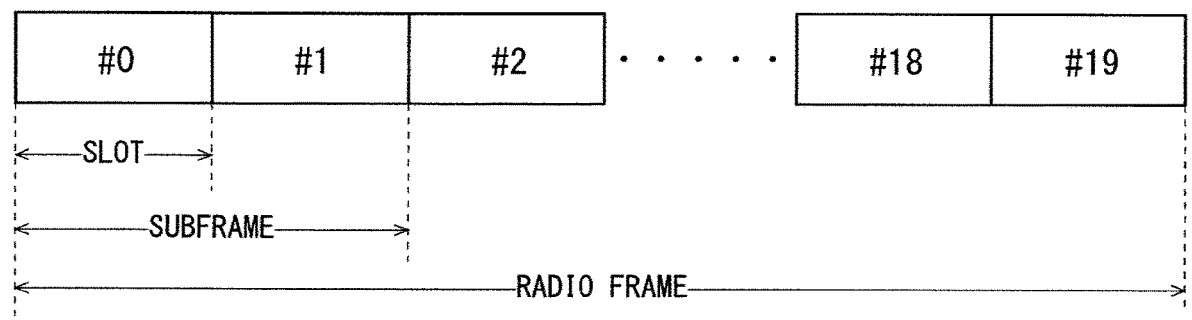

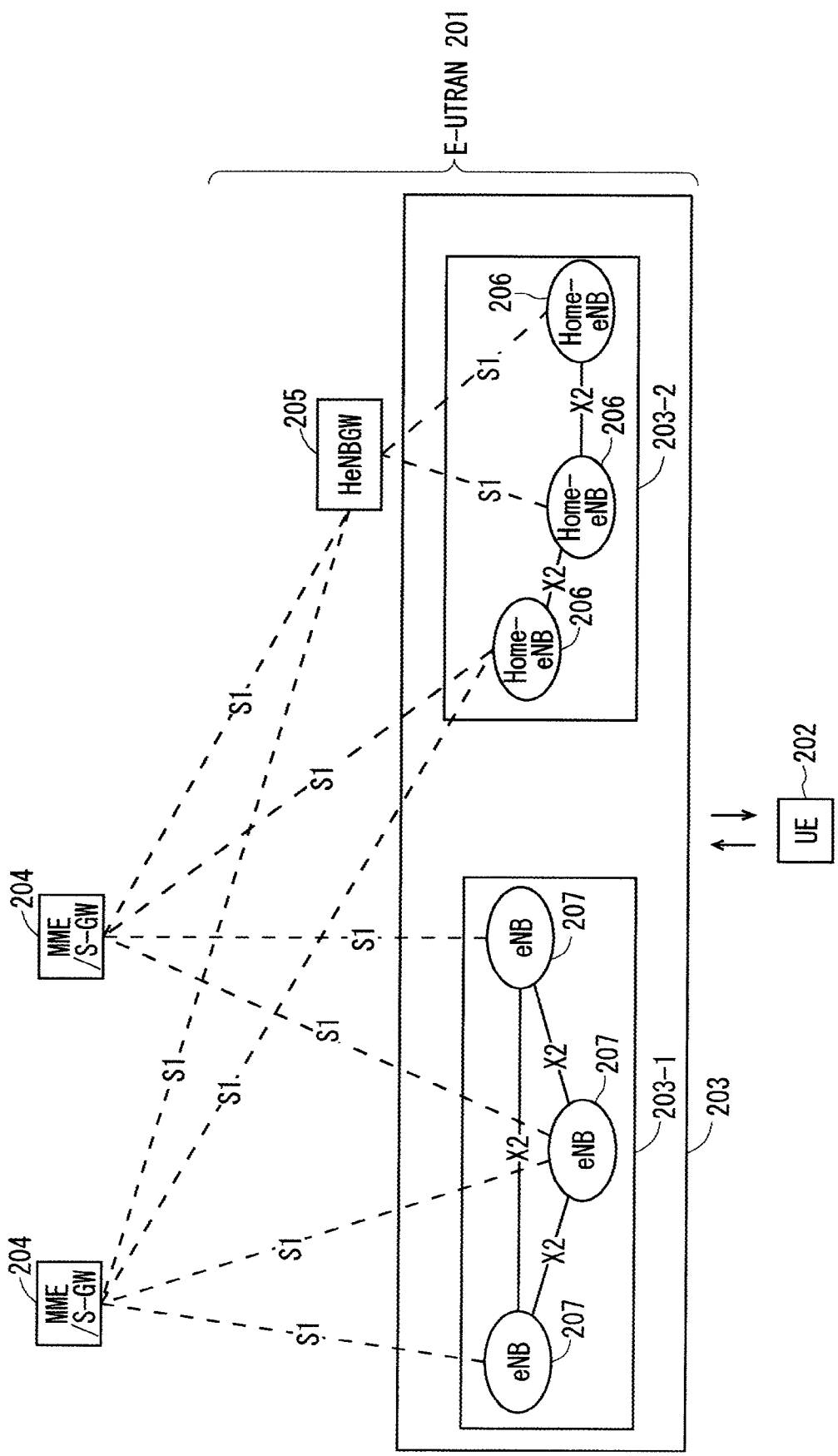

F I G. 5
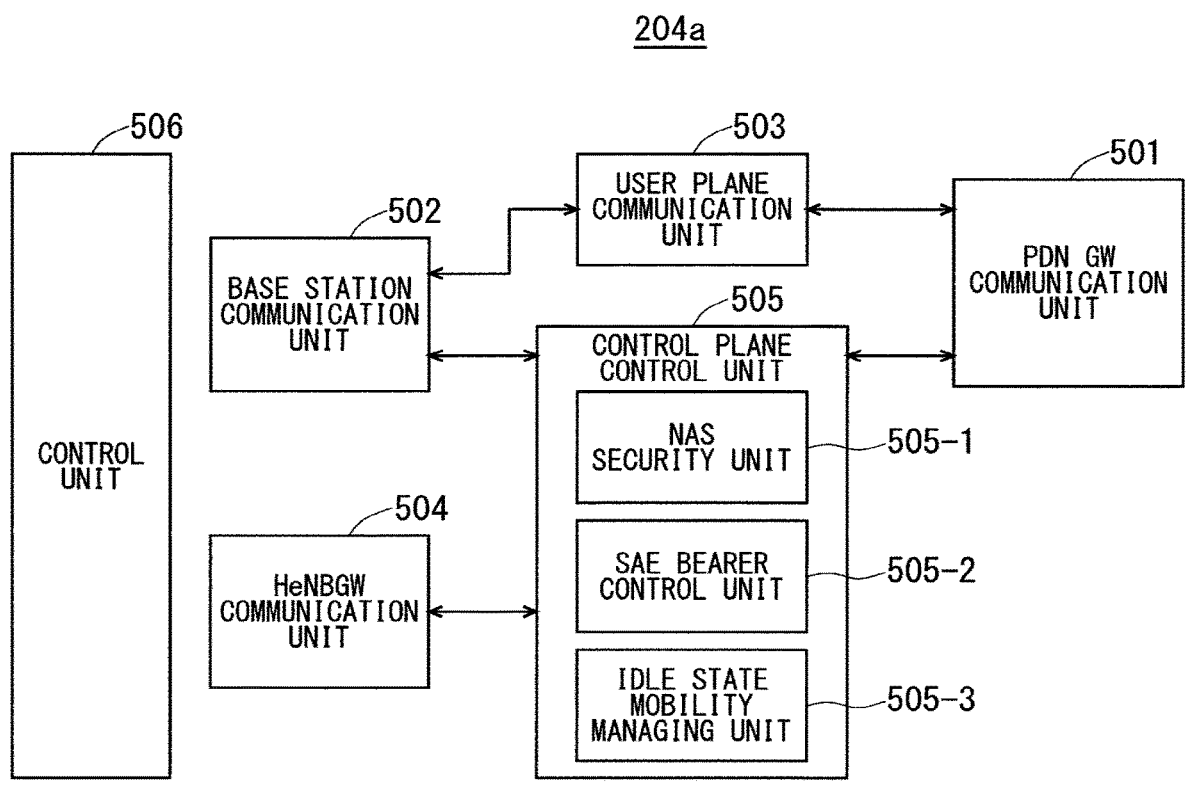

F I G. 1 2
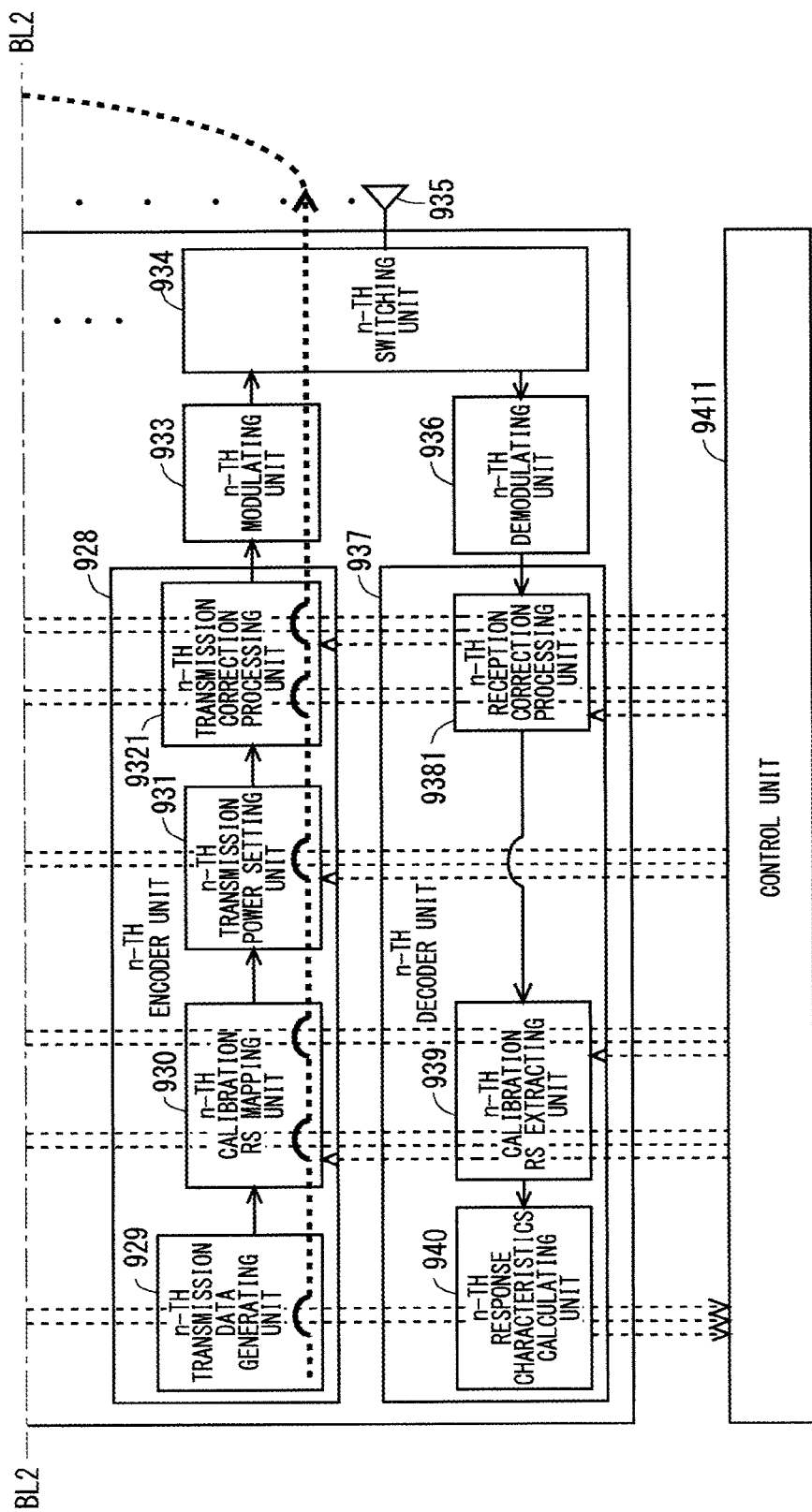

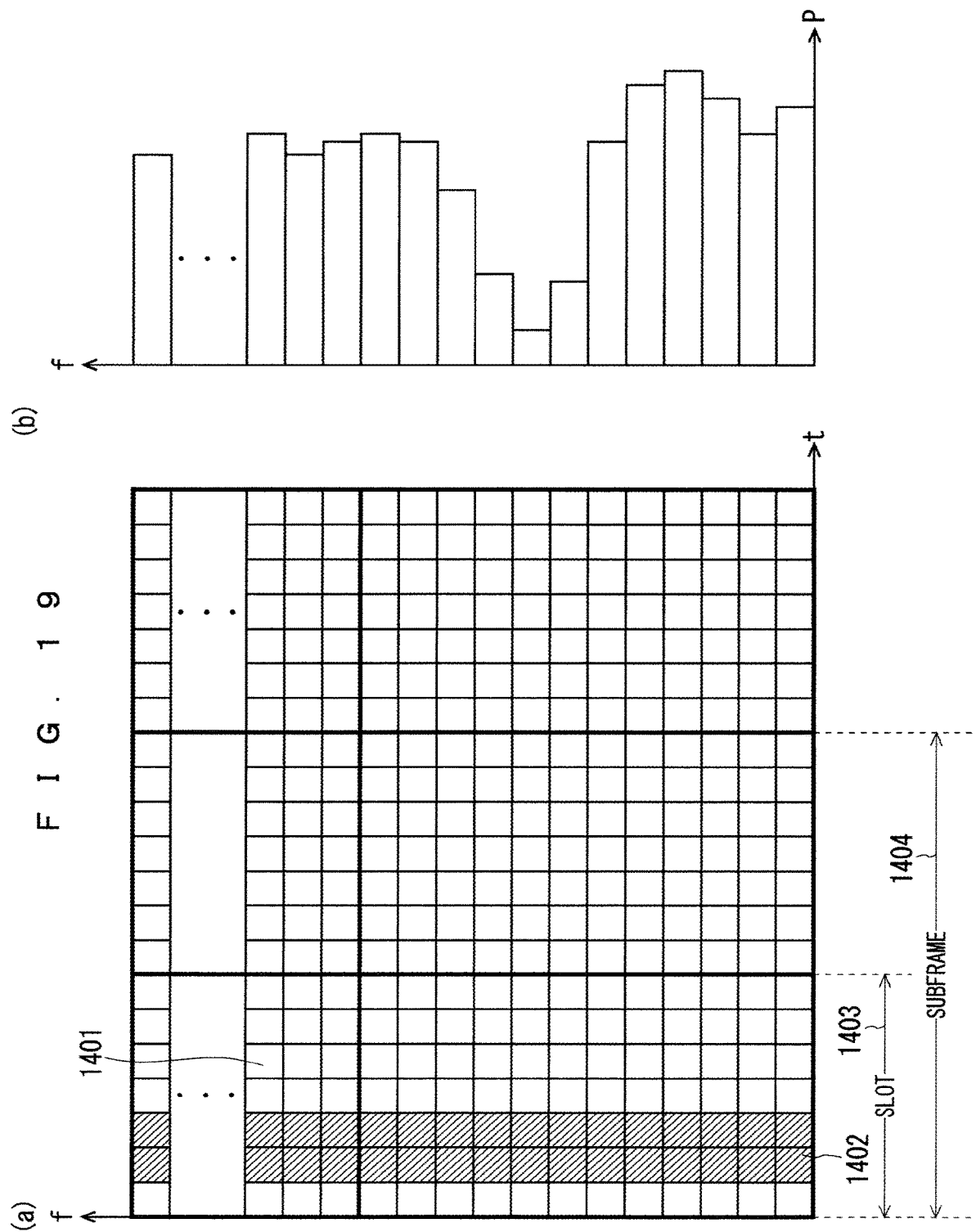

F I G . 2 0
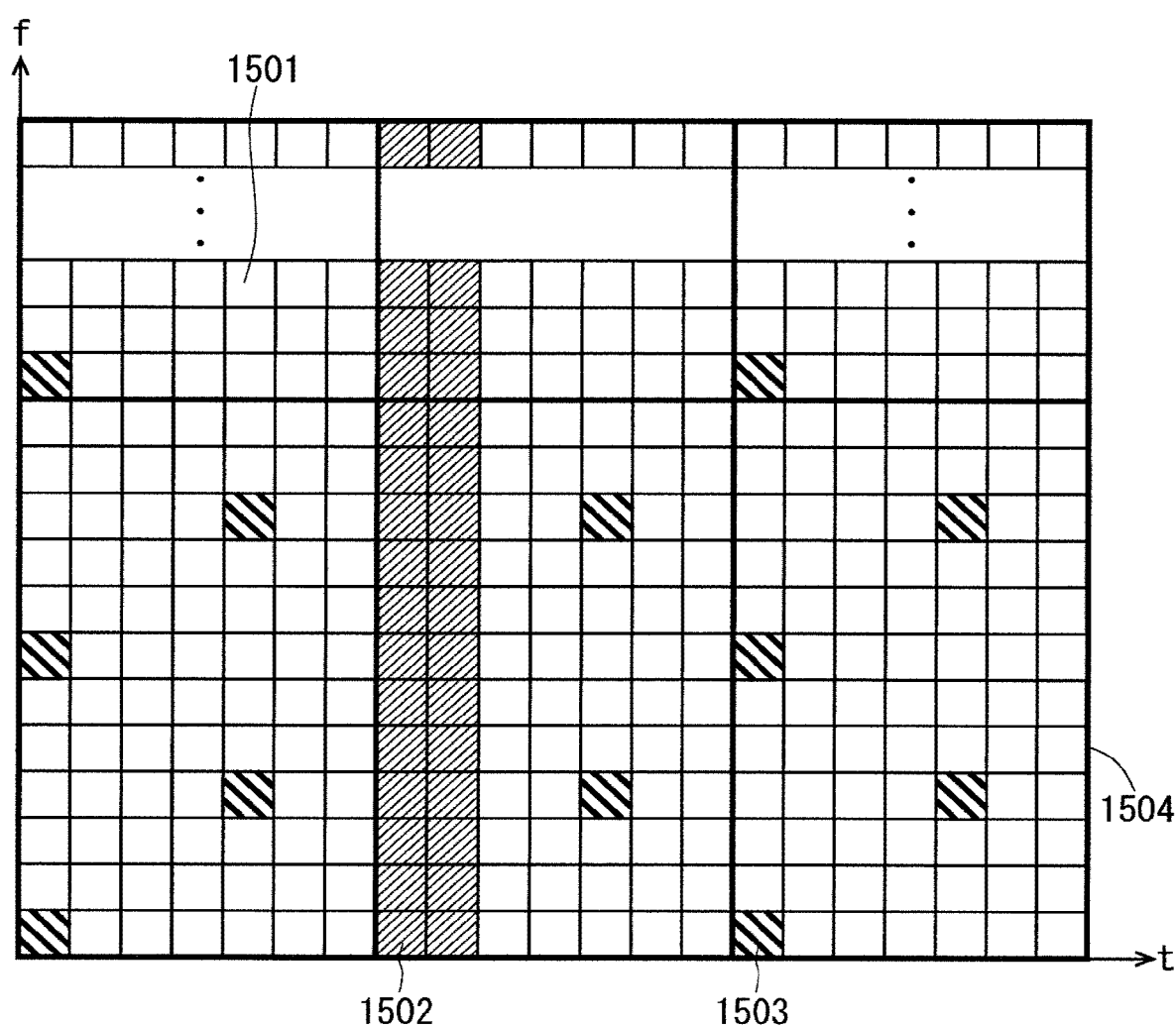

F I G . 2 4
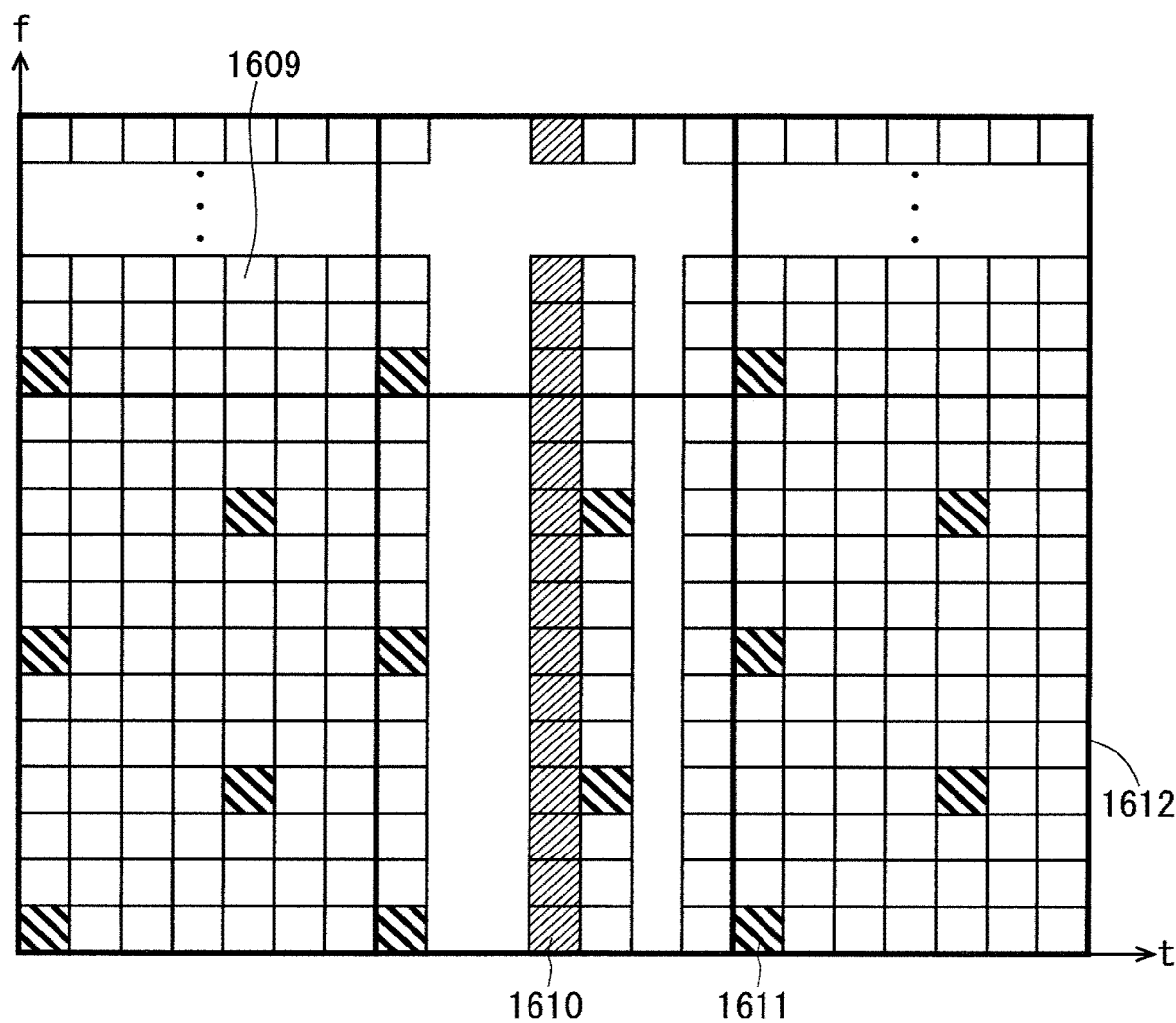

F I G . 2 7
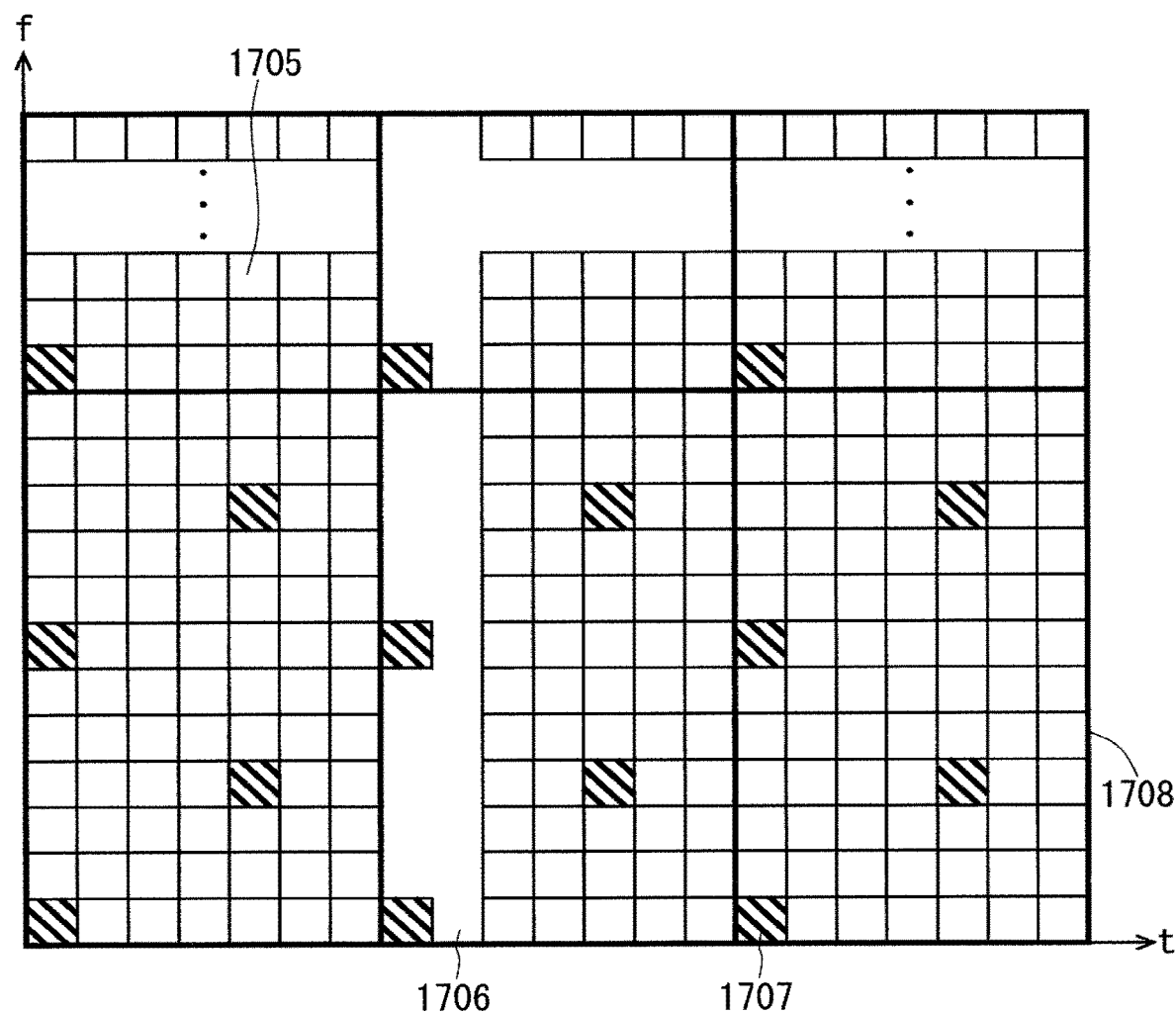

F I G. 29
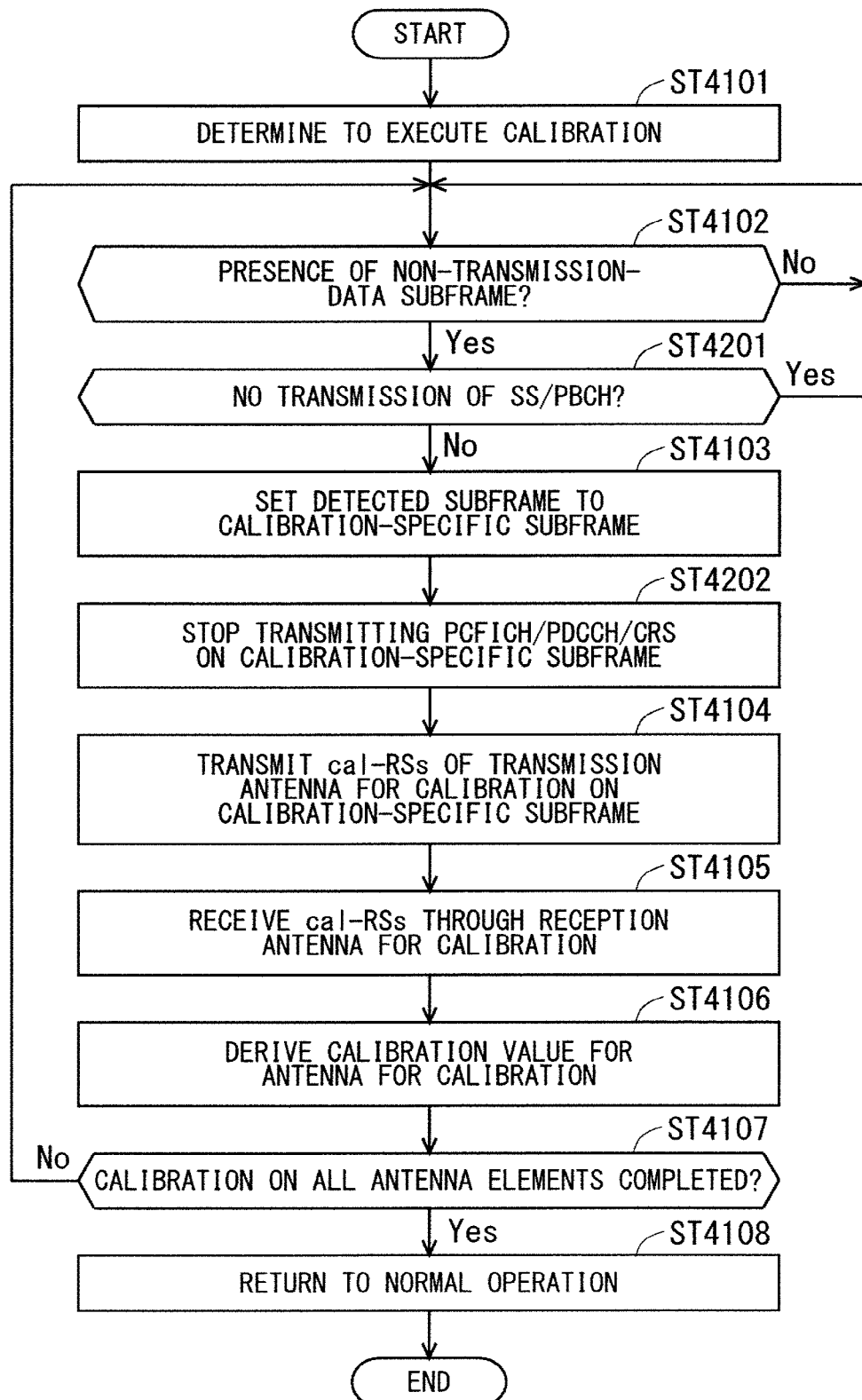

F I G . 3 2
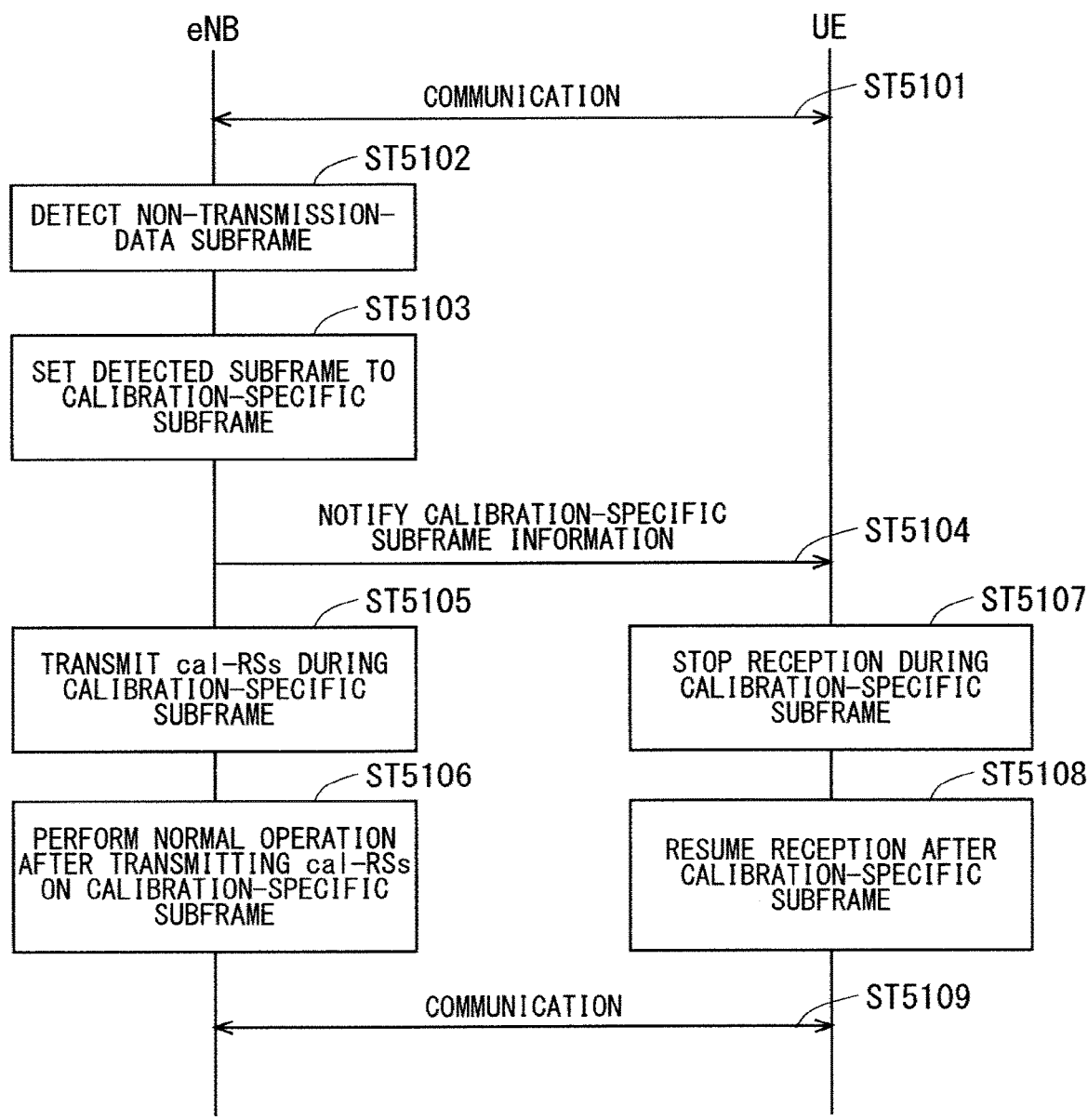

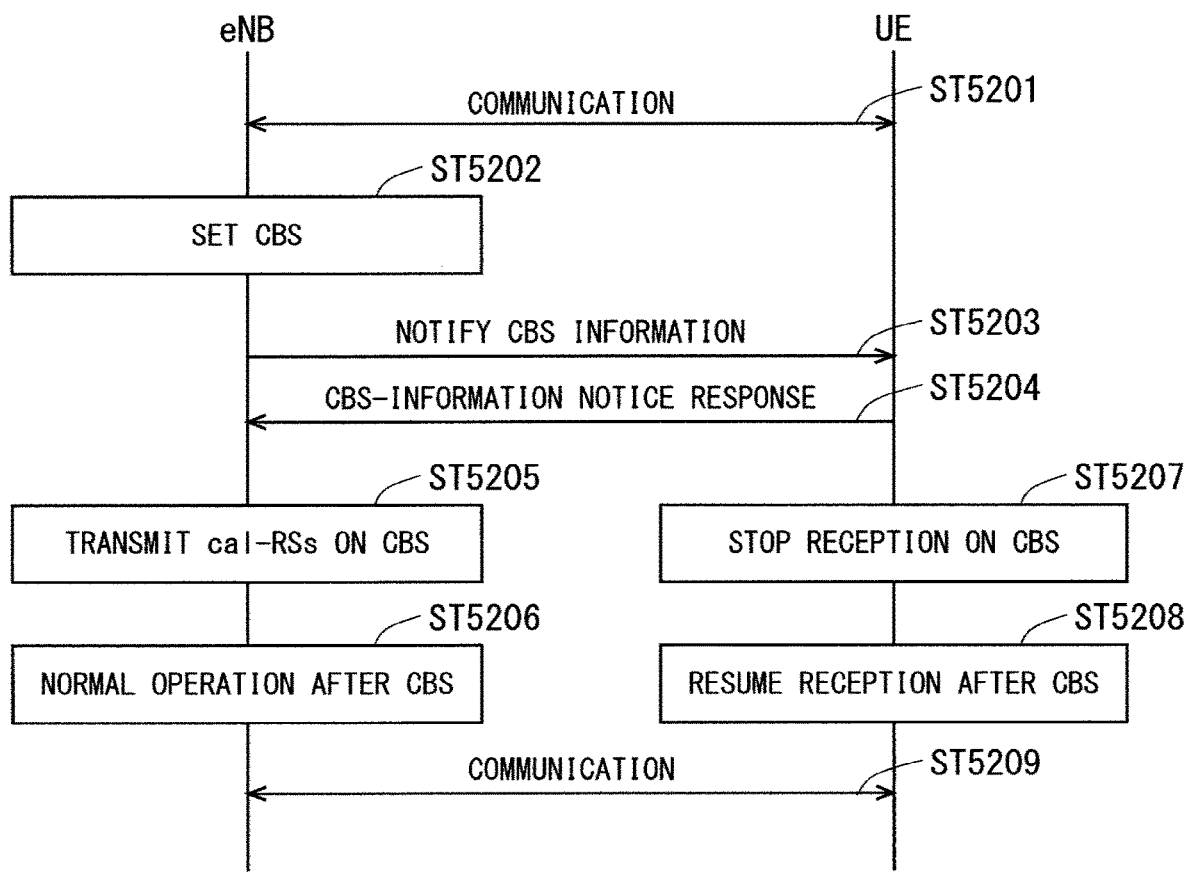

COMMUNICATION SYSTEM, BASE STATION DEVICE AND COMMUNICATION TERMINAL DEVICE

CROSS REFERENCE TO RELATED APPLICATIONS

This application is a continuation of and claims the benefit of priority under 35 U.S.C. § 120 from U.S. application Ser. No. 15/565,359 filed Oct. 9, 2017, the entire contents of which is incorporated herein by reference. U.S. application Ser. No. 15/565,359 is a National Stage of PCT/JP2016/061190 filed Apr. 6, 2016, which claims the benefit of priority under 35 U.S.C. § 119 from Japanese Application No. 2015-081060 filed Apr. 10, 2015.

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 13). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a UE-specific reference signal, a positioning reference signal (PRS), and a channel state information reference signal (CST-RS). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UNITS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

The individual modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both of the open access mode and the closed access mode.

In 3GPP, among all physical cell identities (PCIs) is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to communication terminals being served thereby. Being served by a base station means taking the base station as a serving cell.

Non-Patent Document 3 discloses the basic operation of a communication terminal using PCI split. The communication terminal that does not have the PCI split information needs to perform cell search using all PCIs, for example, using all 504 codes. On the other hand, the communication terminal that has the PCI split information is capable of performing cell search using the PCI split information.

Further, 3GPP is pursuing specifications standard of long term evolution advanced (LTE-A) as Release 10 (see Non-Patent Documents 4 and 5). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 6.

The traffic flow of a mobile network is on the rise, and the communication rate is also increasing. It is expected that the communication rate and the traffic flow will be further increased when the operations of the LTE and the LTE-A are fully initiated.

Widespread use of smartphones and tablet terminals explosively increases traffic in cellular radio communications, causing a fear of insufficient radio resources all over the world.

To deal with the problem of increased traffic, 3GPP is developing specifications of Release 12. In the specifications of Release 12, the use of small eNBs is studied to satisfy a tremendous volume of traffic in the future. In an example technique under study, a large number of small eNBs are installed to configure a large number of small cells, thus increasing spectral efficiency for increased communication capacity.

In Release 12, dual connectivity is discussed as the technique of connecting a communication terminal to both a macro cell and a small cell when the macro cell and the small cell overlap each other (see Non-Patent Document 8).

For increasingly sophisticated mobile communications, the fifth generation (hereinafter also referred to as "5G") radio access system is studied, whose service is aimed to be launched in 2020 and afterward. For example, in the Europe, an organization named METIS summarizes the requirements for 5G (see Non-Patent Document 9).

Among the requirements in the 5G radio access system are a system capacity 1000 times as high as, a data transmission rate 100 times as high as, a data latency one tenth ($1/10$) as low as, and simultaneously connected communication terminals 100 times as many as those in the LTE system, to further reduce the power consumption and device cost.

In order to satisfy such requirements, techniques for enabling spatial multiplexing such as multiple-input multiple-output (MIMO) and beamforming using multi-element antennas are being studied to increase the data transmission capacity using frequencies over a wide frequency range as well as to increase the data transmission rate through increase in spectral efficiency.

In the MIMO and the beamforming using multi-element antennas, phases and outputs of the respective antenna elements included in a multi-element antenna are set and adjusted. Thus, the set accuracy of the phases and the outputs of the respective antenna elements influences the performance. Here, the multi-element antenna is calibrated to increase the set accuracy of the phases and the outputs of the respective antenna elements.

The rotating element electric field vector (REV) method (see Non-Patent Document 10) and the relative calibration (see Non-Patent Document 11) are being studied as methods for calibrating the multi-element antenna. Furthermore, the self-calibration method (see Non-Patent Document 12) and the Over-The-Air (OTA) method (see Non-Patent Document 13) are being studied as calibration execution methods.

PRIOR-ART DOCUMENTS

Non-Patent Documents

Non-Patent Document 1: 3GPP TS36.300 V12.4.0
Non-Patent Document 2: 3GPP S1-083461
Non-Patent Document 3: 3GPP R2-082899
Non-Patent Document 4: 3GPP TR 36.814 V9.0.0
Non-Patent Document 5: 3GPP TR 36.912 V10.0.0
Non-Patent Document 6: 3GPP TR 36.819 V11.2.0
Non-Patent Document 7: 3GPP TS 36.141 V12.6.0
Non-Patent Document 8: 3GPP TR36.842 V12.0.0
Non-Patent Document 9: "Scenarios, requirements and KPIs for 5G mobile and wireless system", [online], Apr. 30, 2013, ICT-317669-METIS/D1.1, [Searched on Apr. 2, 2015], Internet <https://www.metis2020.com/documents/deliverables/>
Non-Patent Document 10: Seiji MANO, Takashi KATAGI, "A Method for Measuring Amplitude and Phase of Each Radiating Element of a Phased Array Antenna, Rotating Element Electric Field Vector Method", The Transactions of the Institute of Electronics and Communication Engineers of Japan, B, Vol. J65-B, No. 5, pp. 555-560, May 1982

Non-Patent Document 11: Yoshitaka HARA, Yasuhiro YANO, Hiroshi KUBO, "Antenna Calibration Using Frequency Selection in OFDMA/TDD Systems", IEICE Technical Report RCS2007-143, January 2008

Non-Patent Document 12: Yasunori NOUDA, Yoshitaka HARA, Yasuhiro YANO, Hiroshi KUBO, "An Antenna Array Auto-Calibration Method with Bidirectional Channel Measurement for TDD Systems", IEICE Technical Report RCS2008-12, May 2008

Non-Patent Document 13: X. Hou, et al, "Experimental Study of Advanced MU-MIMO Scheme with Antenna Calibration for the Evolving LTE TDD System", IEEE 23rd PIMRC, 2012

SUMMARY

Problems to be Solved by the Invention

In the MIMO and the beamforming using multi-element antennas, the throughput of the multi-element antennas needs to be improved. However, the following problems lie in improving the throughput of the multi-element antennas.

The first point will be described below. Without matching phase and amplitude differences among the antenna elements, problems occur which include: (a) uncontrollable beam directivity with which beams cannot be directed in a desired direction; (b) decrease in gain expressed by, for example, equivalent isotropic radiated power (abbreviated as EIRP); and (c) increase in side lobe power which increases interference with other users. Particularly, accuracy is required in MIMO transmission for controlling null points.

The second point will be described below. It is necessary to eliminate temperature and temporal variations in phase and amplitude differences among the antenna elements. However, since broadband communication increases the frequency bandwidth, an amplifier and a filter, etc. cause a problem of significantly influencing amounts of the temperature and temporal variations.

Unlike the conventional configurations in which an amplifier and a filter are placed in an indoor room with temperature control and connected to an antenna outdoor through cables for extension, outdoor installation of an amplifier, for example, an active phased array antenna (APAA) is being studied. Since the temperature variations increase in such a case, the calibration in operation is important.

The object of the present invention is to provide a communication system capable of calibration with higher accuracy to match phase and amplitude differences in beam among a plurality of antenna elements included in a multi-element antenna and capable of communication with a relatively high throughput.

Means to Solve the Problems

The communication system according to the present invention is a communication system including a base station device and a communication terminal device between which a signal is transmitted and received through a multi-element antenna including a plurality of antenna elements, wherein at least one of the base station device and the communication terminal device includes a calibration unit that performs calibration of phases and amplitudes of beams formed by the antenna elements when the signal is transmitted and received, and the calibration unit obtains a correction value for the phases and the amplitudes of the beams in the respective antenna elements so that the phases and the amplitudes of the beams are identical among the antenna elements, and performs the calibration based on the obtained correction value.

Effects of the Invention

The communication system according to the present invention is a communication system including a base station device and a communication terminal device. A signal is transmitted and received between the base station device and the communication terminal device through a multi-element antenna including a plurality of antenna elements. At least one of the base station device and the communication terminal device includes a calibration unit. The calibration unit performs calibration of phases and amplitudes of beams formed by the antenna elements when the signal is transmitted and received. The calibration unit obtains a correction value for the phases and the amplitudes of the beams in the respective antenna elements so that the phases and the amplitudes of the beams are identical among the antenna elements, and performs the calibration based on the obtained correction value. Since the calibration can be performed with higher accuracy, it is possible to match phase and amplitude differences in beam among a plurality of antenna elements included in a multi-element antenna. Thus, a communication system capable of communication with a relatively high throughput can be implemented.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 2 is a block diagram showing the overall configuration of an LTE communication system 200 under discussion of 3GPP.

FIG. 5 is a block diagram showing the configuration of an MME according to the present invention.

FIG. 12 is a block diagram illustrating the example configuration of the PHY processing unit 901, the control unit 9411, and the n antenna elements 909, 922, . . . , and 935.

FIG. 19 illustrates examples of mapping and the reception power at each frequency, in transmission data of the first antenna element.

FIG. 20 illustrates another example mapping in the transmission data of the first antenna element.

FIG. 24 further illustrates another example mapping in the transmission data of the third antenna element.

FIG. 27 further illustrates another example mapping in the transmission data of the second antenna element to the n-th antenna element.

FIG. 29 is a flowchart indicating an example procedure on calibration processes in a communication system according to a first modification of the fourth embodiment.

FIG. 32 illustrates an example sequence on calibration in a communication system according to a fifth embodiment.

FIG. 33 illustrates another example sequence on calibration in the communication system according to the fifth embodiment.

DESCRIPTION OF EMBODIMENTS

First Embodiment

Figure 3:
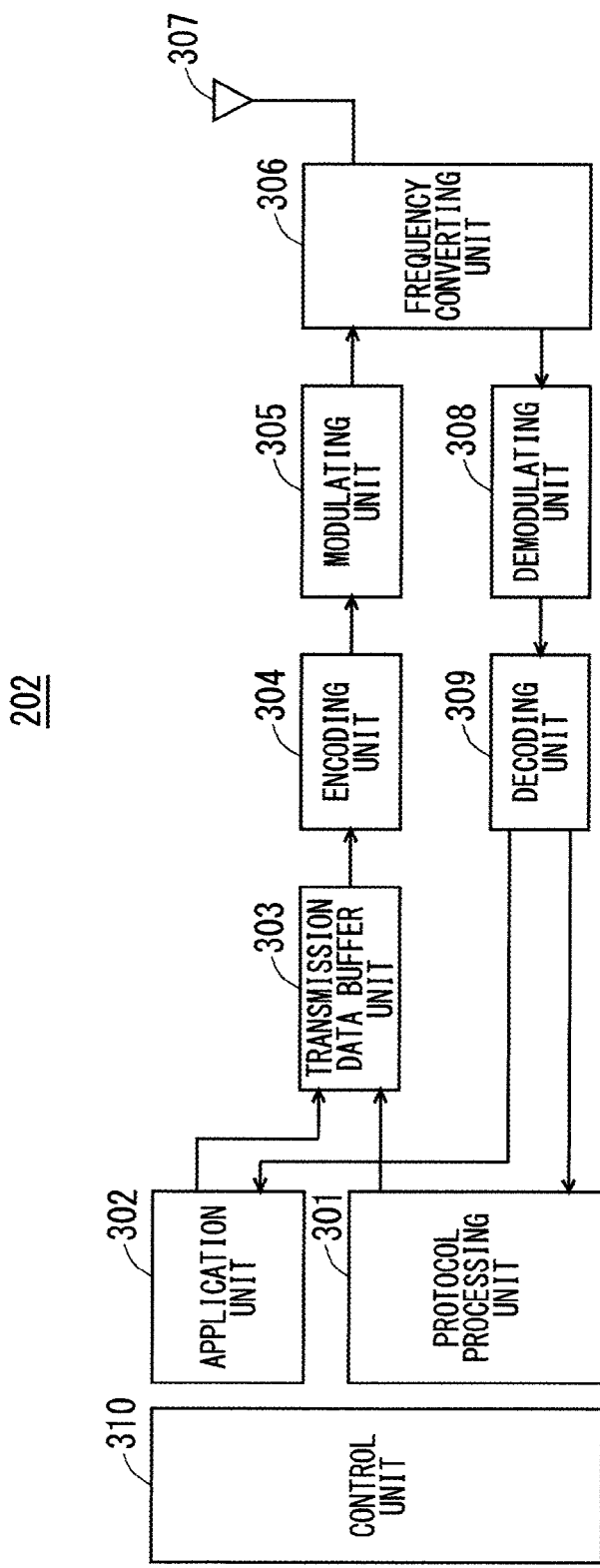
FIG. 3 is a block diagram showing the configuration of a user equipment 202 shown in FIG. 2, which is a communication terminal according to the present invention.

FIG. 2 is a block diagram showing an overall configuration of an LTE communication system 200, which is under discussion of 3GPP. FIG. 2 will be described. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN) Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MIME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, 3GPP is studying the configuration below. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In the case where one base station device 203 configures a plurality of cells, every cell is configured so as to communicate with the user equipment 202.

FIG. 3 is a block diagram showing the configuration of the user equipment 202 of FIG. 2 that is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
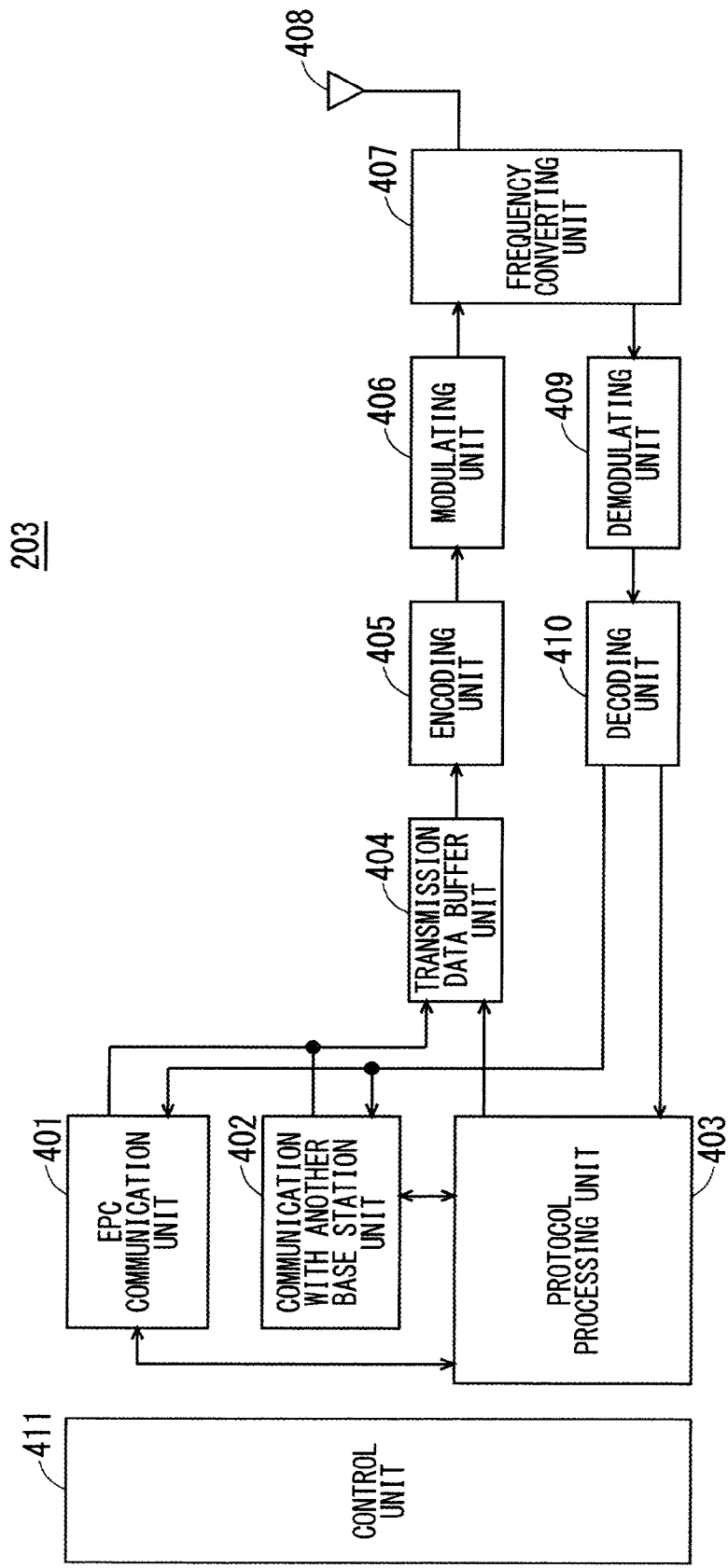
FIG. 4 is a block diagram showing the configuration of a base station 203 shown in FIG. 2, which is a base station according to the present invention.

FIG. 4 is a block diagram showing the configuration of the base station 203 of FIG. 2 that is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

FIG. 5 is a block diagram showing the configuration of the MME according to the present invention. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

Figure 6:
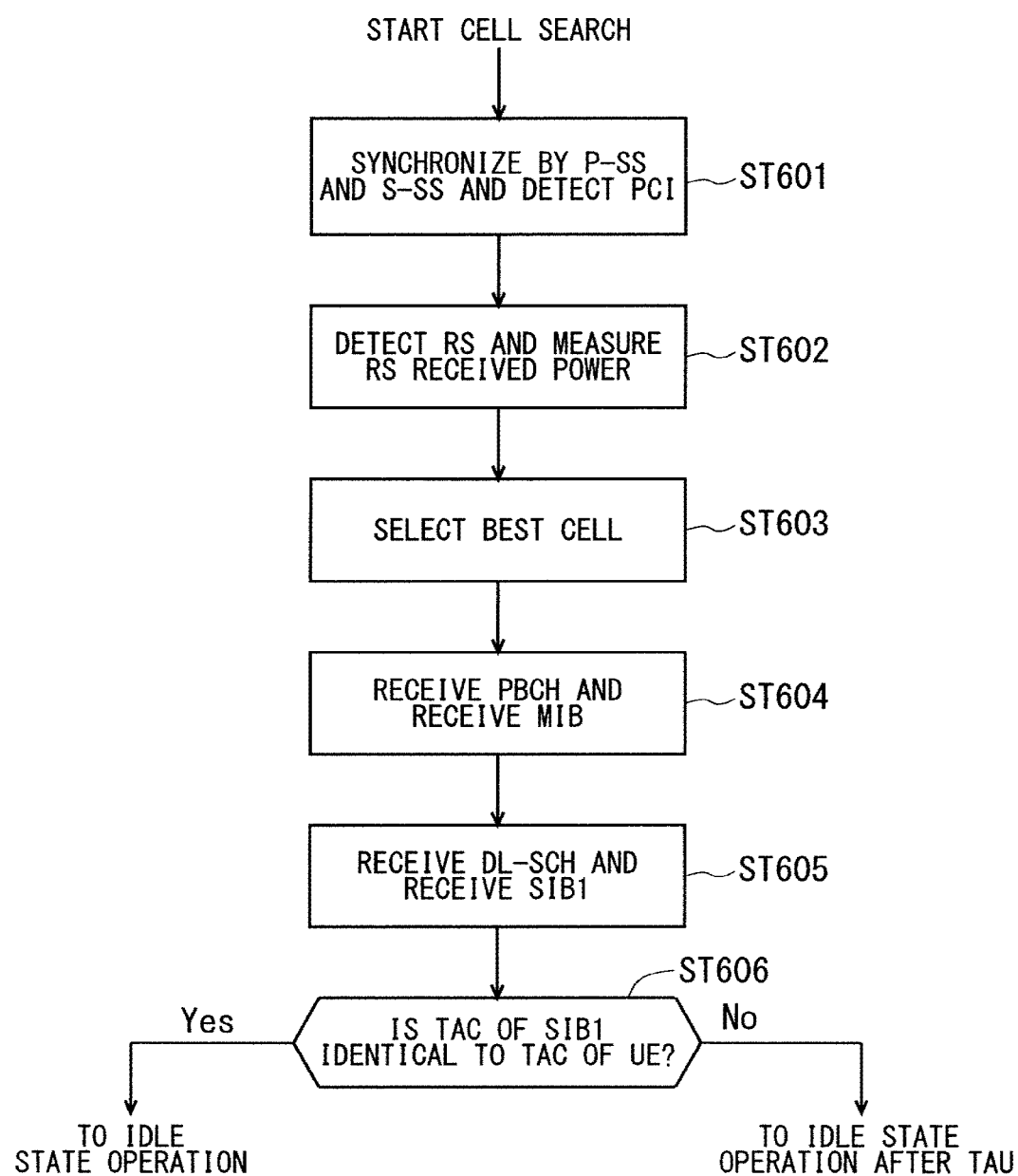
FIG. 6 is a flowchart showing an outline from a cell search to an idle state operation performed by a communication terminal (UE) in the LTE communication system.

An example of a cell search method in a mobile communication system will be described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 7:
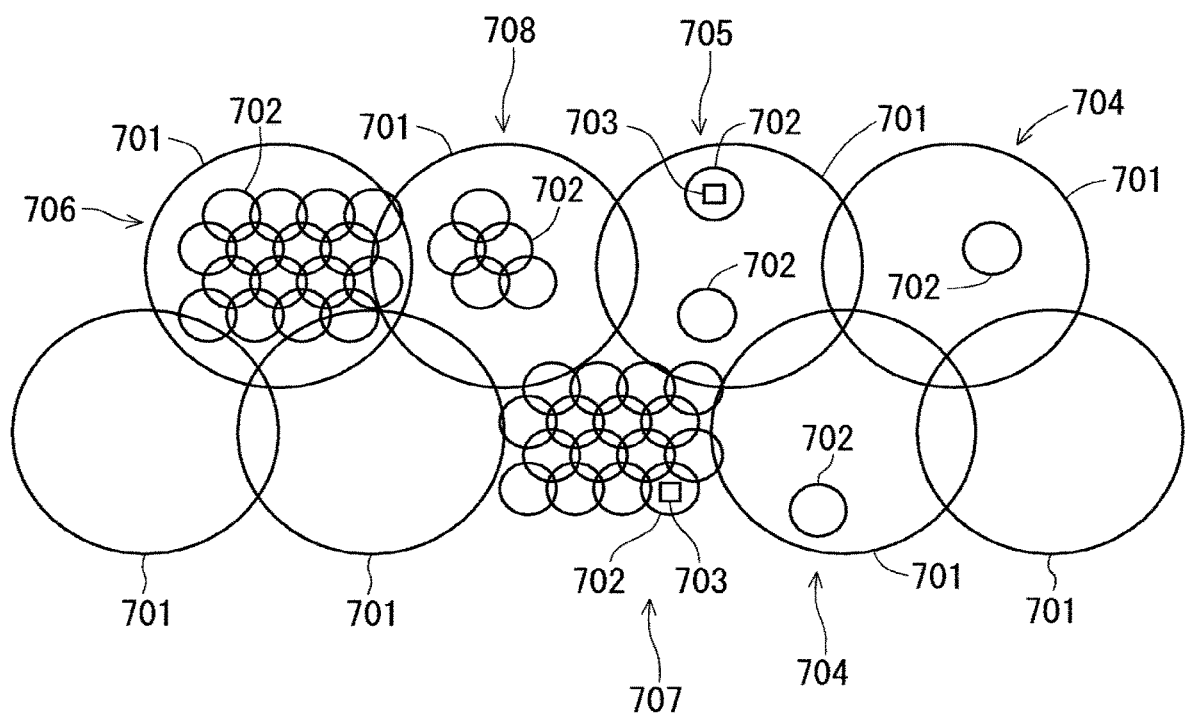
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB may not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

The following problems (1) and (2) lie in improving the throughput of the multi-element antennas.

(1) Without matching phase and amplitude differences among the antenna elements, problems occur which include: (a) uncontrollable beam directivity with which beams cannot be directed in a desired direction; (b) decrease in gain expressed by, for example, equivalent isotropic radiated power (abbreviated as EIRP); and (c) increase in side lobe power which increases interference with other users.

(2) It is necessary to eliminate temperature and temporal variations in phase and amplitude differences among the antenna elements. However, since broadband communication increases the frequency bandwidth, an amplifier and a filter, etc. cause a problem of significantly influencing amounts of the temperature and temporal variations.

The first embodiment will disclose a method for calibration with higher accuracy to match phase and amplitude differences in beam among a plurality of antenna elements included in a multi-element antenna.

Figure 8:
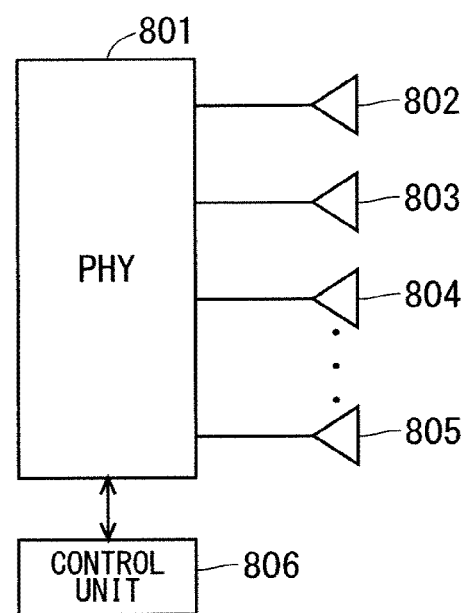
FIG. 8 is a block diagram illustrating a configuration of a communication apparatus in a communication system according to a first embodiment of the present invention.

FIG. 8 is a block diagram illustrating a configuration of a communication apparatus in a communication system according to the first embodiment of the present invention. The communication apparatus may be a base station or a user equipment. In other words, the communication system according to the first embodiment includes a base station and a user equipment, and at least one of the base station and the user equipment is embodied by the communication apparatus in FIG. 8.

The communication apparatus includes a physical layer (PHY) processing unit 801, a plurality of antenna elements 802 to 805, and a control unit 806. The plurality of antenna elements 802 to 805 are n antenna elements 802 to 805 (n is a natural number), specifically, a first antenna element 802, a second antenna element 803, a third antenna element 804, . . . , and an n-th antenna element 805. The first antenna element 802 to the n-th antenna element 805 are connected to the PHY processing unit 801. The first antenna element 802 to the n-th antenna element 805 form a multi-element antenna.

The PHY processing unit 801 performs, according to an instruction given from the control unit 806, respective processes of generating a transmission signal, mapping, extracting a reception signal, and demapping. The control unit 806 controls timing on transmission and reception, allocation of time resources, frequency resources, and code resources, transmission power, and a phase value and an amplitude value for the antenna elements.

The PHY processing unit 801 corresponds to a calibration unit that calibrates phases and amplitudes of beams formed by the antenna elements 802 to 805, upon transmission and reception of a signal. The PHY processing unit 801 obtains a correction value for the phases and the amplitudes of the beams in the respective antenna elements 802 to 805 so that the phases and the amplitudes of the beams are identical among the antenna elements 802 to 805, and calibrates the phases and the amplitudes based on the obtained correction value.

Next, an example procedure of the control processes in the communication apparatus will be described with the signal flow. The control unit 806 determines whether calibration is necessary. When determining that calibration is necessary, the control unit 806 determines timing, a frequency, and the transmission power for the calibration, and notifies the PHY processing unit 801 of these.

Specifically, the PHY processing unit 801 performs the calibration as follows. The PHY processing unit 801 maps calibration RSs (may be hereinafter referred to as "cal-RSs"), sets a transmission power value, and transmits a signal with predetermined timing using a predetermined antenna element according to an instruction given from the control unit 806.

Furthermore, the PHY processing unit 801 causes a predetermined antenna element to receive the transmitted signal, according to an instruction given from the control unit 806. The PHY processing unit 801 demaps calibration RSs from the received signal, calculates propagation properties from the value obtained from the demapping, and notifies the control unit 806 of the propagation properties.

The control unit 806 analyzes relative values of the antenna elements 802 to 805 or differences with an ideal value of the propagation properties measured in an anechoic chamber in advance, for example, before shipment, calculates a correction value for the phases and the amplitudes of the antenna elements 802 to 805 from the analyzed values or the difference values, and notifies the PHY processing unit 801 of the correction value.

The PHY processing unit 801 sets the correction value given from the control unit 806 so that an offset is added to the subsequent signals.

Whether the control unit 806 needs to perform calibration may be determined through periodically (on a regular basis) executing the processes by the control unit 806 and the PHY processing unit 801 as described above, based on a difference between a currently set value and a result of the correction value that is calculated by the control unit 806 for the phases and the amplitudes of the antenna elements 802 to 805.

When the communication apparatus is a base station, the communication apparatus may start calibration according to an instruction from a maintenance management apparatus in high layer. Accordingly, the maintenance management apparatus in high layer, for example, prevents a situation where a plurality of base stations overlapping in cell coverage thereof simultaneously perform calibration (may be hereinafter referred to as a "calibration situation"), and can avoid occurrence of a non-service area.

Similarly, when a base station that is a communication apparatus receives notification indicating whether the surrounding base stations are in a calibration situation from themselves and the surrounding base stations are not yet in the calibration situation, the own base station may start calibration. Conversely, the base station may notify the surrounding base stations of whether the own base station is in a calibration situation.

Alternatively, when the base station is provided with a temperature sensor and the temperature variations become larger than or equal to a predetermined value, the base station may start calibration. Transmission power amplifiers, phasers, and filters that separate and extract a required frequency have temperature characteristics, and thus, the transmission power amplifiers, the phasers, and the filters are known for having respective variations. Inaccuracy of the beam control subject to the variations in the transmission power amplifiers, the phasers, and the filters can be corrected by causing the base station to start calibration when the temperature variations become larger than or equal to a predetermined value as described above.

Alternatively, the communication apparatus may start calibration according to a request from a corresponding apparatus. When the communication apparatus is a base station and the corresponding apparatus is a base station or a repeater, the corresponding apparatus knows or can learn a carrier to noise ratio (abbreviated as CNR) or a signal to noise ratio (abbreviated as SNR) for use in a normal operation with appropriate directivity. Thus, the corresponding apparatus may instruct the communication apparatus to start calibration, for example, when the CNR or the SNR is smaller than or equal to a predetermined value due to the temperature and temporal variations, etc.

When a user equipment for calibration is provided, more specifically, when a user equipment is always placed at a specific position or when a user equipment moved to a specific position is determined as a user equipment for calibration, the user equipment may instruct a communication apparatus to start calibration as described above.

Alternatively, a user equipment transmits, to an evolved packet core (EPC), quality information such as received power and the SNR as well as Global Positioning System (GPS) position information collected using, for example, a minimum drive test (MDT) function. Then, if the EPC detects a difference with the normal operation based on the received quality information and there is the difference, the EPC may notify an instruction to start calibration to the base station.

Particularly, in a transmission system, for example, the control unit 806 may set a correction value for a phase and an amplitude of the transmission system by handling the timing to execute calibration as the timing with which the transmission system does not transmit data for communication with the corresponding apparatus. Furthermore, in a reception system, the control unit 806 may set a correction value for a phase and an amplitude of the reception system by handling the timing to execute calibration as the timing with which the reception system has not received data for communication with the corresponding apparatus. In time division duplex (abbreviated as TDD), calibration may be performed during a gap duration that is a switching time between transmission and reception.

Furthermore, the control unit 806 may limit frequencies at which calibration is to be executed to a part of the frequencies, that is, to a sub-band. Accordingly, normal communication (service) is possible with a resource that has not been calibrated. Furthermore, when it is clear that, for example, the transmission power amplifiers, the phasers, and the filters have little variations in the temperature, etc., calibration is not required at the sub-band at which they have been calibrated, and the performance can be guaranteed by interpolation.

Similarly, calibration at the sub-band before increase in the temperature variations can guarantee the performance.

Furthermore, when the antenna elements have various distances, the control unit 806 divides the antenna elements into several groups according to the distances, and increases the transmission power for a group of relatively distant antenna elements more than that of a group of relatively close antenna elements, which improves the SNR and thus is effective. Here, some of the antenna elements may belong to a plurality of groups.

Furthermore, no correction by the control unit 806 is also effective when a value is significantly different from a calibration value measured in, for example, an anechoic chamber, before shipment or from correction values in the past record. For example, when a large truck passes right in front, normal calibration is possible by skipping the current calibration and performing the next calibration.

Furthermore, when the correction value exceeds a change acceptable value that is the largest value up to which change is acceptable, multipath is detected and separated. When calibration is performed only with principal waves and a value falls within the acceptable values, calibration with the value is also effective. Such a calibration is effective, for example, when a large sign is placed closer and multipath normally occurs.

Figure 9:
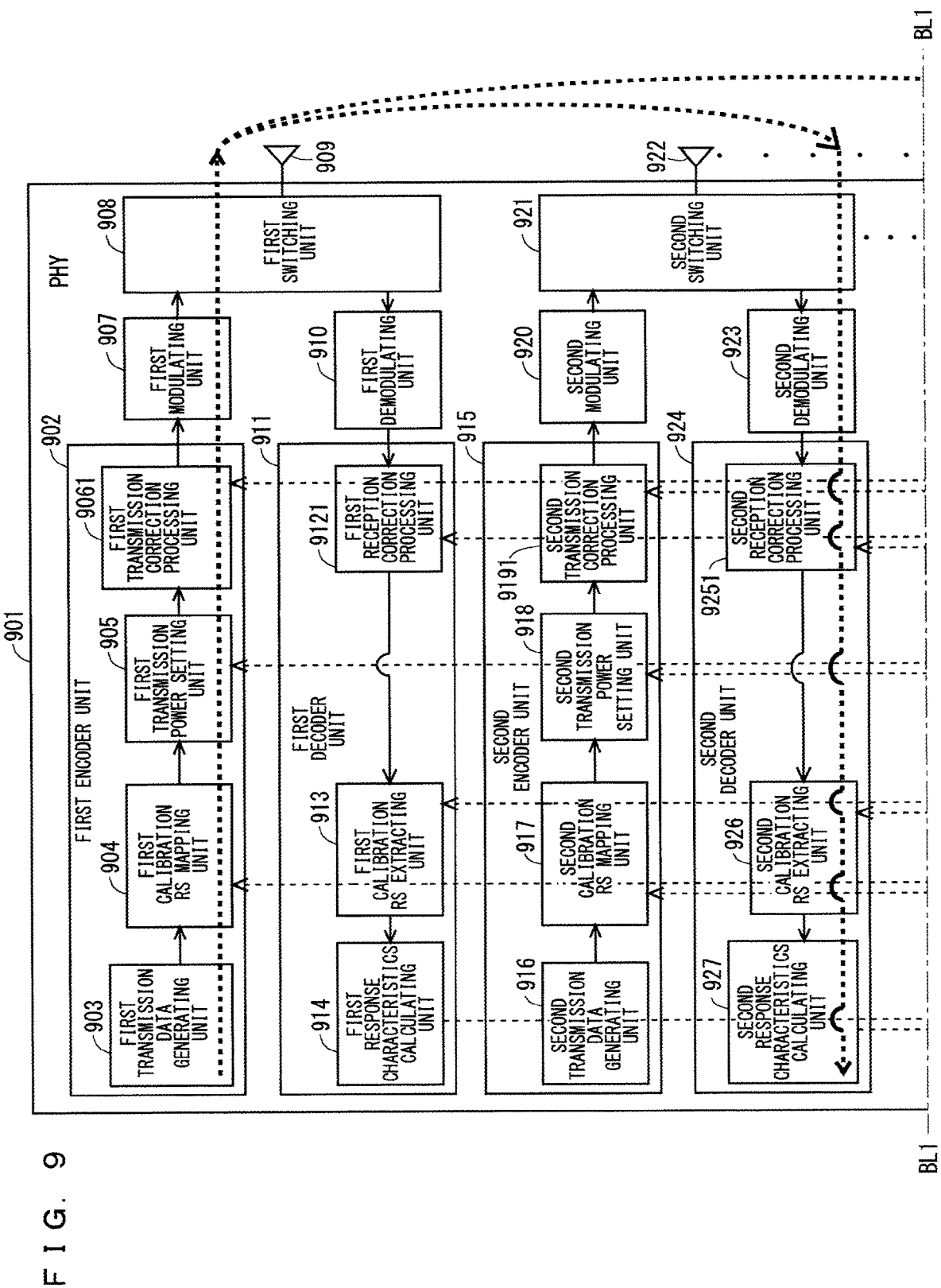
FIG. 9 is a block diagram illustrating an example configuration of a PHY processing unit 901, a control unit 9411, and n antenna elements 909, 922, . . . , and 935.
Figure 10:
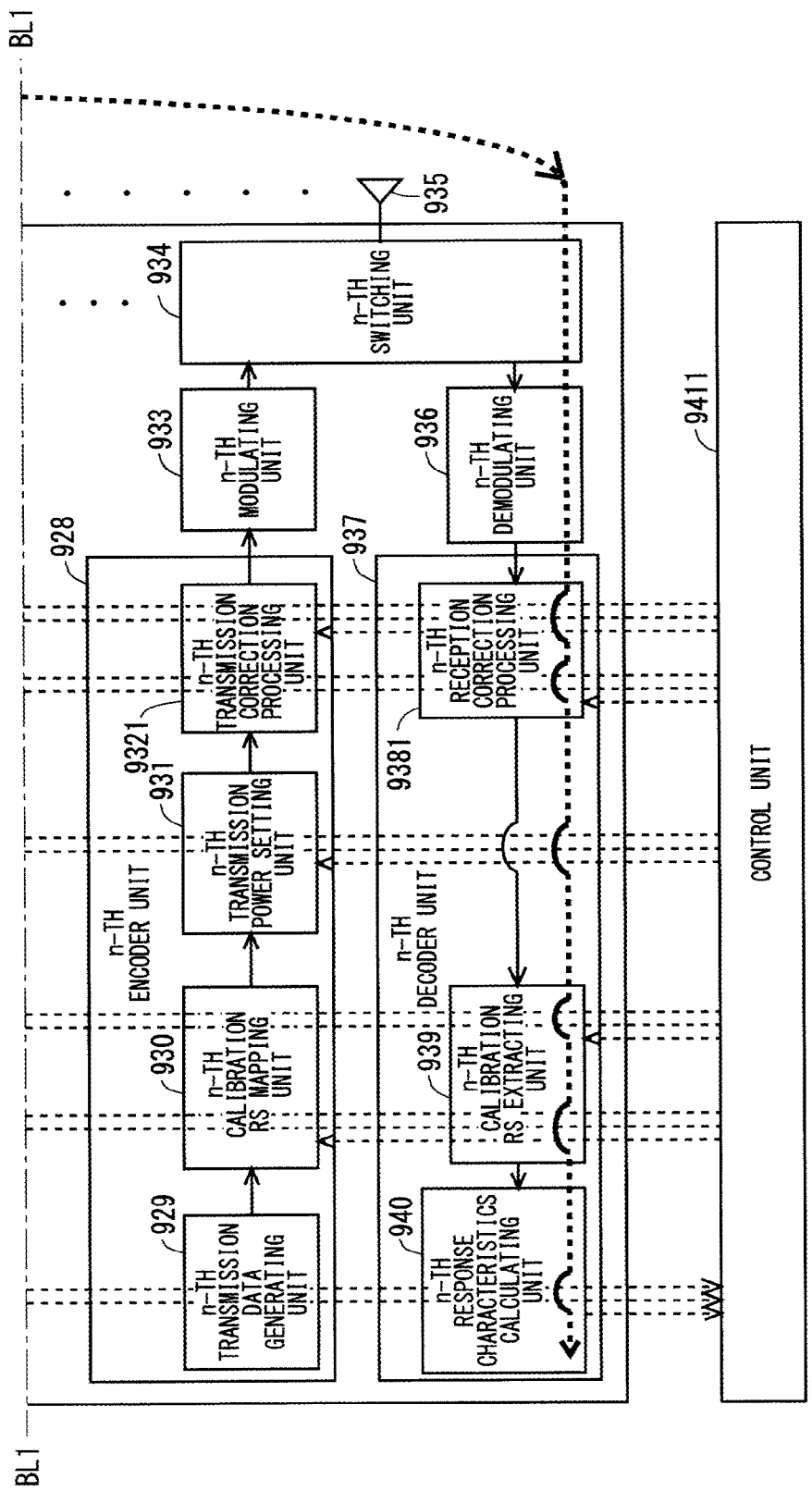
FIG. 10 is a block diagram illustrating the example configuration of the PHY processing unit 901, the control unit 9411, and the n antenna elements 909, 922, . . . , and 935.

Example signal flows of the PHY processing unit 801 and the control unit 806 will be described with reference to FIGS. 9 and 10. FIGS. 9 and 10 are block diagrams illustrating an example configuration of a PHY processing unit 901, a control unit 9411, and n antenna elements 909, 922, . . . , and 935. FIGS. 9 and 10 are connected across a border BL1.

The PHY processing unit 901 includes a plurality of encoder units, a plurality of modulating units, a plurality of switching units, a plurality of demodulating units, a plurality of decoder units. The PHY processing unit 901 corresponds to a calibration unit.

The plurality of encoder units are n encoder units (n is a natural number) consisting of, specifically, a first encoder unit 902, a second encoder unit 915, . . . , and an n-th encoder unit 928. The plurality of modulating units are n modulating units (n is a natural number) consisting of, specifically, a first modulating unit 907, a second modulating unit 920, . . . , and an n-th modulating unit 933. The plurality of switching units are n switching units (n is a natural number) consisting of, specifically, a first switching unit 908, a second switching unit 921, . . . , and an n-th switching unit 934.

The plurality of demodulating units are n demodulating units (n is a natural number) consisting of, specifically, a first demodulating unit 910, a second demodulating unit 923, . . . , and an n-th demodulating unit 936. The plurality of decoder units are n decoder units (n is a natural number) consisting of, specifically, a first decoder unit 911, a second decoder unit 924, . . . , and an n-th decoder unit 937.

Furthermore, a plurality of antenna elements, specifically, the n antenna elements (n is a natural number) consisting of the first antenna element 909, the second antenna element 922, . . . , and the n-th antenna element 935 are provided to correspond to the plurality of encoder units 902, 915, . . . , and 928, and the plurality of decoder units 911, 924, . . . , and 937, respectively.

The first encoder unit 902 includes a first transmission data generating unit 903, a first calibration RS mapping unit 904, a first transmission power setting unit 905, and a first transmission correction processing unit 9061. The first decoder unit 911 includes a first reception correction processing unit 9121, a first calibration RS extracting unit 913, and a first response characteristics calculating unit 914.

The second encoder unit 915 includes a second transmission data generating unit 916, a second calibration RS mapping unit 917, a second transmission power setting unit 918, and a second transmission correction processing unit 9191. The second decoder unit 924 includes a second reception correction processing unit 9251, a second calibration RS extracting unit 926, and a second response characteristics calculating unit 927.

The n-th encoder unit 928 includes an n-th transmission data generating unit 929, an n-th calibration RS mapping unit 930, an n-th transmission power setting unit 931, and an n-th transmission correction processing unit 9321. The n-th decoder unit 937 includes an n-th reception correction processing unit 9381, an n-th calibration RS extracting unit 939, and an n-th response characteristics calculating unit 940.

In FIGS. 9 and 10, the first encoder unit 902, the first modulating unit 907, the first switching unit 908, and the first antenna element 909 form a first transmission system. The second encoder unit 915, the second modulating unit 920, the second switching unit 921, and the second antenna element 922 form a second transmission system. The n-th encoder unit 928, the n-th modulating unit 933, the n-th switching unit 934, and the n-th antenna element 935 form an n-th transmission system.

In FIGS. 9 and 10, the first antenna element 909, the first switching unit 908, the first demodulating unit 910, and the first decoder unit 911 form a first reception system. The second antenna element 922, the second switching unit 921, the second demodulating unit 923, and the second decoder unit 924 form a second reception system. The n-th antenna element 935, the n-th switching unit 934, the n-th demodulating unit 936, and the n-th decoder unit 937 form an n-th reception system.

FIGS. 9 and 10 illustrate an example relative calibration in TDD systems. In the example of FIGS. 9 and 10, the first transmission system makes a transmission, and the second to the n-th reception systems receive the transmission to calculate response characteristics in the second to the n-th reception systems.

When the control unit 9411 determines to execute calibration, the PHY processing unit 901 performs the following processes according to an instruction from the control unit 9411.

The first transmission data generating unit 903 generates transmission data, and gives it to the first calibration RS mapping unit 904. The first calibration RS mapping unit 904 maps (inserts) cal-RSs to be transmitted with the timing and at the frequency that are instructed from the control unit 9411, to the transmission data given from the first transmission data generating unit 903. The first calibration RS mapping unit 904 gives the first transmission power setting unit 905 the transmission data to which the cal-RSs are mapped.

The first transmission power setting unit 905 sets a transmission power value corresponding to a distance between a transmission antenna element (may be hereinafter referred to as a "transmission antenna") and a reception antenna element (may be hereinafter referred to as a "reception antenna") as necessary to achieve accuracy of a correction value through predetermined calibration. The first transmission power setting unit 905 gives the first transmission correction processing unit 9061 the set transmission power value.

The first transmission correction processing unit 9061 gives the first modulating unit 907 a signal to be transmitted, while maintaining a correction value with the phase and the amplitude that are currently set. The first modulating unit 907 performs modulation such as OFDM on the signal given from the first transmission correction processing unit 9061. The first modulating unit 907 gives the first switching unit 908 the modulated signal.

The first switching unit 908 switches between transmission and reception of the TDD. The first switching unit 908 passes, to the first antenna element 909, the modulated signal given from the first modulating unit 907. The first antenna element 909 transmits the modulated signal given from the first modulating unit 907.

The second antenna elements 922 to the n-th antenna element 935 receive the signal transmitted by the first antenna element 909. Here, in contrast to the first switching unit 908, the second switching unit 921 to the n-th switching unit 934 make connections to enable reception of signals by the second reception system to the n-th reception system, respectively.

The second demodulating unit 923 to the n-th demodulating unit 936 demodulate the signals received by the second antenna elements 922 to the n-th antenna element 935, respectively, to, for example, OFDM. The second reception correction processing unit 9251 to the n-th reception correction processing unit 9381 are given the signals demodulated by the second demodulating unit 923 to the n-th demodulating unit 936, respectively.

The second reception correction processing unit 9251 to the n-th reception correction processing unit 9381 give a demodulated signal given from the second demodulating unit 923 to the n-th demodulating unit 936 to the second calibration RS extracting unit 926 to the n-th calibration RS extracting unit 939, respectively, while maintaining phases and amplitudes that are currently set.

The second calibration RS extracting unit 926 to the n-th calibration RS extracting unit 939 extract cal-RS portions from the signal given from the second reception correction processing unit 9251 to the n-th reception correction processing unit 9381 and give them to the second response characteristics calculating unit 927 to the n-th response characteristics calculating unit 940, respectively.

Based on a fact that the transmitted cal-RSs are known, the second response characteristics calculating unit 927 to the n-th response characteristics calculating unit 940 calculate propagation properties from fluctuations in the known signals. The second response characteristics calculating unit 927 to the n-th response characteristics calculating unit 940 notify the control unit 9411 of the calculated propagation properties.

The control unit 9411 calculates a correction value, for example, with respect to the second antenna element 922 so that the phases and the amplitudes are identical to the phase and the amplitude of the second antenna element 922. Here, the correction value is calculated in consideration of the respective distances of the second antenna element 922 to the n-th antenna element 935 from the first antenna element 909.

Upon setting the calculated correction value to each of the second reception correction processing unit 9251 to the n-th reception correction processing unit 9381, the control unit 9411 can match the phases and the amplitudes of signals received by the second antenna element 922 to the n-th antenna element 935.

If the first and third reception systems are calibrated with the same processes with transmission from the second transmission system, the correction value for the first reception correction processing unit 9121 can also be calculated. Thus, the phase and the amplitude of the first reception system can be matched with those of the second reception system.

Although the above examples describe reception of the same average reception power through all the antenna elements, they are not limited to such. Side lobes may be reduced by, for example, tapering the antenna elements to change the average reception power for each of the antenna elements. Here, the amplitude value of a received signal can be changed to a desired value by comparing the amplitude value with a desired amplitude value in a normal operation, for example, before shipment.

Figure 11:
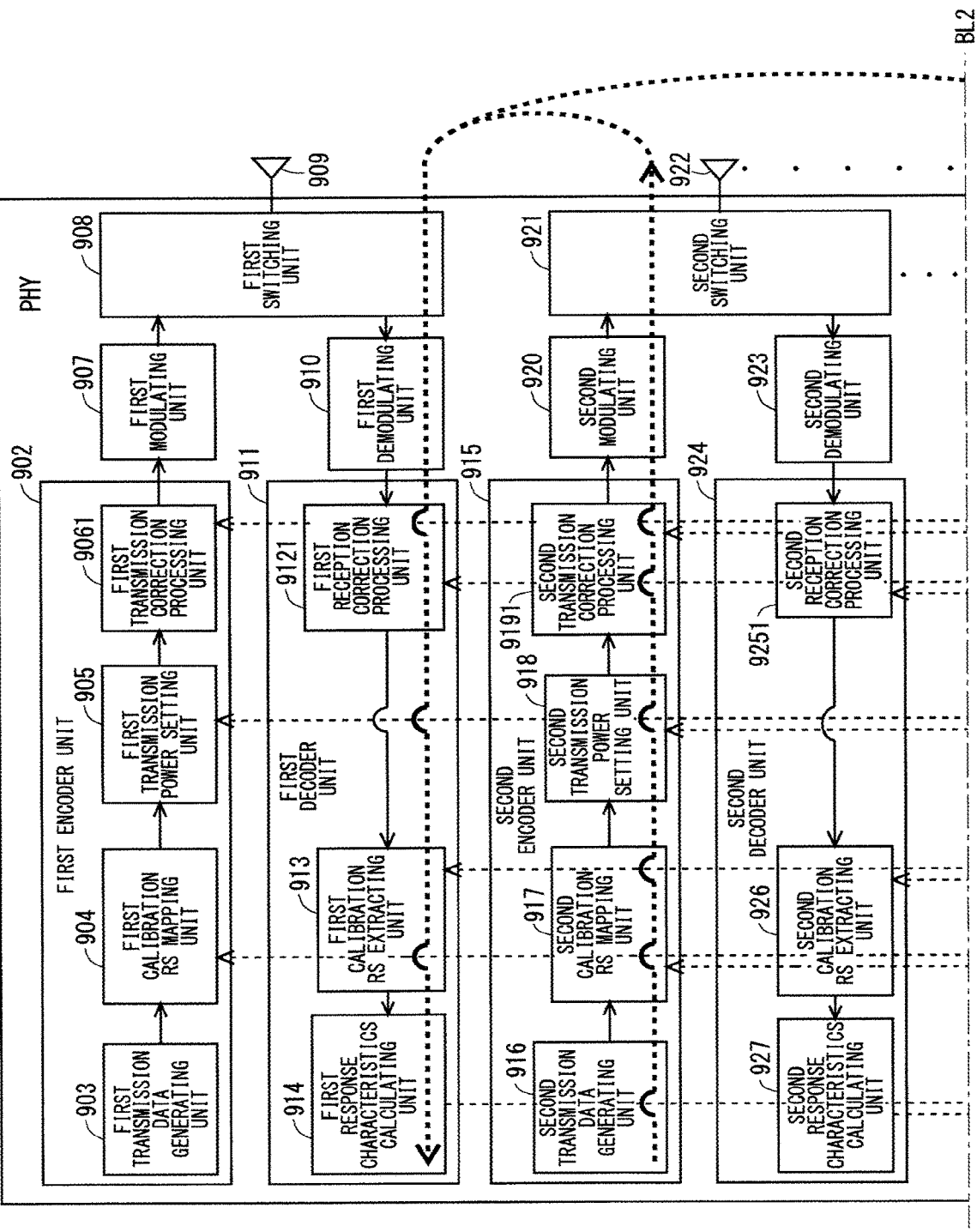
FIG. 11 is a block diagram illustrating an example configuration of the PHY processing unit 901, the control unit 9411, and the n antenna elements 909, 922, . . . , and 935.

FIGS. 11 and 12 are block diagrams illustrating an example configuration of the PHY processing unit 901, the control unit 9411, and the n antenna elements 909, 922, . . . , and 935. FIGS. 11 and 12 are connected across a border BL2. Since the configuration of FIGS. 11 and 12 is the same as that of FIGS. 9 and 10, the same references will be assigned to the same portions and the common description thereof will be omitted. Following the calibration of the reception systems illustrated in FIGS. 9 and 10, FIGS. 11 and 12 illustrate an example calibration of transmission systems using the relative calibration in the TDD systems, with the same configuration as that in FIGS. 9 and 10.

When the control unit 9411 determines to execute calibration, the PHY processing unit 901 performs the following processes according to an instruction from the control unit 9411.

The first transmission data generating unit 903 generates transmission data, and gives it to the first calibration RS mapping unit 904. The first calibration RS mapping unit 904 maps (inserts) cal-RSs to be transmitted with the timing and at the frequency that are instructed by the control unit 9411, to the transmission data given from the first transmission data generating unit 903. The first calibration RS mapping unit 904 gives the first transmission power setting unit 905 the transmission data to which the cal-RSs are mapped.

The first transmission power setting unit 905 sets a transmission power value corresponding to a distance between a transmission antenna and a reception antenna as necessary to achieve accuracy of a correction value through predetermined calibration. The first transmission power setting unit 905 gives the first transmission correction processing unit 9061 the set transmission power value.

The first transmission correction processing unit 9061 gives the first modulating unit 907 a signal to be transmitted, while maintaining a correction value with the phase and the amplitude that are currently set. The first modulating unit 907 performs modulation such as OFDM on the signal given from the first transmission correction processing unit 9061. The first modulating unit 907 gives the first switching unit 908 the modulated signal.

The first switching unit 908 switches between transmission and reception of the TDD. The first switching unit 908 passes, to the first antenna element 909, the modulated signal given from the first modulating unit 907. The first antenna element 909 transmits the modulated signal given from the first modulating unit 907.

The described processes may be performed in an order of the second transmission system, the third transmission system, . . . , and the n-th transmission system, or a part of the processes may be simultaneously performed by a plurality of the transmission systems. Simultaneously performing the part of the processes can shorten a time required for calibration.

Furthermore, transmission systems for performing the processes may be added one by one as in REV method, for example, the second transmission system, the second transmission system+the third transmission system, . . . , and the second transmission system+the third transmission system+ . . . +the n-th transmission system.

The second antenna elements 922 to the n-th antenna element 935 receive the signal transmitted by the first antenna element 909. Here, in contrast to the first switching unit 908, the second switching unit 921 to the n-th switching unit 934 make connections to enable reception of signals by the second reception system to the n-th reception system, respectively.

The second demodulating unit 923 to the n-th demodulating unit 936 demodulate the signals received by the second antenna elements 922 to the n-th antenna element 935, respectively, to, for example, OFDM. The second reception correction processing unit 9251 to the n-th reception correction processing unit 9381 are given the signals demodulated by the second demodulating unit 923 to the n-th demodulating unit 936, respectively.

The second reception correction processing unit 9251 to the n-th reception correction processing unit 9381 give a demodulated signal given from the second demodulating unit 923 to the n-th demodulating unit 936 to the second calibration RS extracting unit 926 to the n-th calibration RS extracting unit 939, respectively, while maintaining phases and amplitudes that are currently set.

The second calibration RS extracting unit 926 to the n-th calibration RS extracting unit 939 extract cal-RS portions from the signal given from the second reception correction processing unit 9251 to the n-th reception correction processing unit 9381 and give them to the second response characteristics calculating unit 927 to the n-th response characteristics calculating unit 940, respectively.

Based on a fact that the transmitted cal-RSs are known, the second response characteristics calculating unit 927 to the n-th response characteristics calculating unit 940 calculate propagation properties from fluctuations in the known signals. The second response characteristics calculating unit 927 to the n-th response characteristics calculating unit 940 notify the control unit 9411 of the calculated propagation properties.

The control unit 9411 calculates a correction value so that, for example, phases of the second to the n-th transmission signals transmitted through the second antenna element 922 to the n-th antenna element 935, respectively, are identical to one another with respect to the reception system including the first antenna element 909. Here, the correction value is calculated in consideration of the respective distances (phase rotation by a distance, amplitude attenuation) among the first antenna element 909 to the n-th antenna element 935.

Upon adding the calculated correction value to the current correction value and setting the correction value to each of the second transmission correction processing unit 9191 to the n-th transmission correction processing unit 9321, the control unit 9411 can match the phases and the amplitudes of signals transmitted by the second antenna element 922 to the n-th antenna element 935.

If the second reception system is calibrated with the same processes with transmission from the first transmission system, the phase and the amplitude of the first transmission system can be also matched with the others.

Although the above examples describe transmission of the same average transmission power through all the antenna elements, they are not limited to such. Side lobes may be reduced by, for example, tapering the antenna elements to change the average transmission power for each of the antenna elements. Here, the amplitude value of a transmission signal can be changed to a desired value by comparing the amplitude value with a desired amplitude value that is known.

Figure 13:
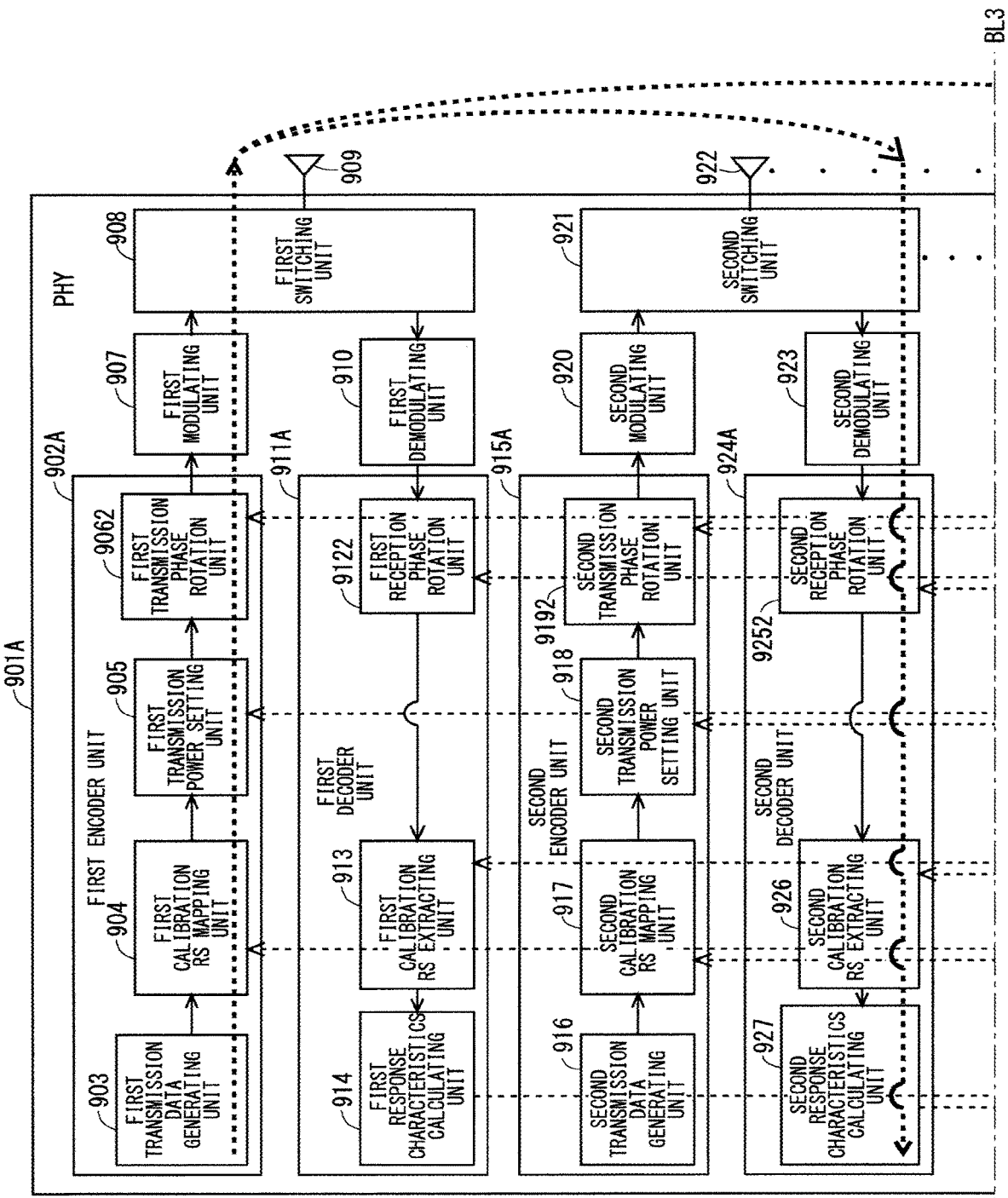
FIG. 13 is a block diagram illustrating another example configuration of a PHY processing unit 901A, a control unit 9412, and the n antenna elements 909, 922, . . . , and 935.
Figure 14:
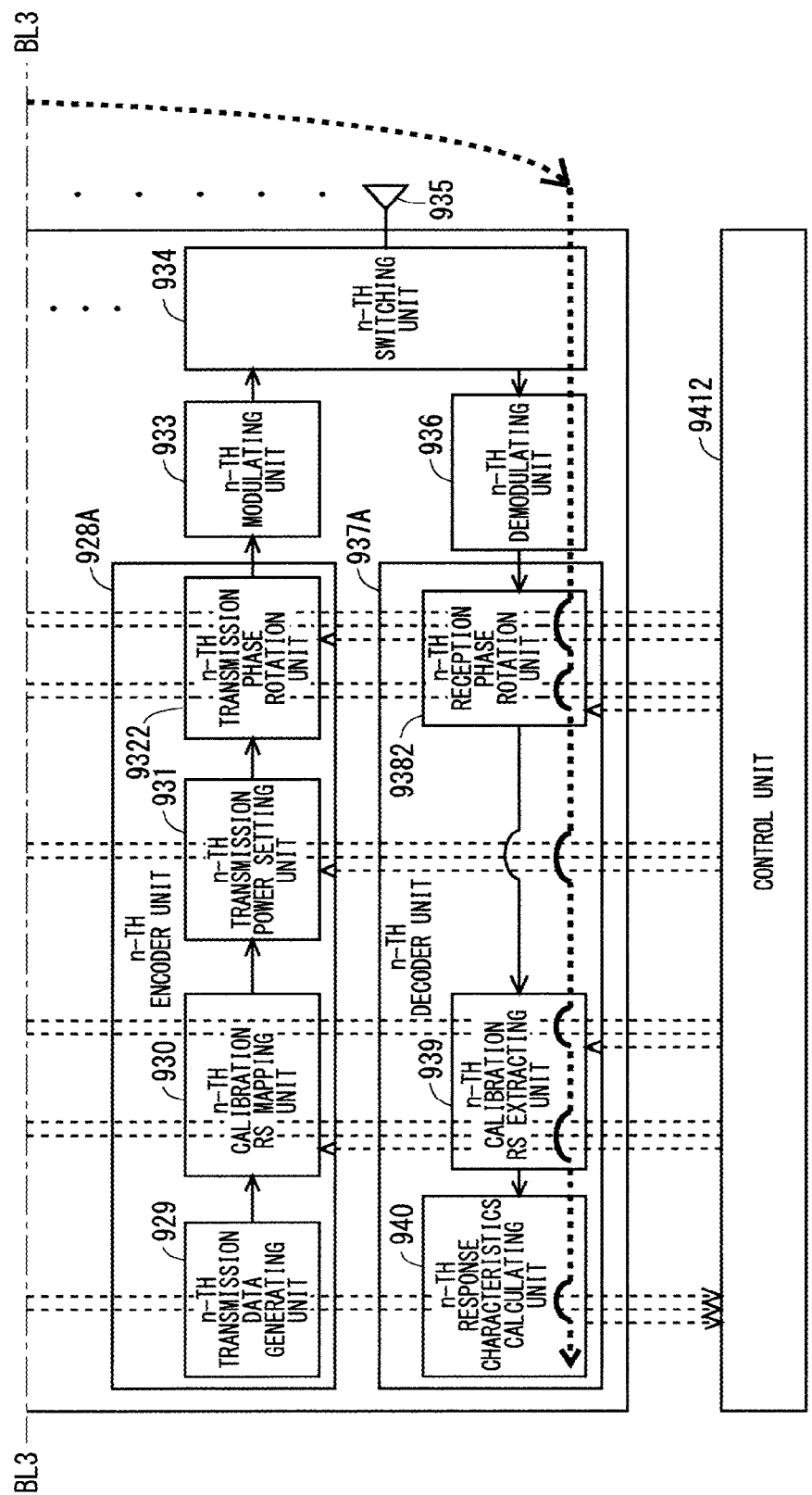
FIG. 14 is a block diagram illustrating the other example configuration of the PHY processing unit 901A, the control unit 9412, and the n antenna elements 909, 922, . . . , and 935.

FIGS. 13 and 14 are block diagrams illustrating another example configuration of a PHY processing unit 901A, a control unit 9412, and then antenna elements 909, 922, . . . , and 935. FIGS. 13 and 14 are connected across a border BL3.

The PHY processing unit 901A includes a plurality of encoder units, a plurality of modulating units, a plurality of switching units, a plurality of demodulating units, a plurality of decoder units. The PHY processing unit 901A corresponds to a calibration unit.

The plurality of encoder units are n encoder units (n is a natural number) consisting of, specifically, a first encoder unit 902A, a second encoder unit 915A, . . . , and an n-th encoder unit 928A. The plurality of modulating units are n modulating units (n is a natural number) consisting of, specifically, the first modulating unit 907, the second modulating unit 920, . . . , and the n-th modulating unit 933. The plurality of switching units are n switching units (n is a natural number) consisting of, specifically, the first switching unit 908, the second switching unit 921, . . . , and the n-th switching unit 934.

The plurality of demodulating units are n demodulating units (n is a natural number) consisting of, specifically, the first demodulating unit 910, the second demodulating unit 923, . . . , and the n-th demodulating unit 936. The plurality of decoder units are n decoder units (n is a natural number) consisting of, specifically, a first decoder unit 911A, a second decoder unit 924A, . . . , and an n-th decoder unit 937A.

Furthermore, a plurality of antenna elements, specifically, the n antenna elements (n is a natural number) consisting of the first antenna element 909, the second antenna element 922, . . . , and the n-th antenna element 935 are provided to correspond to the plurality of encoder units 902A, 915A, . . . , and 928A, and the plurality of decoder units 911A, 924A, . . . , and 937A, respectively.

The first encoder unit 902A includes the first transmission data generating unit 903, the first calibration RS mapping unit 904, the first transmission power setting unit 905, and a first transmission phase rotation unit 9062. The first decoder unit 911A includes a first reception phase rotation unit 9122, the first calibration RS extracting unit 913, and the first response characteristics calculating unit 914.

The second encoder unit 915A includes the second transmission data generating unit 916, the second calibration RS mapping unit 917, the second transmission power setting unit 918, and a second transmission phase rotation unit 9192. The second decoder unit 924A includes a second reception phase rotation unit 9252, the second calibration RS extracting unit 926, and the second response characteristics calculating unit 927.

The n-th encoder unit 928A includes the n-th transmission data generating unit 929, the n-th calibration RS mapping unit 930, the n-th transmission power setting unit 931, and an n-th transmission phase rotation unit 9322. The n-th decoder unit 937A includes an n-th reception phase rotation unit 9382, the n-th calibration RS extracting unit 939, and the n-th response characteristics calculating unit 940.

In FIGS. 13 and 14, the first encoder unit 902A, the first modulating unit 907, the first switching unit 908, and the first antenna element 909 form a first transmission system. The second encoder unit 915A, the second modulating unit 920, the second switching unit 921, and the second antenna element 922 form a second transmission system. The n-th encoder unit 928A, the n-th modulating unit 933, the n-th switching unit 934, and the n-th antenna element 935 form an n-th transmission system.

In FIGS. 13 and 14, the first antenna element 909, the first switching unit 908, the first demodulating unit 910, and the first decoder unit 911A form a first reception system. The second antenna element 922, the second switching unit 921, the second demodulating unit 923, and the second decoder unit 924A form a second reception system. The n-th antenna element 935, the n-th switching unit 934, the n-th demodulating unit 936, and the n-th decoder unit 937A form an n-th reception system.

Since the configuration of FIGS. 13 and 14 includes the same configuration as that of FIGS. 9 and 10, the same references will be assigned to the same portions and the common description thereof will be omitted. FIGS. 13 and 14 illustrate an example of the REV method in the TDD systems. FIGS. 13 and 14 illustrate an example in which the second reception phase rotation unit 9252 to the n-th reception phase rotation unit 9382 successively rotate the phases and the control unit 9412 obtains a phase having the highest reception power, while the first transmission system makes a transmission and the second to the n-th reception systems receive the transmission.

Figure 15:
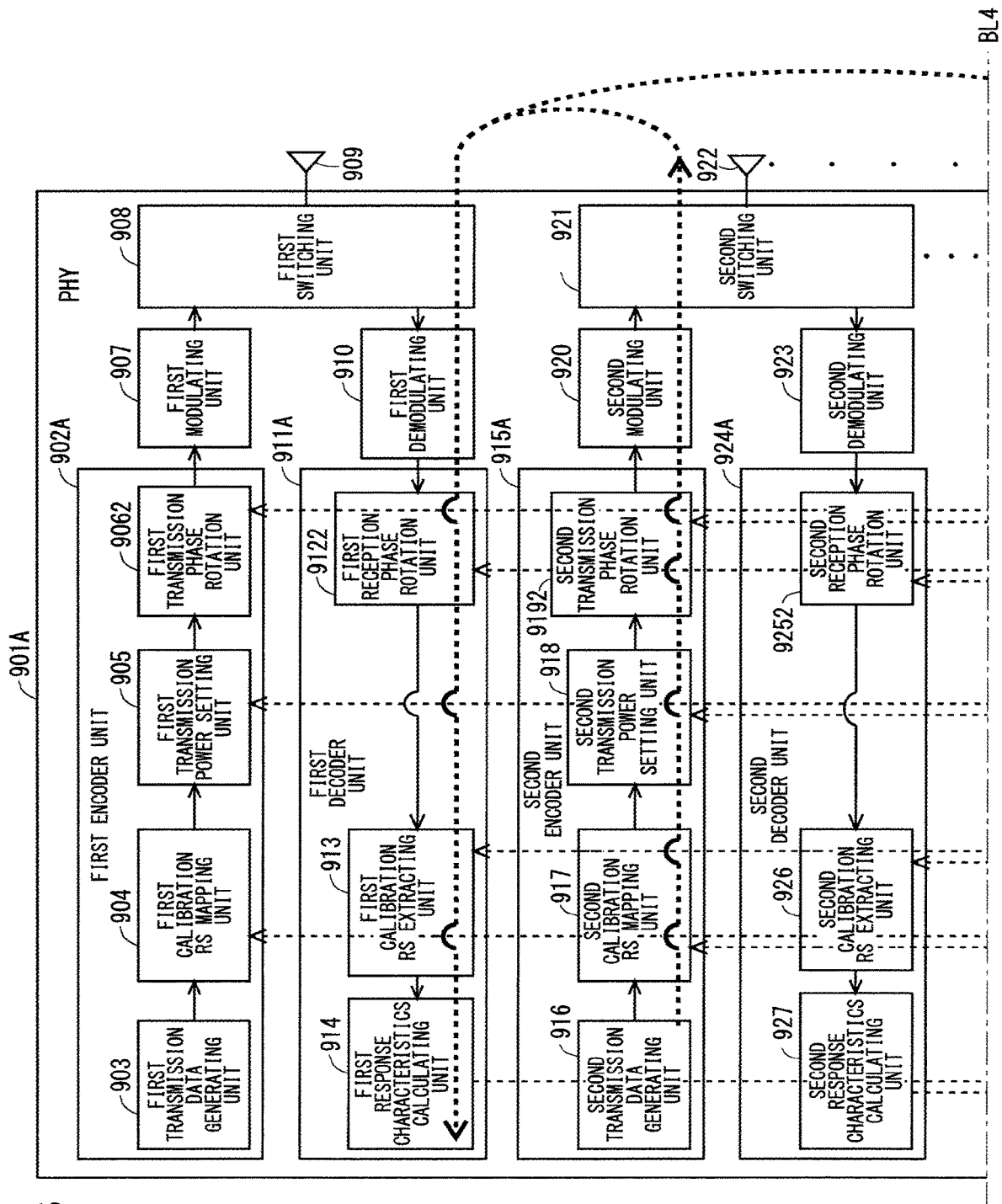
FIG. 15 is a block diagram illustrating another example configuration of the PHY processing unit 901A, the control unit 9412, and the n antenna elements 909, 922, . . . , and 935
Figure 16:
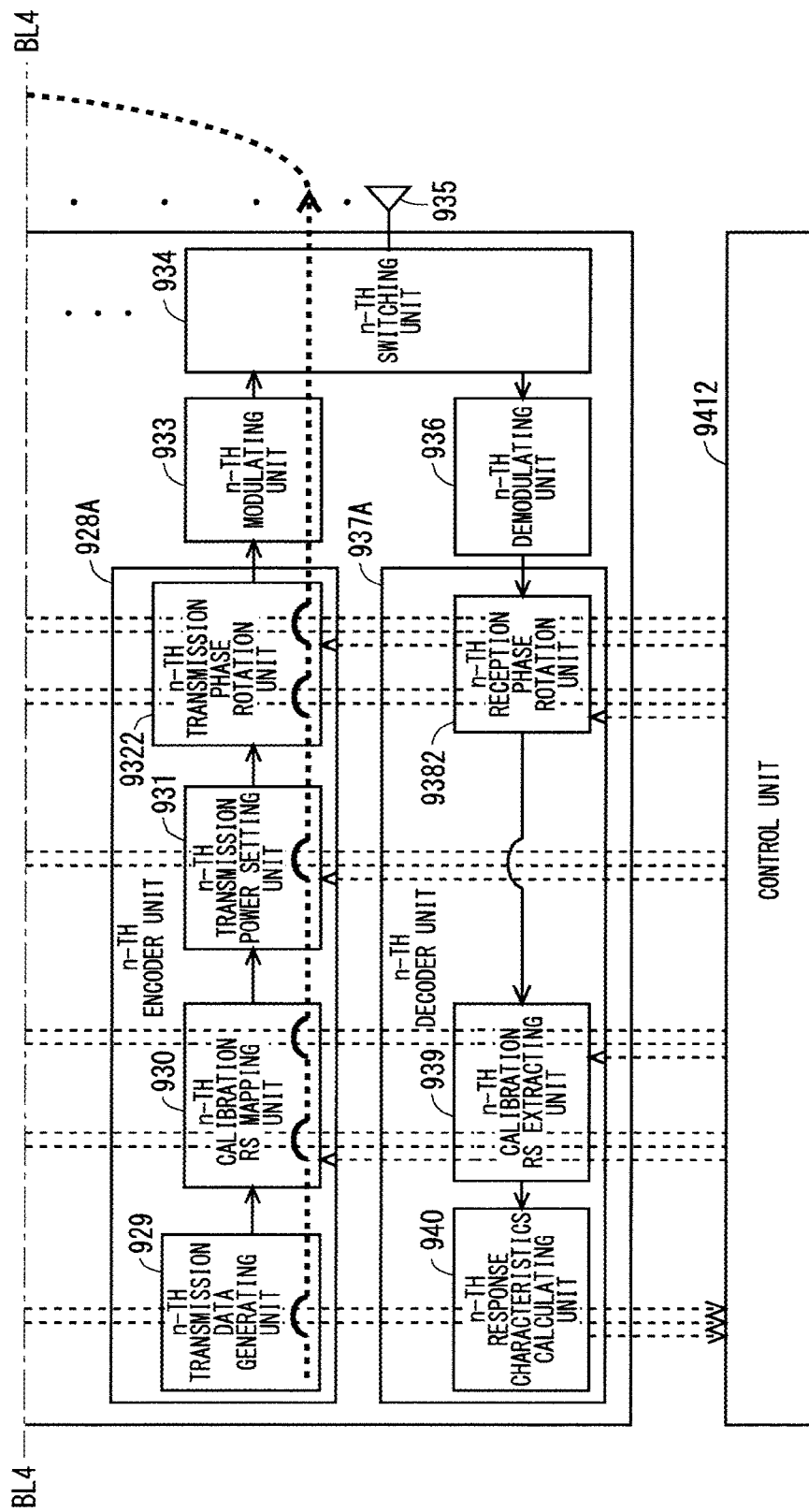
FIG. 16 is a block diagram illustrating the other example configuration of the PHY processing unit 901A, the control unit 9412, and the n antenna elements 909, 922, . . . , and 935.

FIGS. 15 and 16 are block diagrams illustrating another example configuration of the PHY processing unit 901A, the control unit 9412, and the n antenna elements 909, 922, . . . , and 935. FIGS. 15 and 16 are connected across a border BL4. Since the configuration of FIGS. 15 and 16 is the same as that of FIGS. 13 and 14, the same references will be assigned to the same portions and the common description thereof will be omitted.

Following the calibration of the reception systems illustrated in FIGS. 13 and 14, FIGS. 15 and 16 illustrate an example calibration of transmission systems in the REV method using the TDD systems, with the same configuration as that in FIGS. 13 and 14. FIGS. 15 and 16 illustrate an example in which the second transmission phase rotation unit 9192 to the n-th transmission phase rotation unit 9322 successively rotate the phases, and the control unit 9412 obtains a phase having the highest reception power.

When each of the calibration RS mapping units 904 to 930 transmits the cal-RSs, it may radio-transmit an information bit indicating that the subframe or the slot is used for calibration so that a user equipment, the surrounding repeaters, and the surrounding cells can recognize the calibration.

The user equipment can perform random access by avoiding the timing of calibration (may be hereinafter referred to as "calibration timing"). The surrounding repeaters and the surrounding cells can avoid simultaneous calibration. Alternatively, the surrounding repeaters and the surrounding cells may be notified through a cable. Alternatively, the surrounding user equipments may be notified via the surrounding repeaters and the surrounding cells through a cable.

Notification of whether calibration is normally performed is effective. If the calibration is not normally performed, it is probable that, for example, some antenna elements are electrically or physically damaged and lack their function. Thus, having a function of detecting, no matter how many times a correction value is measured, whether the correction value is significantly larger than values set in the past (including a value set immediately before) is also effective.

If a failure in calibration is detected, for example, the reciprocity of transmission and reception cannot be guaranteed. Thus, the precoding/postcoding under control of beams may not operate normally, and the SNR becomes worse. Accordingly, communication cannot be performed normally, and interference occurs in a cell that is normally operating.

Thus, notifying an RRC_IDLE user equipment existing in the area that the calibration is not normally performed, through broadcast information is effective. Furthermore, individually notifying a user equipment during communication using the radio resource control (RRC) is effective.

Furthermore, notifying a user equipment moving into a cell through handover as configuration information for the cell is effective.

There are the following five calibration states (1) to (5).
(1) State 1: Calibration has not yet been executed.
(2) State 2: During calibration
(3) State 3: Calibration has failed.
(4) State 4: Calibration is to be started after a predetermined time.
(5) State 5: Calibration has been normally completed.

Notifying information indicating each of the above five calibration states (1) to (5) separately from information indicating whether calibration is successful is effective. Alternatively, collectively notifying some of the states (1) to (5) enables an amount of information to be reduced, which is effective.

Notifying a calibration level, specifically, information indicating, for example, whether the reciprocity can be supported and whether a direction of arrival can be ascertained is also effective. Notifying this information to an RRC_IDLE user equipment existing in the area through broadcast information is effective. Furthermore, individually notifying a user equipment during communication of such information using an RRC message such as an RRC connection setup message and an RRC connection reconfiguration message is effective. Furthermore, notifying also a user equipment moving into a cell through handover of such information as configuration information for the cell is effective.

Similarly, individually notifying, using the radio resource control (RRC), a base station about whether a user equipment is normally performing calibration or about a calibration state is effective.

As described above according to the first embodiment, the PHY processing unit that is a calibration unit obtains a correction value for the phases and the amplitudes of the beams in the respective antenna elements so that the phases and the amplitudes of the beams are identical among the antenna elements, and calibrates the phases and the amplitudes based on the obtained correction value. Since the calibration can be performed with higher accuracy, it is possible to match phase and amplitude differences in beam among a plurality of antenna elements included in a multi-element antenna. Thus, a communication system capable of communication with a relatively high throughput can be implemented.

Second Embodiment

The first embodiment describes a method for enabling improvement of a throughput by matching phase and amplitude differences among antenna elements included in a multi-element antenna. The second embodiment will disclose a method for solving a problem with requiring a long time to transmit the same number of cal-RSs when mapping of the cal-RSs for each of the antenna elements for calibration temporally varies.

This method is a method for arranging reference signals for calibration (cal-RSs) in the same subframe in an antenna element that transmits the cal-RSs.

Figure 17:
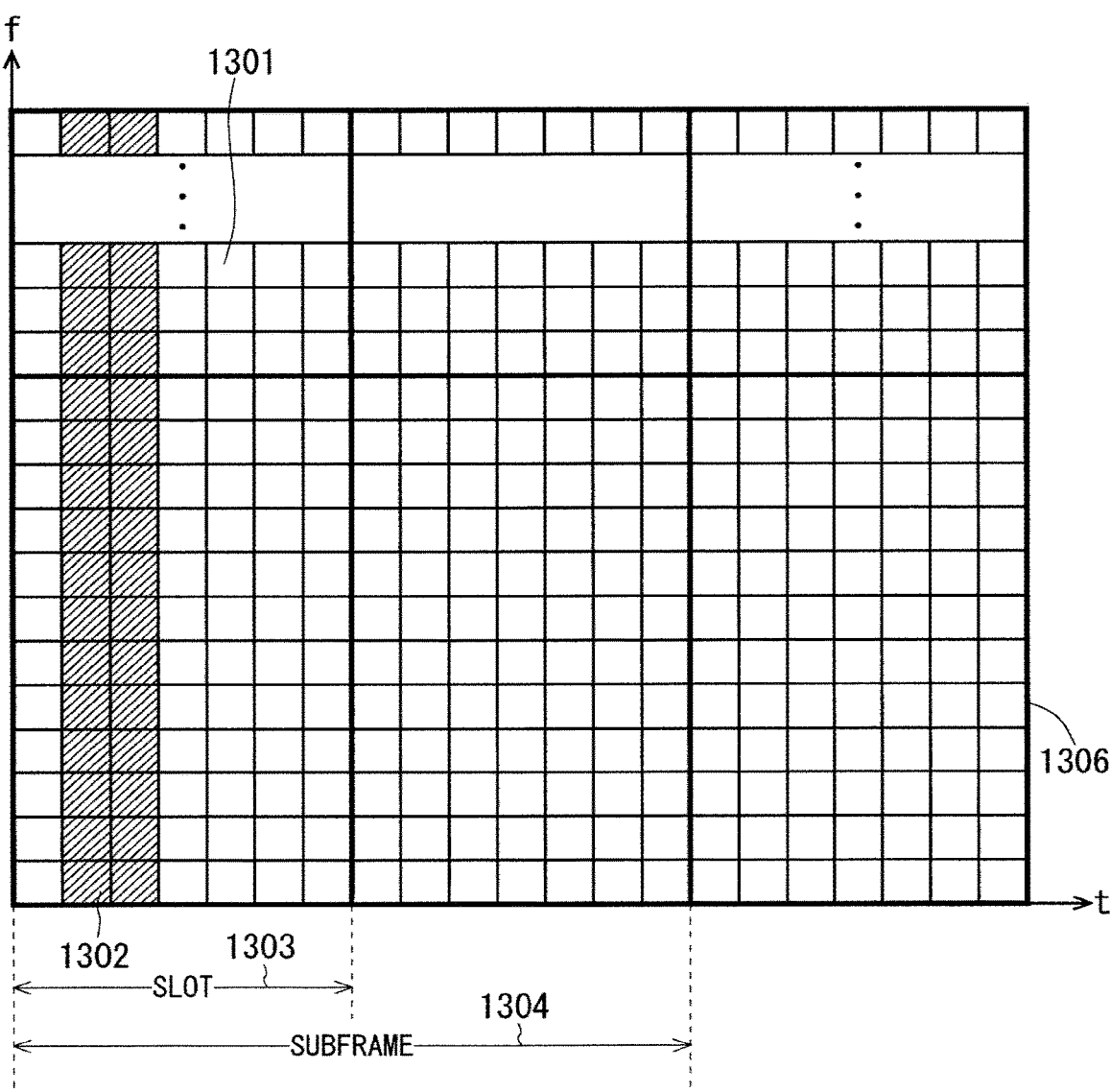
FIG. 17 illustrates example mapping in transmission data of a first antenna element.
Figure 18:
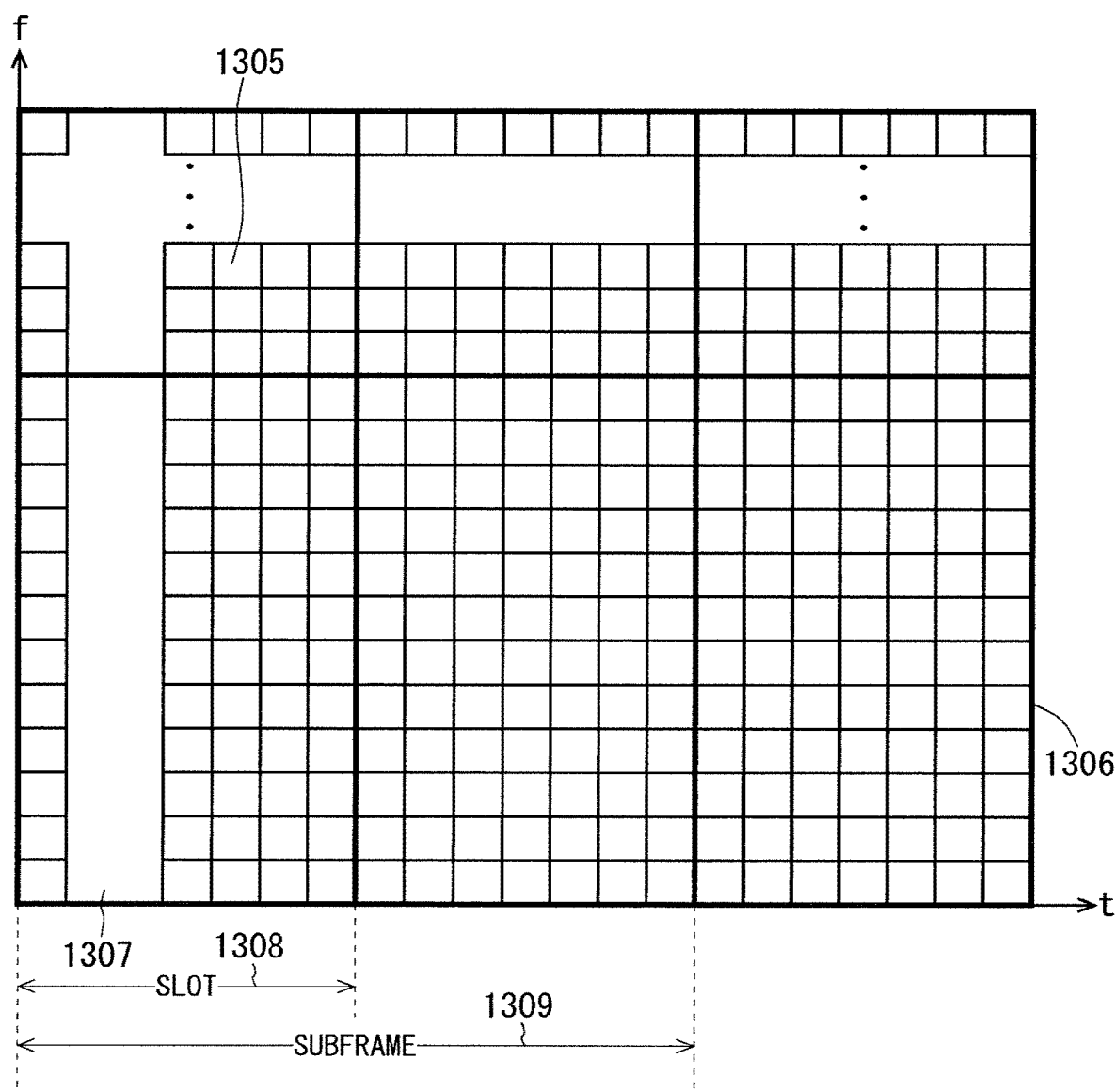
FIG. 18 illustrates example mapping in transmission data of a second antenna element to an n-th antenna element.

FIG. 17 illustrates example mapping in transmission data of a first antenna element. FIG. 18 illustrates example mapping in transmission data of a second antenna element to an n-th antenna element. The horizontal axis represents a time t, and the vertical axis represents a frequency f in FIGS. 17 and 18. In FIGS. 17 and 18, a reference "1306" denotes a resource block.

In the example of FIG. 17, the first antenna element transmits cal-RSs 1302 that are localized in a first slot 1303 and a first subframe 1304, and transmits normal OFDM symbols 1301 in the remaining portions.

As illustrated in FIG. 18, transmission data during the same duration in the second antenna element to the n-th antenna element is a null 1307. In other words, in the second antenna element to the n-th antenna element, the transmission data in a slot 1308 and a subframe 1309 during a duration in which the cal-RSs 1302 are to be transmitted by the first antenna element is the null 1307, whereas normal OFDM symbols 1305 are transmitted in the remaining portions.

Although the slot indicates a time corresponding to 7 OFDM symbols and the subframe indicates a time corresponding to 14 OFDM symbols, they may be any minimum slot allocated on a per particular user unit basis.

Since the cal-RSs 1302 are arranged during a particular duration in the example of FIG. 17, calibration is possible during this duration and the time required for calibration can be shortened.

Although the first antenna element transmits the cal-RSs 1302 with the second and third OFDM symbols in the example of FIG. 17, transmitting cal-RSs of another antenna element using the fourth and fifth OFDM symbols in the same slot or the same subframe is also effective.

Furthermore, not only shifting the time but also using a different orthogonal code is effective to enable the cal-RSs for each of the antenna elements to be orthogonalized and separated. It is more preferred to set a code to an orthogonal code even with the phase rotated.

Similarly, transmitting the cal-RSs at a part of the frequencies through the first antenna element and transmitting the cal-RSs at a different frequency through another antenna element are also effective.

The cal-RSs may be identical signals among all the antenna elements if code-multiplexing is not used.

Since such processes enable use of the energy in the entire frequency domain, the SNR can be increased and the accuracy of calibration can be improved. Furthermore, since nothing is transmitted through the other antenna elements, interference can be reduced and the accuracy of calibration can be improved.

The method for transmitting the cal-RSs in a particular frequency domain is effective when the SNR is sufficiently favorable. Since a plurality of antenna elements can be simultaneously calibrated using this method, the time required for calibration can be shortened.

In the REV method, the same signals as those of the first antenna element may be mapped for the second to the n-th antenna elements, instead of the null.

FIG. 19 illustrates examples of mapping and the reception power at each frequency, in transmission data of the first antenna element. Part (a) of FIG. 19 illustrates an example of mapping in the transmission data of the first antenna element, and part (b) of FIG. 19 illustrates the reception power at each frequency in the transmission data of the first antenna element.

In the example of FIG. 19, the first antenna element transmits cal-RSs 1402 that are localized in a first slot 1403 and a first subframe 1404, and transmits normal OFDM symbols 1401 in the remaining portions, similarly as the example in FIG. 17.

Since the entire frequency domain is used herein, response characteristics at each frequency can be calculated. Thus, fluctuations in the amplitude and the phase at each frequency can be detected. Fluctuations in the received power are calculated from the detected amplitude and phase. As illustrated in FIG. 19, when fluctuations in the received power P for each of the OFDM symbols 1401 are larger, it is possible to determine the presence of frequency-selective multipath fading.

When transmission antenna elements and reception antenna elements for calibration are not moved and the multipath is detected, it is possible to determine occurrence of a state different from a normal state such as the presence of scatterers in close proximity. No calibration at the subband is effective. Here, it is preferred to use the correction value in the previous calibration and the phase rotation.

Since the scatterers occurring in close proximity normally move far in a predetermined time, detecting fluctuations in the amplitude and the phase at each frequency again after a lapse of a certain time is effective.

Alternatively, the fluctuations may be calculated and set from the correction value and the phase rotation at the close band. Interpolation such as linear interpolation is also effective.

Furthermore, when the multipath is detected, separation between principal waves and delay waves through, for example, calculation of a delay profile and calibration only with the principal waves are effective. Accordingly, influence of the multipath can be removed, and appropriate calibration can be performed.

According to the second embodiment, when transmitting respective cal-RSs from a plurality of antenna elements, the PHY processing unit that is a calibration unit arranges the cal-RSs in the same subframe as described above. Accordingly, since all the antenna elements can be calibrated during the same duration, the time required for calibration can be shortened.

Third Embodiment

The second embodiment describes a method for temporally localizing the mapping of cal-RSs for each antenna element that is required for calibration to enable shortening of the time required for calibration. However, the transmission sometimes overlaps with those of the other CHs or the other RSs, and the current standards do not cover such requirement. Thus, a non-avoidable problem with the requirement occurs. The third embodiment will disclose a method for solving the problem by providing a new mapping method.

Figure 21:
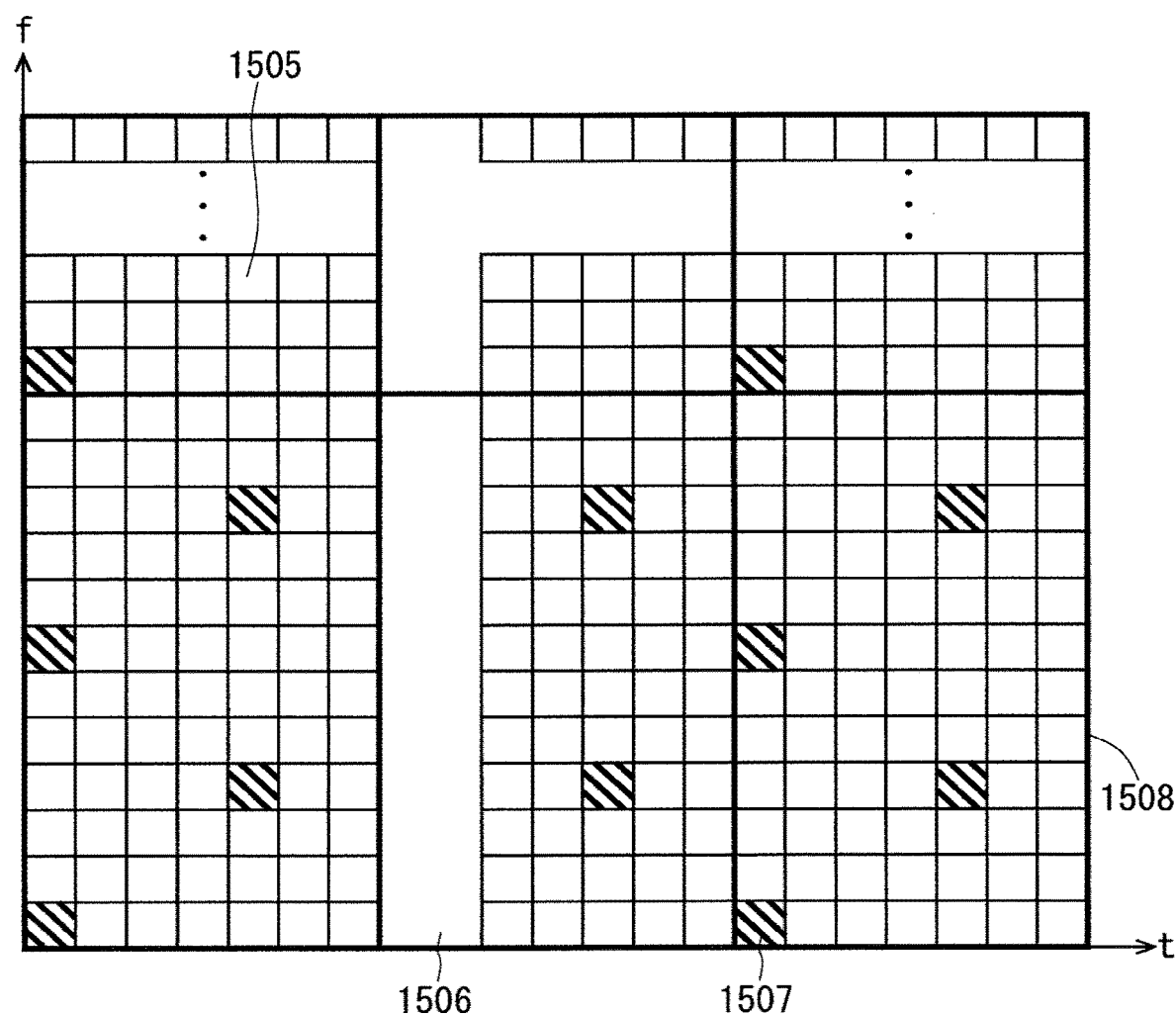
FIG. 21 illustrates another example mapping in the transmission data of the second antenna element to the n-th antenna element.

FIG. 20 illustrates another example mapping in the transmission data of the first antenna element. FIG. 21 illustrates another example mapping in the transmission data of the second antenna element to the n-th antenna element. FIGS. 20 and 21 illustrate example mapping of downlink transmission bits for which a slot or a subframe for calibration or resource blocks 1504 and 1508 are provided.

As illustrated in FIG. 20, special mapping of not transmitting a part of CRSs 1503 on a subframe for transmitting cal-RSs 1502 is provided for the first antenna element. Normal OFDM symbols 1501 are transmitted in the remaining portions.

As illustrated in FIG. 21, special mapping of not transmitting a part of CRSs 1507 on a subframe for transmitting a null 1506 is provided for the second antenna element to the n-th antenna element. Normal OFDM symbols 1505 are transmitted in the remaining portions.

Figure 22:
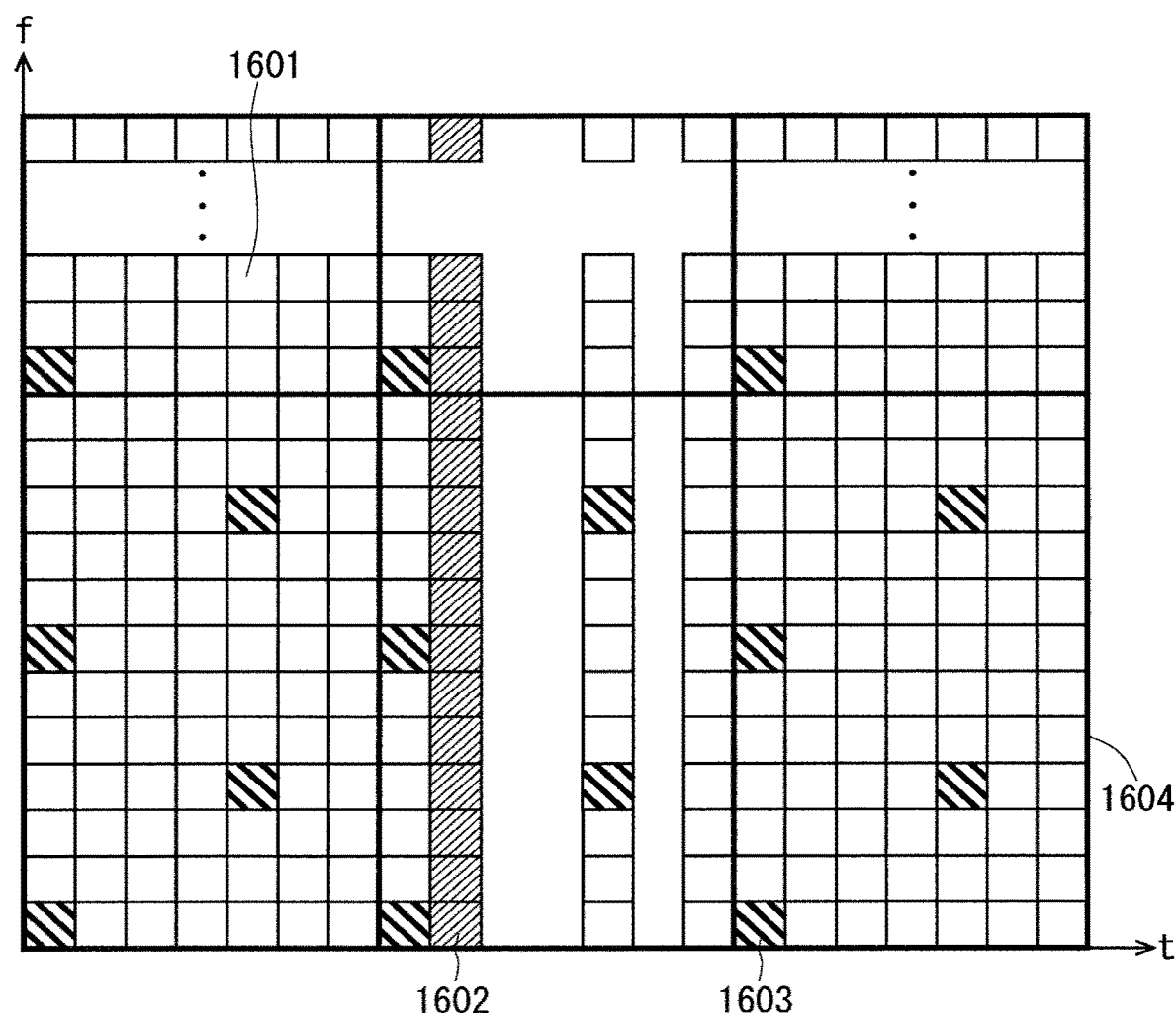
FIG. 22 further illustrates another example mapping in the transmission data of the first antenna element.
Figure 23:
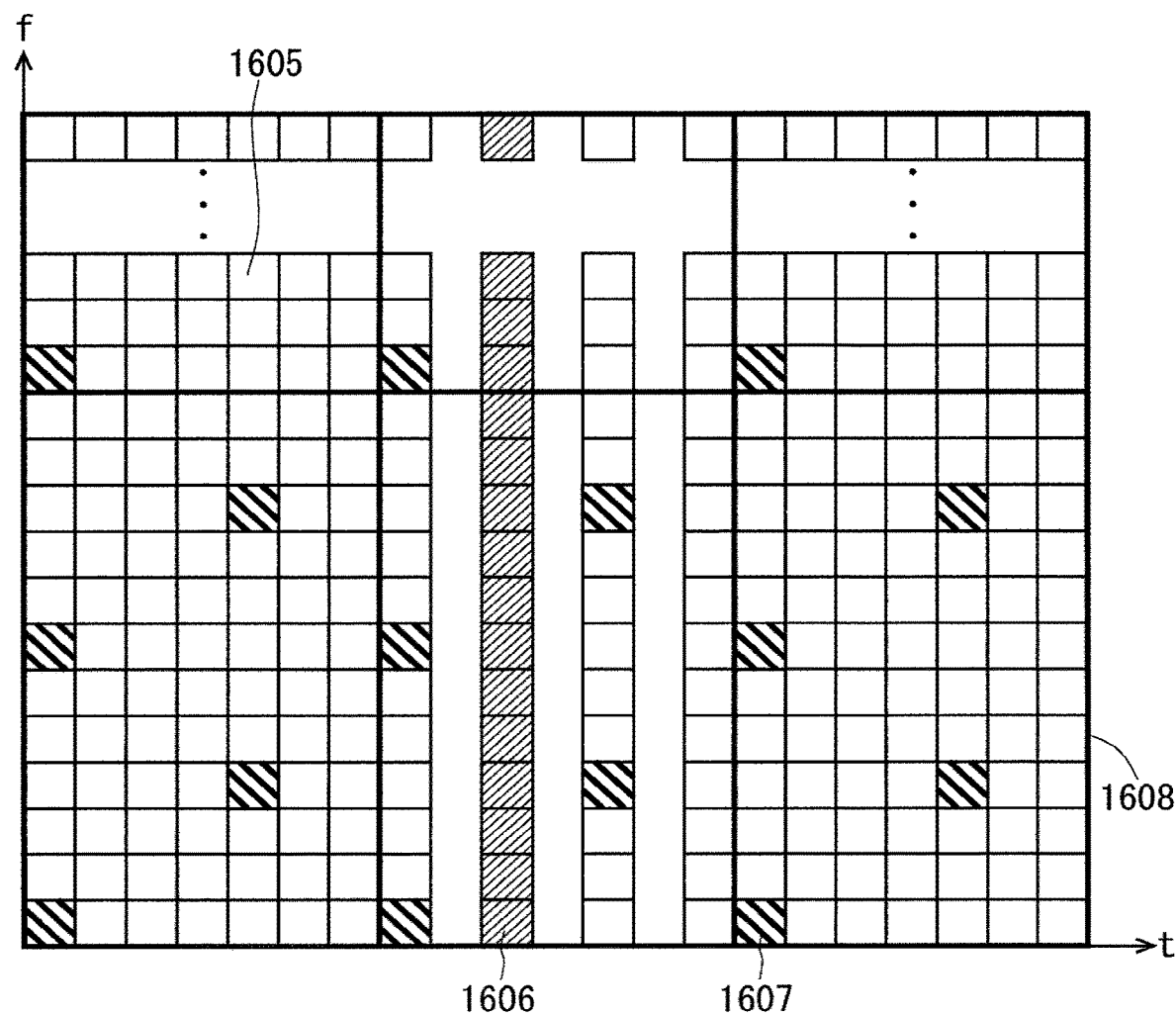
FIG. 23 further illustrates another example mapping in the transmission data of the second antenna element.
Figure 25:
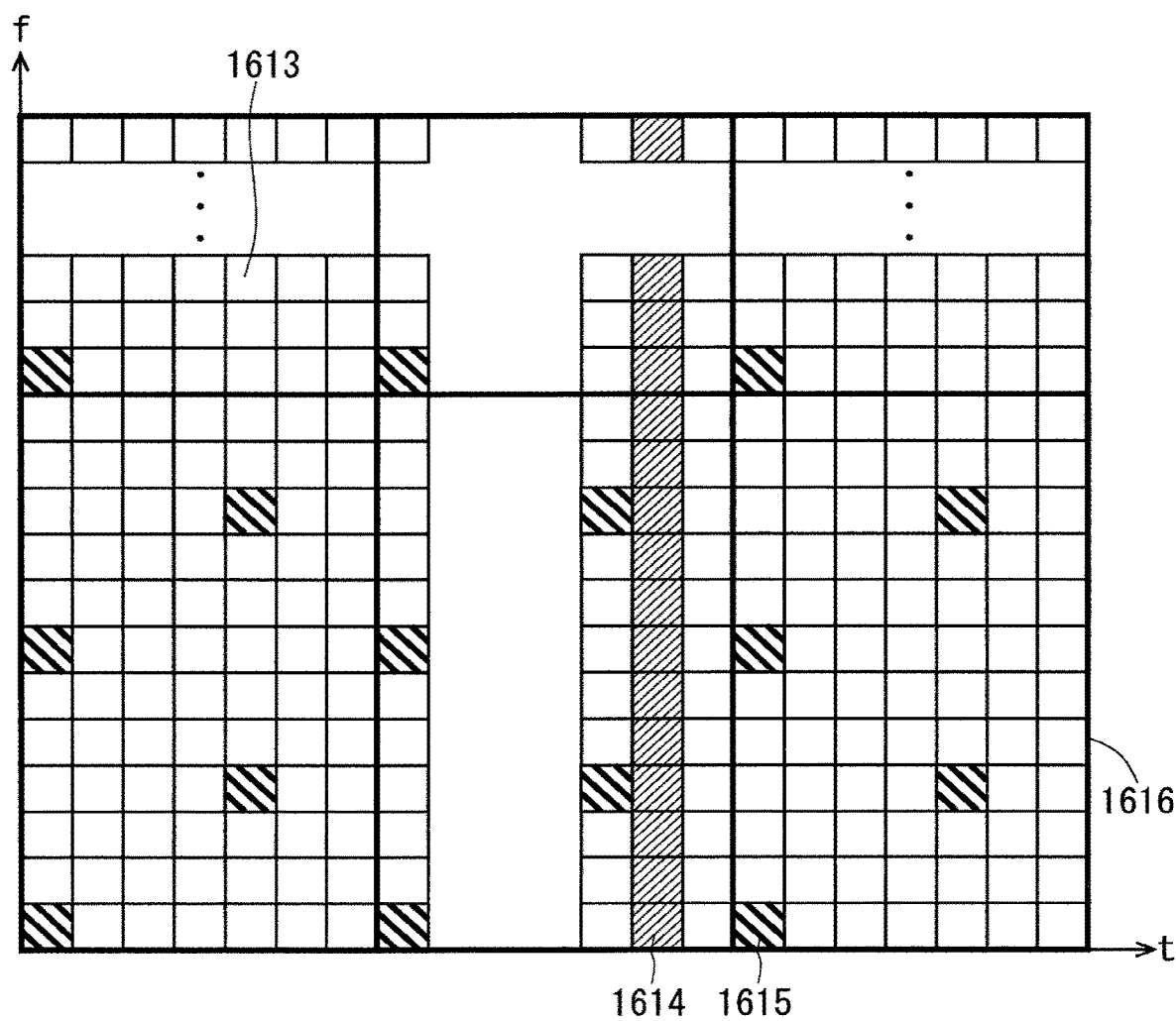
FIG. 25 further illustrates another example mapping in the transmission data of the fourth antenna element.

FIG. 22 further illustrates another example mapping in the transmission data of the first antenna element. FIG. 23 further illustrates another example mapping in the transmission data of the second antenna element. FIG. 24 further illustrates another example mapping in the transmission data of the third antenna element. FIG. 25 further illustrates another example mapping in the transmission data of the fourth antenna element.

In FIGS. 22, 23, 24, and 25, references "1604", "1608", "1612", and "1616" denote resource blocks, and references "1601", "1605", "1609", and "1613" denote normal OFDM symbols, respectively.

As illustrated in FIGS. 22, 23, 24, and 25, possible positions of cal-RSs 1602, 1606, 1610, and 1614 may be defined in advance only with the timing that does not overlap CRSs 1603, 1607, 1611, and 1615, respectively. Here, the cal-RSs can be arranged, for example, only between the first OFDM symbol and the third OFDM symbol or between the fourth OFDM symbol and the fifth OFDM symbol in each slot.

Figure 26:
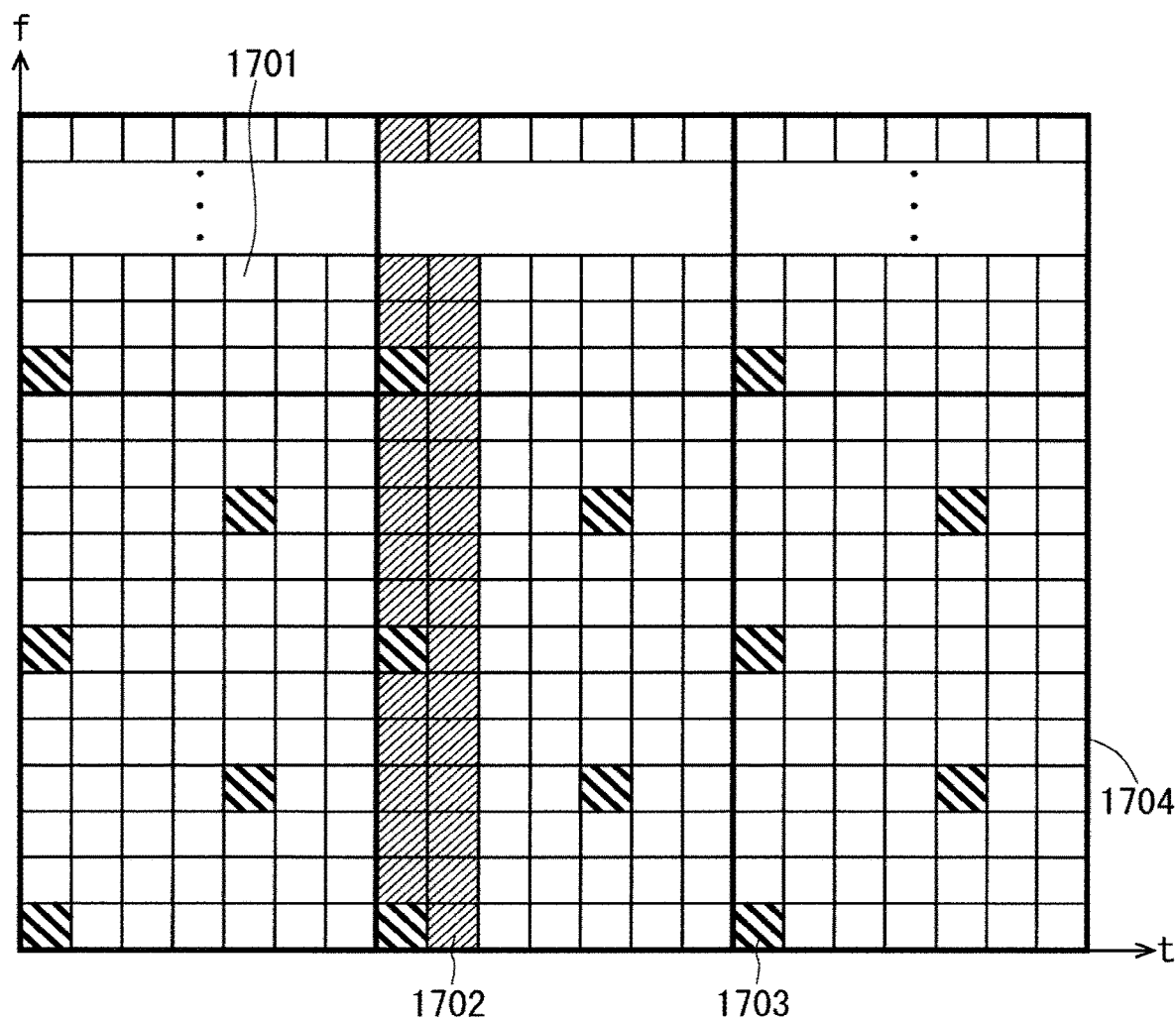
FIG. 26 further illustrates another example mapping of transmission data in the transmission data of the first antenna element.

FIG. 26 further illustrates another example mapping of transmission data in the transmission data of the first antenna element. FIG. 27 further illustrates another example mapping in transmission data of the second antenna element to the n-th antenna element. In FIGS. 26 and 27, references "1704" and "1708" denote resource blocks, and references "1701" and "1705" denote normal OFDM symbols, respectively. Furthermore, in FIG. 27, a reference "1706" denotes a null.

As illustrated in FIGS. 26 and 27, cal-RSs 1702 may be mapped to positions that do not overlap mapping positions of CRSs 1703 and 1707, respectively. With this, a collision can be avoided.

Alternatively, as illustrated in FIGS. 20 and 21, when cal-RSs overlap the other CHs or the other RSs, the cal-RSs may be preferentially arranged.

As described above, the PHY processing unit that is a calibration unit arranges the cal-RSs in positions where the other reference signals or the other physical channels of a subframe are not arranged according to the third embodiment. Accordingly, since the timing of transmitting the cal-RSs can be prevented from overlapping the timing of transmitting the other reference signals or the other physical channels, the cal-RSs can avoid a collision with the other reference signals or the other physical channels.

Fourth Embodiment

The third embodiment discloses providing a subframe for calibration and transmitting RSs for calibration (cal-RSs) on the subframe. A base station may not transmit the other channels (abbreviated as CHs) or the other RSs on the subframe. The subframe for calibration of not transmitting the other CHs or the other RSs will be referred to as a calibration-specific subframe.

However, the base station normally transmits some physical CHs or RSs that are not intended for calibration, every subframe. Thus, without any ingenuity, a problem with incapability to configure a calibration-specific subframe occurs. The fourth embodiment will disclose a method for solving such a problem.

A base station sets a subframe having no data to be transmitted to a calibration-specific subframe. The base station may set a subframe having no data to be scheduled to a calibration-specific subframe. The base station sets one or more subframes included in subframes having no data to be transmitted or scheduled to calibration-specific subframes. The one or more subframes may be determined according to the necessity of the calibration-specific subframes.

The base station determines a radio link at which the calibration-specific subframe is set. For example, when there is no data to be scheduled in a DL subframe, the DL subframe is set to a calibration-specific subframe. Alternatively, when there is no data to be scheduled in a UL subframe, the UL subframe may be set to a calibration-specific subframe. Alternatively, when there is no data to be scheduled in either a DL subframe or a UL subframe with the same timing as the DL subframe, at least one of the DL subframe and the UL subframe may be set to a calibration-specific subframe.

The base station may determine in advance a radio link to be calibrated. The radio link is determined in advance as, for example, the DL. Here, when there is no data to be scheduled in a DL subframe, the DL subframe is set to a calibration-specific subframe. Thus, even when there is no data to be scheduled in a UL subframe, the UL subframe is not set to a calibration-specific subframe. Here, the UL is not used for setting a calibration-specific subframe.

When a radio link to be calibrated is set to the DL, it is possible to eliminate influence of interference with the UL from a UE. For example, when a base station that supports the TDD sets a radio link to be calibrated to the DL, it can execute calibration without influence of interference caused by uplink transmission performed by a UE being served by a cell having an antenna to be calibrated and by a UE being served by another cell or another base station. Examples of the uplink transmission in the LTE include a SR and a PRACH. As such, using the DL in calibration can further improve the accuracy of calibration.

As an alternative example, a base station that supports the FDD sets radio links to be calibrated to the DL and the UL. When there is no data to be scheduled in either a DL subframe or a UL subframe with the same timing as the DL subframe, both of the DL subframe and the UL subframe are set to calibration-specific subframes. Accordingly, calibration for a transmission system and a reception system of an antenna element can be performed within these subframes, and the time required for calibration can be shortened.

The base station detects a subframe having no data to be transmitted or scheduled, and sets the subframe to a calibration-specific subframe.

The following four examples (1) to (4) will be disclosed as example subjects that detect a subframe having no data to be transmitted or scheduled.

(1) Scheduler

This option may be used when, for example, a scheduler performs scheduling. It is easy to provide the scheduler with a function of detecting the presence or absence of data to be transmitted or scheduled.

(2) MAC

This option may be used when, for example, the MAC performs scheduling. It is easy to provide the MAC with the function of detecting the presence or absence of data to be transmitted or scheduled.

(3) PHY Processing Unit

This option may be used when, for example, a subframe having no data to be transmitted is detected. It is easy to provide the PHY processing unit with a function of detecting the presence or absence of data to be transmitted.

(4) RRC

This option may be used when, for example, the RRC sets the DRX, etc. The RRC recognizes, through the DRX, a subframe on which data is not transmitted or scheduled. Thus, it is easy to provide the RRC with the function of detecting the presence or absence of data to be transmitted or scheduled.

The following four examples (1) to (4) will be disclosed as example subjects that set the detected subframe to a calibration-specific subframe.

(1) Scheduler

This option may be used when, for example, a scheduler, the MAC, or the RRC detects the presence or absence of data to be transmitted or scheduled. When the scheduler, the MAC, or the RRC detects the absence of the data, the scheduler is notified of the absence of the data. The scheduler sets the subframe detected using the information to a calibration-specific subframe.

(2) MAC

The scheduler described in (1) above may be replaced with the MAC.

(3) PHY Processing Unit

This option may be used when, for example, the scheduler, the MAC, the PHY processing unit, or the RRC detects the presence or absence of data to be transmitted or scheduled. When the scheduler, the MAC, the PHY processing unit, or the RRC detects the absence of the data, the PHY processing unit is notified of the absence of the data. The PHY processing unit sets the subframe detected using the information to a calibration-specific subframe.

(4) RRC

This option may be used when, for example, the RRC detects the presence or absence of data to be transmitted or scheduled. When the RRC detects the absence of the data, it sets the subframe detected using the information to a calibration-specific subframe.

Aside from these, the subjects that detect a subframe having no data to be transmitted or scheduled and the subjects that set a subframe to a calibration-specific subframe may be appropriately combined. The subjects may be combined according to a configuration of a base station and the required performance.

The base station determines which antenna element is to be calibrated. The base station determines which antenna element is categorized as a transmission antenna element for calibration or as a reception antenna element for calibration.

The base station maps RSs for calibration (cal-RSs) of the transmission antenna element for calibration to a calibration-specific subframe. Cal-RSs of a plurality of antenna elements may be mapped to one calibration-specific subframe. The PHY processing unit may map the cal-RSs using information on a calibration-specific subframe.

The subject that sets a calibration-specific subframe may notify the PHY processing unit of the information on the calibration-specific subframe. The base station transmits cal-RSs of a transmission antenna for calibration on the calibration-specific subframe.

The RSs for calibration may not be specific to calibration. The RSs may be used for other applications. Alternatively, the existing RSs may be used instead. Examples of the existing RSs include CRSs, CSI-RSs, and sounding reference signals (SRS), etc. Which RSs are to be used may be determined in advance, and the RSs may be mapped to a calibration-specific subframe. A sequence or a resource to be mapped has already been determined for the existing RSs. Since no new RS is set, the complexity of a communication system can be avoided.

Furthermore, the calibration-specific subframes may be used for other applications. The RSs to be used for other applications may be mapped to a calibration-specific subframe. The method disclosed in the fourth embodiment is applicable.

A base station that transmits cal-RSs from a transmission antenna element for calibration on a calibration-specific subframe receives the cal-RSs on the calibration-specific subframe through a reception antenna element for calibration. The base station derives a calibration value for a transmission system of an antenna element, using a reception result of the cal-RSs for each transmission antenna element for calibration.

The base station may calibrate a reception system of an antenna element in a similar method. The base station that transmits cal-RSs from a transmission antenna element for calibration on a calibration-specific subframe receives the cal-RSs on the calibration-specific subframe through a reception antenna element for calibration. The base station derives a calibration value for the reception system of the antenna element, using a reception result of the cal-RSs for each reception antenna element for calibration.

Figure 28:
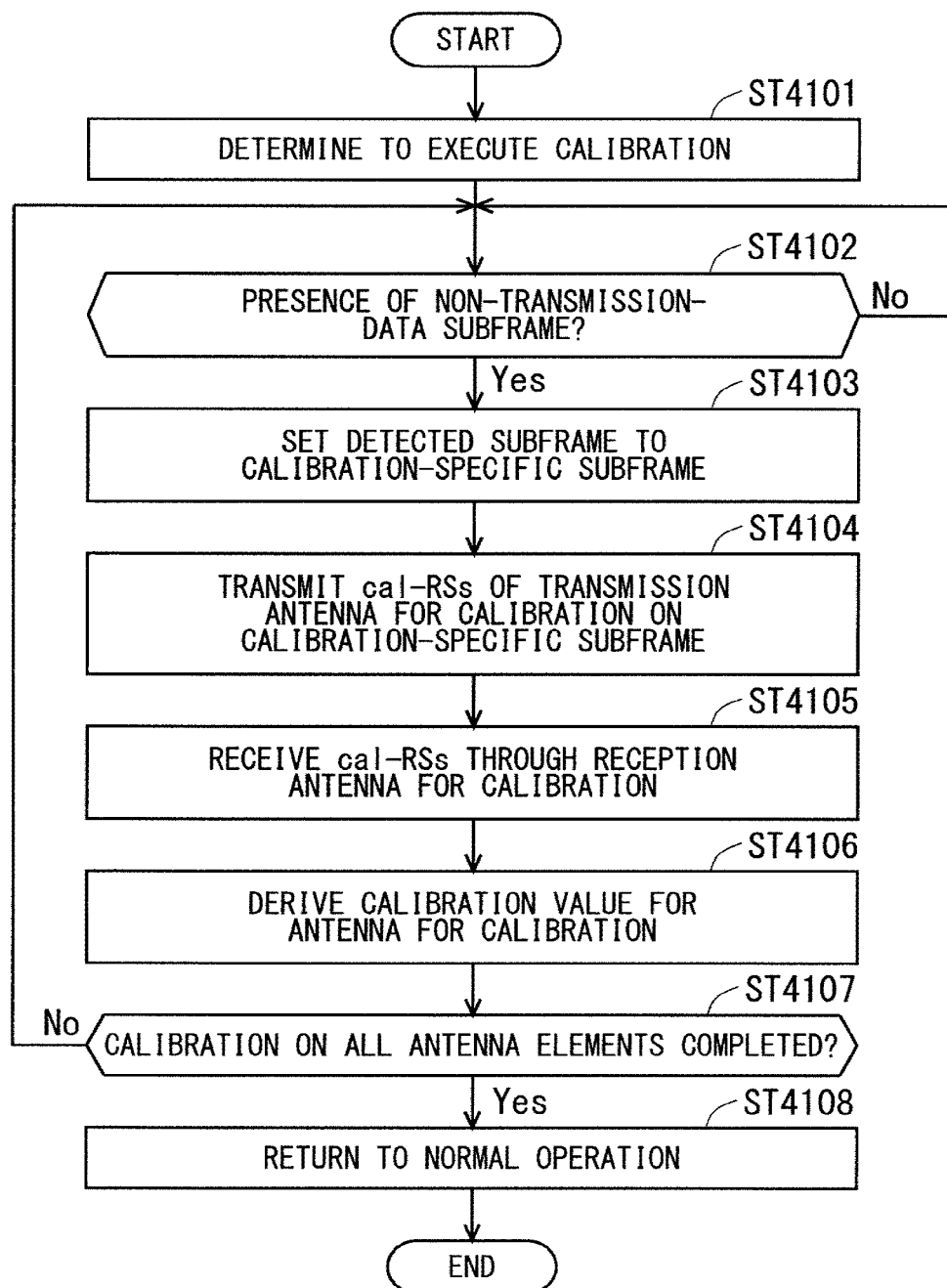
FIG. 28 is a flowchart indicating an example procedure on calibration processes in a communication system according to a fourth embodiment.

FIG. 28 is a flowchart indicating an example procedure on calibration processes in the communication system according to the fourth embodiment. FIG. 28 illustrates an example self-calibration in a base station.

In Step ST4101, the base station determines to execute calibration. The judgment indicators disclosed in the first embodiment may be used in this determination.

In Step ST4102, the base station determines the presence or absence of a subframe having no data to be transmitted (may be hereinafter referred to as "non-transmission-data subframe"). This determination may be made, for example, per subframe. This determination may be made per a plurality of subframes. When the presence of a non-transmission-data subframe is determined, the processes proceed to Step ST4103. When the absence of the non-transmission-data subframe is determined, the processes will be put on hold until the presence of the non-transmission-data subframe is determined.

In Step ST4103, the base station sets the subframe detected in Step ST4102 to a calibration-specific subframe.

In Step ST4104, the base station maps RSs for calibration (cal-RSs) of a transmission antenna element for calibration to the calibration-specific subframe. Here, the base station may determine which antenna element is categorized as a transmission antenna element for calibration or as a reception antenna element for calibration. More specifically, in Step ST4104, the base station transmits the cal-RSs of the transmission antenna for calibration on the calibration-specific subframe.

In Step ST4105, the base station receives the cal-RSs on the calibration-specific subframe through a reception antenna element for calibration.

In Step ST4106, the base station derives a calibration value for a transmission system of an antenna element, using a reception result of the cal-RSs for each transmission antenna element for calibration.

In Step ST4107, the base station determines whether calibration on all the antenna elements is completed. When the completion of the calibration on all the antenna elements is determined, the processes proceed to Step ST4108. If it is determined that the calibration on all the antenna elements has not been completed, the processes return to Step ST4102 to perform the aforementioned processes on an antenna element that has not been calibrated. The processes may be performed until completion of the calibration of transmission systems and reception systems of all the antenna elements.

In Step ST4108, the processes return to a normal operation. In the normal operation, the calibration ends, and a normal communication service is provided to user equipments being served. The entire procedure ends after the process in Step ST4108.

Using the method disclosed in the fourth embodiment, a base station can be equipped with a subframe for calibrating a multi-element antenna. Accordingly, the base station can calibrate antenna elements. Thus, the performance of the MIMO and the beamforming using the multi-element antenna can be improved.

The fourth embodiment discloses that a base station sets a subframe having no data to be transmitted or scheduled to a calibration-specific subframe. As an alternative method, the subframe having no data to be transmitted or scheduled may be replaced with a subframe whose data to be transmitted or scheduled is smaller than or equal to a predetermined amount of data. With a small amount of data, calibration can be preferentially executed.

The predetermined amount of data may be determined in advance or set according to an operational environment and an operational state. The predetermined amount of data is set, for example, according to an ambient temperature. Alternatively, the predetermined amount of data is set, for example, according to a load of a base station. When the subframe has data smaller than or equal to the predetermined amount of data, it means that the subframe has data to be transmitted or scheduled. A method, which will be disclosed in the second modification of the fourth embodiment, for storing data not to be transmitted and transmitting the data stored with the timing capable of subsequent transmission of data may be applied to handling of this transmission data.

Accordingly, calibration can be executed flexibly according to the operational environment. Thus, the performance of the MIMO and the beamforming using the multi-element antenna can be improved.

According to the fourth embodiment, the PHY processing unit that is a calibration unit sets a subframe having no data to be transmitted or scheduled to a cal-specific subframe that is a subframe in which cal-RSs are arranged. Accordingly, even in the presence of data to be transmitted or scheduled, the cal-specific subframe can be configured. Thus, the calibration with higher accuracy can be performed as described above.

First Modification of the Fourth Embodiment

The fourth embodiment discloses setting a subframe having no data to be transmitted or scheduled to a calibration-specific subframe. However, some systems may have a subframe to which a signal and a CH to be transmitted irrespective of transmission data are mapped.

Examples of the signal and the CH to be transmitted irrespective of transmission data include a synchronization signal required for initial search by a UE, a broadcast-information transmission CH, and a control CH, etc. Examples of the signal and the CH in the LTE include an SS, a PBCH, and a PDCCH.

In the presence of the signal and the CH, a problem with incapability to configure a calibration-specific subframe even according to the method of the fourth embodiment occurs. The first modification will disclose a method for solving this problem.

The base station sets a subframe to which the signal and the CH to be transmitted irrespective of transmission data are not mapped, to a calibration-specific subframe. The base station sets one or more subframes included in subframes to which the signal and the CH to be transmitted irrespective of transmission data are not mapped, to calibration-specific subframes. The one or more subframes may be determined according to the necessity of the calibration-specific subframes.

Among the signals and the CHs to be transmitted irrespective of transmission data, this method may be applied to, for example, a signal and a CH for which the subframe where they are scheduled is determined in advance, and a signal and a CH to be periodically or intermittently scheduled. These signals and CHs in the LTE include an SS and a PBCH. The subframe to which these signals and CHs are not mapped may be set to a calibration-specific subframe.

Another method will be disclosed. In the presence of a subframe having no data to be transmitted or scheduled, a base station does not transmit, on the subframe, the signal and the CH to be transmitted irrespective of transmission data. Among the signals and the CHs to be transmitted irrespective of transmission data, this method may be applied to a signal and a CH for which the subframe where they are scheduled is not determined in advance, or a signal and a CH to be transmitted every subframe.

These signals and CHs in the LTE include a PDCCH, a PCFICH, and a CRS. The base station may not transmit, on one or more subframes included in subframes having no data to be transmitted or scheduled, the signal and the CH to be transmitted irrespective of transmission data.

The base station sets a subframe on which the signal and the CH to be transmitted irrespective of transmission data are not transmitted, to a calibration-specific subframe. Furthermore, this method may be applied to a signal and a CH for which the subframe where they are scheduled is determined in advance, and a signal and a CH to be periodically or intermittently scheduled. This method is applied to, for example, a case where calibration is required with timing having no transmission data, etc. Accordingly, the calibration timing can be optimized, and the accuracy of calibration can be improved.

In the presence of a subframe having no data to be transmitted or scheduled, when the subframe is set to a calibration-specific subframe, the base station may not transmit, on the subframe, a signal and a CH to be transmitted irrespective of transmission data. Accordingly, when the subframe is not set to a calibration-specific subframe, the base station can transmit, on the subframe, a signal and a CH to be transmitted irrespective of transmission data, and maintain a normal operation.

The above two methods may be combined. Accordingly, the base station can set a calibration-specific subframe even in the presence of a signal and a CH for which the subframe where they are scheduled is determined in advance, a signal and a CH to be periodically or intermittently scheduled, a signal and a CH for which the subframe where they are scheduled is not determined in advance, or a signal and a CH to be transmitted every subframe.

The methods according to the fourth embodiment may be applied to a method for determining a radio link at which a calibration-specific subframe is set, a method for detecting a subframe to which a signal and a CH to be transmitted irrespective of transmission data are not mapped, and a method for setting a calibration-specific subframe. The transmission data may be replaced with the signal and the CH to be transmitted irrespective of the transmission data.

FIG. 29 is a flowchart indicating an example procedure on calibration processes in a communication system according to the first modification of the fourth embodiment. FIG. 29 illustrates an example self-calibration in a base station. Since the flowchart of FIG. 29 includes the same steps as those in the flowchart of FIG. 28 as described above, the same step numbers will be assigned to the same Steps and the common description thereof will be omitted.

After determining to execute calibration in Step ST4101, if the absence of a non-transmission-data subframe is determined in Step ST4102, the base station waits until the presence of the non-transmission-data subframe is determined. If the presence of the non-transmission-data subframe is determined in Step ST4102, the processes proceed to Step ST4201.

In Step ST4201, the base station determines whether the SS and the PBCH are not transmitted on the subframe detected in Step ST4102. If it is determined that the SS and the PBCH are not transmitted on the detected subframe, the processes proceed to Step ST4103. If it is determined that the SS and the PBCH are transmitted on the detected subframe, the processes return to Step ST4102, and will be put on hold until the presence of the non-transmission-data subframe is determined.

In Step ST4103, the base station sets the subframe detected in Step ST4102 to a calibration-specific subframe. After the detected subframe is set to a calibration-specific subframe, the processes proceed to Step ST4202.

In Step ST4202, the base station stops transmitting a PDCCH, a PCFICH, and a CRS on the calibration-specific subframe set in Step ST4103. After the completion of the process in Step ST4202, the processes proceed to Step ST4104.

In Step ST4104, the base station maps RSs for calibration (cal-RSs) of a transmission antenna element for calibration to the calibration-specific subframe. Here, the base station may determine which antenna element is categorized as a transmission antenna element for calibration or as a reception antenna element for calibration.

More specifically, in Step ST4104, the base station transmits the cal-RSs of the transmission antenna for calibration on the calibration-specific subframe. After the completion of the process in Step ST4104, the processes in Step ST4105 to Step ST4108 will be performed.

Even in the presence of a subframe to which a signal and a CH to be transmitted irrespective of transmission data are mapped, a subframe for calibrating a multi-element antenna can be provided using the method disclosed in the first modification.

Accordingly, a subframe for calibration can be set more flexibly than by the first embodiment. A calibration-specific subframe can be set with the necessary timing such as when temperature variations suddenly become larger, etc.

Thus, since the base station can calibrate antenna elements with the necessary timing, the performance of the MIMO and the beamforming using the multi-element antenna can be further improved.

According to the method above, in the presence of a subframe having no data to be transmitted or scheduled, the base station does not transmit, on the subframe, a signal and a CH to be transmitted irrespective of transmission data. However, the signal and the CH may be muted as an alternative method. Furthermore, the transmission power may be zero.

In the presence of a subframe having no data to be transmitted or scheduled, the base station mutes, on the subframe, the signal and the CH to be transmitted irrespective of transmission data.

When the signal and the CH are not transmitted, the cal-RSs can be mapped to symbols to which the signal and the CH are to be mapped, thus enabling increase in the resource for cal-RSs.

In muting the signal and the CH, though the transmission power of the signal and the CH is zero, the signal and the CH are mapped. Thus, the resource cannot be used for the cal-RSs. Although the resource for cal-RSs cannot be increased, only the adjustment to the transmission power is required. Thus, the configuration and the control for providing a calibration function can be facilitated.

According to the method above, in the presence of a subframe having no data to be transmitted or scheduled, the base station either does not transmit on the subframe or mutes a signal and a CH to be transmitted irrespective of transmission data. However, the following process may be performed instead. Specifically, the base station may either not transmit or mute the signal and the CH that overlap a resource for transmitting cal-RSs.

As disclosed in the third embodiment, when cal-RSs overlap a signal and a CH to be transmitted irrespective of transmission data, the cal-RSs may be preferentially mapped to the resource. Accordingly, when an amount of the resource required for the cal-RSs is smaller, the signal and the CH to be transmitted irrespective of transmission data can be transmitted, and decrease in communication performance when the signal and the CH are necessary can be prevented.

Second Modification of the Fourth Embodiment

In the fourth embodiment, a subframe having no transmission data is set to a calibration-specific subframe. However, there are some cases including a case where a base station has many UEs being served thereby, a case where a huge volume of data is communicated, and a case where the timing of having no transmission data does not occur with the necessary timing. Here, waiting for the timing of having no transmission data causes problems with delay in the calibration and degradation in the performance. The second modification will disclose a method for solving such problems.

The base station controls the transmission timing of data to enable a calibration-specific subframe to be set with the necessary timing of calibration. The base station, for example, sets a calibration-specific subframe with the necessary timing of calibration without transmitting data. The base station stores data not to be transmitted, and transmits the stored data with the timing capable of subsequent transmission of data.

The base station detects the necessary timing of calibration. The timing may be detected by, for example, the control unit 806 disclosed according to the first embodiment.

The base station may determine whether it is necessary to stop transmitting data with the necessary timing of calibration. The determination may be made, as a judgment criterion, depending on the presence or absence of data to be transmitted with the timing. The base station may determine that it is unnecessary to stop transmitting data, for example, in the absence of data to be transmitted with the timing.

The judging subject may be a subject that detects a subframe having no data to be transmitted or scheduled as disclosed in the fourth embodiment. The subject is enabled to perform the judgment by obtaining information on the necessary timing of calibration from the control unit 806.

When it is unnecessary to stop transmitting data, a calibration-specific subframe is set with the timing. The method disclosed in the fourth embodiment may be applied thereto. When there is data to be transmitted with the necessary timing of calibration, the base station stops transmitting data, and sets a calibration-specific subframe.

The base station may determine the presence or absence of a signal and a CH to be transmitted irrespective of transmission data, with the necessary timing of calibration.

The method disclosed in the first modification of the fourth embodiment may be applied to the determination and the setting of a calibration-specific subframe.

The first modification of the fourth embodiment describes that, in the presence of a signal and a CH for which the subframe where they are scheduled is determined in advance, and a signal and a CH to be periodically or intermittently scheduled, a subframe to which these signals and CHs are not mapped may be set to a calibration-specific subframe.

The necessary timing of calibration may or may not come within the subframe to which these signals and CHs are not mapped. If not, transmission of these signals and CHs may be stopped and a calibration-specific subframe may be set.

The base station sets a calibration-specific subframe with the necessary timing of calibration. Until completion of the calibration, the base station does not transmit data. Transmission of the data may be held.

The base station sets a calibration-specific subframe during no transmission of data. A duration during no transmission of data may be set per subframe or at transmission time intervals (TTIs).

As an alternative method, data may not be transmitted during a predetermined duration including the set calibration-specific subframe. Setting the predetermined duration as short as possible can reduce a delay in transmitting data. Furthermore, it is possible to resume earlier the transmission of a signal and a CH to be transmitted irrespective of transmission data and to minimize losses in the synchronization and the control process in the UEs being served.

When the predetermined duration is set longer than the calibration-specific subframe, detection of the necessary timing of calibration is deviated from the timing of transmitting data, and thus occurrence of events such as a malfunction can be reduced. The predetermined duration may be statically predetermined, or semi-statically or dynamically determined by a base station.

The base station stores data not to be transmitted, and transmits the stored data with the timing capable of subsequent transmission of data. The process of storing data not to be transmitted may be performed by, for example, a scheduler or the MAC. Furthermore, the process may be performed by the PHY processing unit. The scheduler, the MAC, or the PHY processing unit may perform processes of storing, in an internal or external storage device, data not to be transmitted and of retrieving the stored transmission data by the timing capable of subsequent transmission of data.

The base station maps cal-RSs of a transmission antenna for calibration to the set calibration-specific subframe, and transmits the cal-RSs on the subframe. The base station performs calibration using the calibration-specific subframe. The method disclosed in the fourth embodiment may be applied to this method.

The base station starts transmitting data with the timing capable of transmission of data, after the predetermined duration. Furthermore, the base station starts transmitting a signal and a CH to be transmitted irrespective of transmission data, after the predetermined duration. Accordingly, the base station returns to a normal operation.

Figure 30:
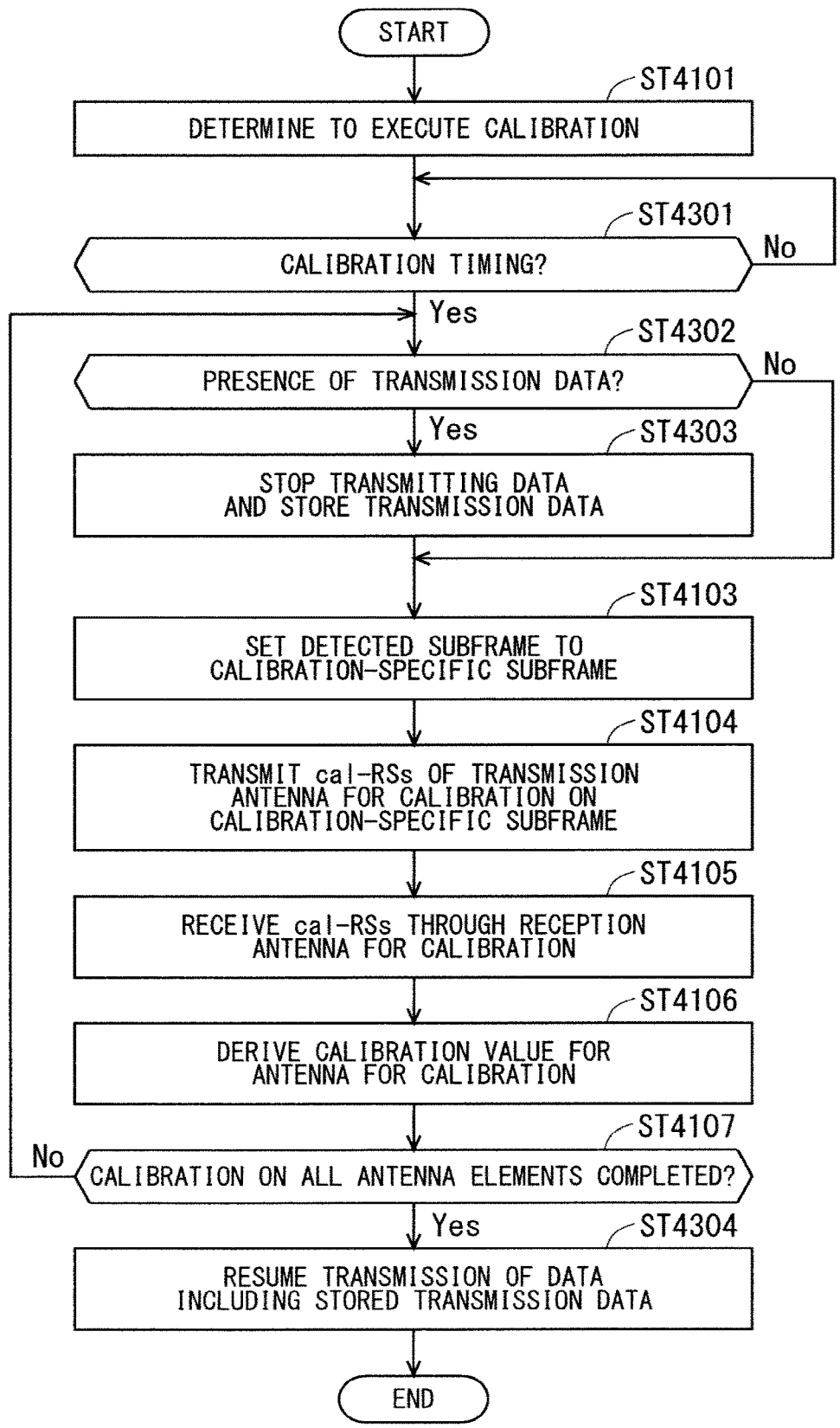
FIG. 30 is a flowchart indicating an example procedure on calibration processes in a communication system according to a second modification of the fourth embodiment.

FIG. 30 is a flowchart indicating an example procedure on calibration processes in a communication system according to the second modification of the fourth embodiment. FIG. 30 illustrates an example self-calibration in a base station. Since the flowchart of FIG. 30 includes the same steps as those in the flowchart of FIG. 28 described above, the same step numbers will be assigned to the same Steps and the common description thereof will be omitted.

After determining to execute calibration in Step ST4101, the base station determines whether the calibration timing has come in Step ST4301. If the base station determines that the calibration timing has come, the processes proceed to Step ST4302. If the base station determines that the calibration timing has not come, the processes will be put on hold until it is determined that the calibration timing has come.

In Step ST4302, the base station determines the presence or absence of transmission data. If the base station determines the presence of transmission data, the processes proceed to Step ST4303. If the base station determines the absence of transmission data, the processes proceed to Step ST4103.

In Step ST4303, the base station stops transmitting data with the calibration timing, and stores the transmission data. After completion of the process in Step ST4303, the processes proceed to Step ST4103.

The base station that stores the transmission data in Step ST4303 detects a non-transmission-data subframe with the calibration timing, and sets the detected subframe to a calibration-specific subframe in Step ST4103. After completion of the process in Step ST4103, the processes proceed to Step ST4104.

In Step ST4104, the base station maps cal-RSs of a transmission antenna for calibration to the set calibration-specific subframe, transmits the cal-RSs on the subframe, and performs calibration. Since this method is the same as that in FIG. 28, the description thereof will be omitted.

After the processes in Steps ST4105 and ST4106, if it is determined in Steps ST4107 that calibration on all the antenna elements is completed, the processes proceed to Step ST4304. If it is determined that the calibration on all the antenna elements has not been completed, the processes return to Step ST4302 to perform the aforementioned processes on an antenna element that has not been calibrated.

In Step ST4304, the base station resumes transmission of data including the stored data, with the timing capable of transmission of data. Accordingly, the base station returns to a normal operation. The entire procedure ends after the process in Step ST4304.

Using the method disclosed in the second modification enables setting of a calibration-specific subframe with the necessary timing of calibration, and execution of calibration on the subframe.

Accordingly, even when a base station has many UEs being served thereby or even when a huge volume of data is being communicated, it is possible to prevent degradation in the performance caused by delay in the calibration. Thus, the performance of the MIMO and the beamforming using the multi-element antenna can be further improved.

The method disclosed in the first modification of the fourth embodiment may be applied to a case where there are a signal and a CH to be transmitted irrespective of transmission data with the necessary timing of calibration. Even in the presence of the signal and the CH to be transmitted irrespective of transmission data, a calibration-specific subframe can be set with the necessary timing of calibration, and calibration can be performed on the subframe.

Although what is disclosed in the aforementioned method is that the base station stores data not to be transmitted and transmits the stored data with the timing capable of subsequent transmission of data, the method may be the others. As an alternative method, the data not to be transmitted may be prevented from being stored and transmitted. Furthermore, the data not to be transmitted may be discarded without being stored.

For example, less important data may be prevented from being stored and transmitted. Alternatively, transmission data with a smaller acceptable amount of delay may be prevented from being stored and transmitted. Examples of the data with a smaller acceptable amount of delay include audio data and real-time game data, etc. Furthermore, retransmission data may be prevented from being stored and transmitted. This is because the retransmission is performed and a problem is unlikely to occur even if the retransmission data is skipped once or so. Accordingly, the required storage capacity can be reduced.

Furthermore, the method according to the second modification of the fourth embodiment may be performed on the transmission data that can be held. Furthermore, the method according to the fourth embodiment may be performed on the transmission data that cannot be held.

Examples of the transmission data that can be held include data with a larger acceptable amount of delay. Alternatively, data with a lower QoS value or a larger QoS class identifier (QCI) value may be used. Examples of the data include buffered streaming video data and File Transfer Protocol (abbreviated as FTP) data, etc.

Examples of the transmission data that cannot be held include data with a smaller acceptable amount of delay. Alternatively, data with a higher QoS value or a smaller QCI value may be used. Such examples include audio data and real-time game data, etc.

Thus, the timing to execute calibration can be changed according to the transmission data. Accordingly, the calibration during communication can be more flexibly executed.

Although it is described that the method according to the second modification of the fourth embodiment is performed on the transmission data that can be held and the method according to the fourth embodiment is performed on the transmission data that cannot be held, the methods are not limited to such. When the execution of calibration takes priority over transmission of data, the method according to the second modification of the fourth embodiment may be performed. Furthermore, when transmission of data takes priority over the execution of calibration, the method according to the fourth embodiment may be performed. Similarly, the timing to execute calibration can be changed according to the transmission data. Accordingly, the calibration during communication can be more flexibly executed.

According to the second modification, the PHY processing unit that is a calibration unit controls the timing to transmit data to enable a subframe in which the cal-RSs are arranged to be set. Accordingly, the cal-specific subframe can be set with the necessary timing of calibration. Consequently, it is possible to prevent delay in the calibration and degradation in the performance caused by the delay in the calibration.

Third Modification of the Fourth Embodiment

The third modification will disclose another method for solving the problems described in the second modification of the fourth embodiment. The base station provides a subframe on which neither data nor a signal or a CH that are irrelevant to transmission data are transmitted. The base station provides a subframe on which nothing is transmitted. In the following description, the subframe on which nothing is transmitted may be referred to as a "complete blank subframe (CBS)". The base station maps only RSs for calibration to a CBS.

The following (1) to (6) will be disclosed as example parameters for configuring the CBS.

(1) Offset; the offset represents the start timing. For example, at least one of a start radio frame and a start subframe may be set.

(1) Duration; the duration is a duration during which the CBS occurs. For example, the number of one or more subframes may be set.

(3) Period; the period is a period with which the CBS occurs. This is useful when the CBS is periodically caused to occur. For example, at least one of the number of radio frames and the number of subframes may be set.

(4) End timing; for example, at least one of an end radio frame and an end subframe may be set. As an alternative method, a duration from the start to the end may be set. At least one of the number of radio frames and the number of subframes may be set. Furthermore, when the CBS is set to a long duration, for example, a year, a date, and a time may be set. Furthermore, the end timing may not be set. Here, once the CBS is set, the CBS is configured until a switch of a cell is turned OFF. This option is effective, for example, when the calibration continues to be executed until the switch of the cell is turned OFF.

(5) A radio link configuring the CBS; for example, at least one of the DL and the UL may be set.

(6) A combination of (1) to (5) above

Setting these parameters can identify configurations of the CBS. These configurations may be changed. In the following description, the parameter for configuring the CBS may be referred to as "CBS setting information".

The following (1) to (3) will be disclosed as example subjects that configure the CBS.

(1) The RRC
(2) The MAC
(3) The PHY Processing Unit

The base station first configures the CBS. The CBS may be configured by setting the aforementioned parameters. Accordingly, the subframe on which the CBS is configured is identified. Upon determining to execute calibration, the base station sets the CBS to a calibration-specific subframe. The base station may set the CBS with the necessary timing of calibration as an alternative method. The start timing, the end timing, and the period and the duration required for the calibration may be used to set the CBS. Furthermore, a radio link that performs calibration may be used to set the CBS. The base station sets the CBS to a calibration-specific subframe.

The base station maps cal-RSs of a transmission antenna for calibration to the set calibration-specific subframe, and transmits the cal-RSs on the subframe. Since the other signals and CHs of the cal-RSs are not mapped to the CBS, the calibration-specific subframe can be configured. Many resources can be used for calibration.

When the CBS has transmission data, the base station stops transmitting data. The transmission data may be held. The method disclosed in the second modification of the fourth embodiment may be applied to this method. Furthermore, even with occurrence of a signal and a CH to be transmitted irrespective of the transmission data, transmission of these signal and CH may be stopped.

Figure 31:
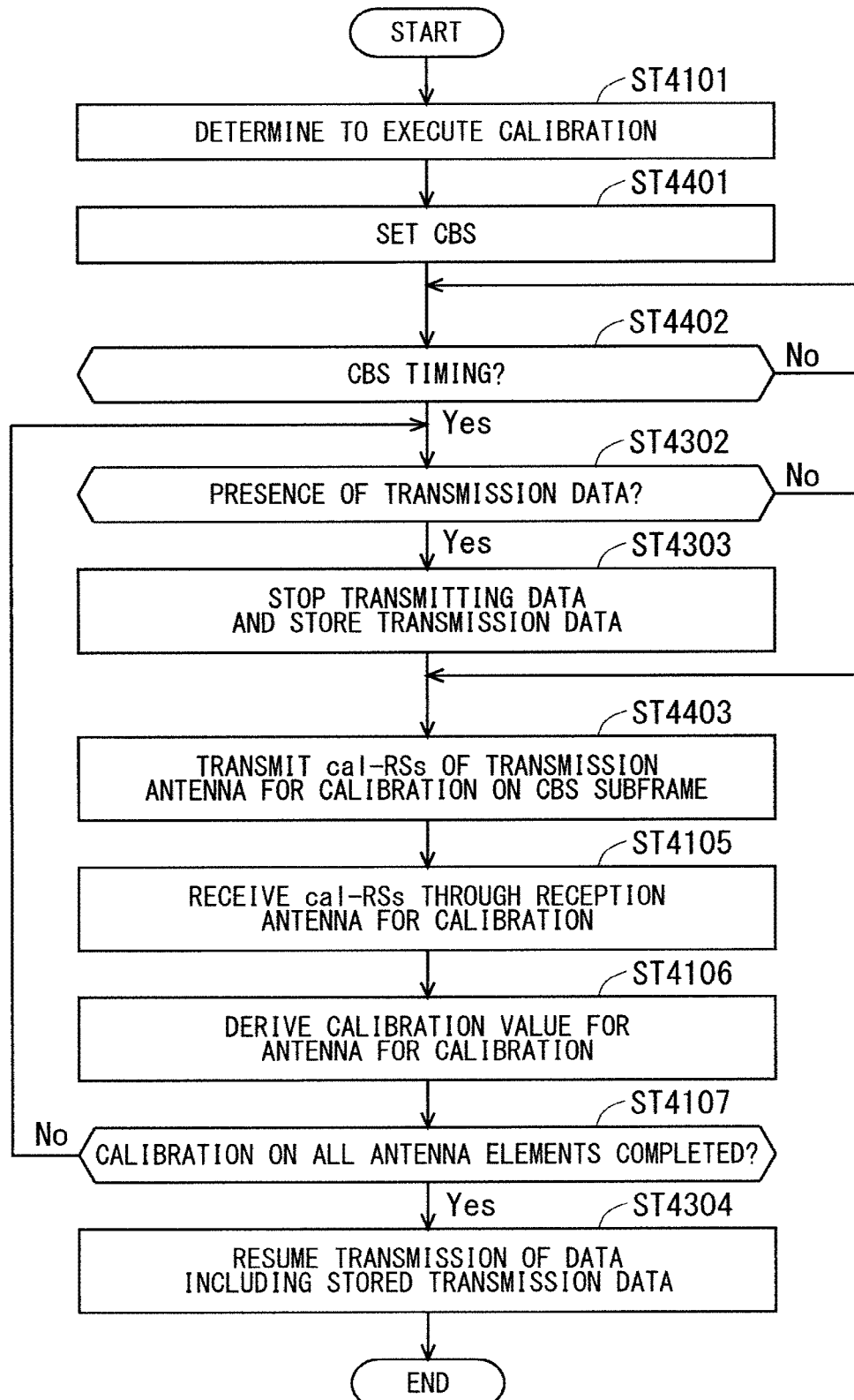
FIG. 31 is a flowchart indicating an example procedure on calibration processes in a communication system according to a third modification of the fourth embodiment.

FIG. 31 is a flowchart indicating an example procedure on calibration processes in a communication system according to the third modification of the fourth embodiment. FIG. 31 illustrates an example self-calibration in a base station. Furthermore, FIG. 31 illustrates setting of the CBS with the necessary timing of calibration. Since the flowchart of FIG. 31 includes the same steps as those in the flowcharts of FIGS. 28 and 30 as described above, the same step numbers will be assigned to the same Steps and the common description thereof will be omitted.

The base station that determines to execute calibration in Step ST4101 sets a CBS in Step ST4401. Here, the base station sets the CBS with the necessary timing of calibration and according to a radio link that performs calibration. After completion of the process in Step ST4401, the processes proceed to Step ST4402.

In Step ST4402, the base station determines whether the timing of the CBS has come. If the base station determines that the timing of the CBS has come, the processes proceed to Step ST4302. If the base station determines that the timing of the CBS has not come, the process in Step ST4402 will be repeated until the next timing of the CBS.

In Step ST4302, the base station determines the presence or absence of transmission data. If the base station determines the presence of transmission data, the processes proceed to Step ST4303. If the base station determines the absence of transmission data, the processes proceed to Step ST4403.

In Step ST4303, the base station stops transmitting data with the calibration timing, and stores the transmission data. After completion of the process in Step ST4303, the processes proceed to Step ST4403.

The base station that stores the transmission data in Step ST4303 maps cal-RSs to the CBS with the necessary timing of calibration, and transmits the cal-RSs on the CBS in Step ST4403. The base station may set the CBS with the necessary timing of calibration to a calibration-specific subframe. The base station maps cal-RSs of a transmission antenna for calibration to the set calibration-specific subframe, and transmits the cal-RSs on the subframe. After completion of the process in Step ST4403, the processes proceed to Step ST4105.

After the processes in Steps ST4105 and ST4106, if it is determined in Step ST4107 that calibration on all the antenna elements is completed, the processes proceed to Step ST4304. If it is determined that the calibration on the entire antenna has not been completed, the processes return to Step ST4302 to perform the aforementioned processes on an antenna element that has not been calibrated.

In Step ST4304, the base station resumes transmission of data including the stored data, with the timing capable of transmission of data on a subframe that is not a CBS. When the CBS end timing is set, configuring the CBS ends according to the setting. The entire procedure ends after the process in Step ST4304.

Configuring the CBS in advance using the method disclosed in the third modification can facilitate setting of a calibration-specific subframe. Furthermore, setting the CBS with the necessary timing of calibration enables execution of calibration with the necessary timing.

Accordingly, even when the base station has many UEs being served thereby or even when a huge volume of data is communicated, it is possible to prevent degradation in the performance caused by delay in the calibration. Thus, the performance of the MIMO and the beamforming using the multi-element antenna can be further improved.

The method according to the first modification of the fourth embodiment may be applied to a case where there are a signal and a CH to be transmitted irrespective of transmission data with the necessary timing of calibration. Even in the presence of the signal and the CH to be transmitted irrespective of transmission data, a calibration-specific subframe can be set with the necessary timing of calibration, and calibration can be performed on the subframe.

Although the third modification discloses configuring the CBS and using the CBS for calibration, the CBS may be used for other applications without being limited to the calibration. For example, a subframe that transmits nothing may be provided to suppress interference between cells.

Although the fourth embodiment to the third modification thereof describe the calibration to be performed by the base station, the methods disclosed in the fourth embodiment to the third modification thereof are applicable to the calibration to be performed by UEs. With application of the methods disclosed in the fourth embodiment to the third modification thereof to the calibration to be performed by UEs, the UEs can perform the calibration during their operations.

The methods disclosed in the fourth embodiment to the third modification thereof are applicable not only to the OFDM as an access scheme but also to the other access schemes. With application of the methods disclosed in the fourth embodiment to the third modification thereof to the other access schemes, a system using the other access schemes can perform the calibration during operation.

Fifth Embodiment

The third and fourth embodiments disclose providing a subframe for calibration or a calibration-specific subframe. Furthermore, the third and fourth embodiments disclose that the base station does not transmit the other CHs or RSs on the subframe.

Normally, the base station transmits an RS for demodulation and a control CH on every DL subframe. The base station transmits, for example, a CRS and a PDCCH in the LTE. The RS for demodulation is a signal for synchronization and demodulation by a UE. The control CH includes information required for the UE to receive data.

In the presence of a subframe without an RS for demodulation and a control CH, the UE cannot normally receive data on the subframe. Thus, when the UE does not recognize the timing of a subframe for calibration, the UE recognizes the presence of an RS for demodulation and a control CH on the subframe, and receives the subframe.

Here, the UE has a problem with a possible malfunction because it wrongly receives the subframe based on the assumption of the presence of transmission data, despite no actual transmission of the data on the subframe. The fifth embodiment will disclose a method for solving such a problem.

The base station notifies the UE of information on signals for calibration. The base station may notify the UE of information on a calibration-specific subframe. The UE does not need to receive data with the transmission timing of the calibration-specific subframe, using the obtained information on the calibration-specific subframe.

Examples of the information on the calibration-specific subframe include information on the timing to transmit the calibration-specific subframe. The example information is an indication indicating a subframe on which the calibration-specific subframe is transmitted.

The indication may be, for example, an indication of a subframe number or the next subframe. The indication of subframes after the n-th subframe may be "n". The indication may indicate whether the subframes are consecutive. Furthermore, the indication may indicate the number of consecutive subframes. The indication may be information obtained by combining these.

Such information is more effective when the immediacy of notifying the UE is required. Such information is effective, for example, when a subframe having no transmission data is detected and the detected subframe is set to a calibration-specific subframe, as a method for immediately notifying the UE.

Examples of the other information on the calibration-specific subframe include the CBS setting information disclosed in the third modification of the fourth embodiment. These parameters are more effective when the immediacy of notifying the UE is not required. These parameters are more effective, for example, when the necessary timing of calibration can be recognized in advance or when the CBS is configured.

Examples of the other information on the calibration-specific subframe include time stamps. The system frame number (SFN) has the upper limit value. The time stamps are effective when calibration-specific subframes are set at intervals that exceed the upper limit value. The time stamps may be managed by operation administration and maintenance (OAM) or obtained using the Global Positioning System (GPS).

A method for notifying information on a calibration-specific subframe from a base station to a UE will be disclosed. The base station notifies the UE of the information from a cell to be calibrated. The following (1) to (3) will be disclosed as specific examples of the notification method.

(1) The information is notified by the RRC signaling. The information may be broadcast to the UEs being served, or notified individually to the UEs being served. When the information is broadcast using broadcast information, many UEs can be simultaneously notified. When the information is notified individually to the UEs, it can be reliably notified via a retransmission function. This method is highly compatible with a case where, for example, each of the subject that detects a subframe having no data to be transmitted or scheduled and the subject that sets a subframe to a calibration-specific subframe as disclosed in the fourth embodiment, and the subject that configures the CBS as disclosed in the third modification of the fourth embodiment is the RRC. Furthermore, this option is more effective when information on the calibration-specific subframe does not require the immediacy of notifying the UEs.

(2) The information is notified by the MAC signaling. The information is notified individually to the UEs being served. This method is highly compatible with a case where, for example, each of the subject that detects a subframe having no data to be transmitted or scheduled and the subject that sets a subframe to a calibration-specific subframe as disclosed in the fourth embodiment, and the subject that configures the CBS as disclosed in the third modification of the fourth embodiment is the MAC or the scheduler. Furthermore, this option is more effective when information on the timing to transmit a calibration-specific subframe requires the immediacy of notifying the UEs.

(3) The information is notified by a physical control channel. The information is notified individually to the UEs being served. This method is highly compatible with a case where, for example, each of the subject that detects a subframe having no data to be transmitted or scheduled and the subject that sets a subframe to a calibration-specific subframe as disclosed in the fourth embodiment, and the subject that configures the CBS as disclosed in the third modification of the fourth embodiment is the PHY processing unit. Furthermore, this option is more effective when information on the timing to transmit a calibration-specific subframe requires the immediacy of notifying the UEs.

FIG. 32 illustrates an example sequence on calibration in a communication system according to the fifth embodiment. FIG. 32 illustrates an example method for detecting a subframe having no data to be transmitted or scheduled and setting the subframe to a calibration-specific subframe as disclosed in the fourth embodiment and the first modification of the fourth embodiment.

In Step ST5101, the base station and a UE perform normal communication. The base station that executes calibration detects a non-transmission-data subframe that is a subframe having no transmission data in Step ST5102.

In Step ST5103, the base station sets the detected subframe to a calibration-specific subframe.

In Step ST5104, the base station notifies the UE of information on the set calibration-specific subframe (hereinafter may be referred to as "calibration-specific subframe information").

In Step ST5105, the base station maps cal-RSs of a transmission antenna for calibration to the calibration-specific subframe during the subframe, and transmits the cal-RSs on the subframe.

In Step ST5106, the base station performs a normal operation after transmitting the cal-RSs on the calibration-specific subframe.

The UE obtains the calibration-specific subframe information in Step ST5104. In Step ST5107, the UE stops reception using the obtained calibration-specific subframe information, during the calibration-specific subframe.

In Step ST5108, the UE resumes the reception after the calibration-specific subframe.

In Step ST5109, the base station and the UE perform normal communication after the calibration-specific subframe.

The sequence illustrated in FIG. 32 is more effective when the immediacy of notifying the UE is required. For example, the base station detects the non-transmission-data subframe with a scheduler in Step ST5102 and sets the detected subframe to a calibration-specific subframe in Step ST5103.

The scheduler notifies the PHY processing unit of information on the set calibration-specific subframe. The PHY processing unit includes the calibration-specific subframe information in the physical control channel as control information, and notifies the UE of the information in Step ST5104. Since the scheduler recognizes the amount of data to be transmitted on the next subframe, the PHY processing unit can include information on the calibration-specific subframe detected and set by the scheduler in the physical control channel of a subframe preceding the recognized subframe as control information, and notify the UE of the information.

Accordingly, the UE can prevent occurrence of a malfunction caused by receiving a calibration-specific subframe despite no transmission of an RS for demodulation and a control CH on the subframe, and wrongly receiving the subframe based on the assumption of the presence of transmission data despite no actual transmission of the data. Thus, the base station can calibrate the multi-element antenna with the necessary timing, without causing the UE to malfunction.

FIG. 33 illustrates another example sequence on calibration in the communication system according to the fifth embodiment. FIG. 33 illustrates an example method for configuring the CBS that is disclosed in the third modification of the fourth embodiment.

In Step ST5201, the base station and the UE perform normal communication. The base station that executes calibration sets the CBS with the calibration timing in Step ST5202.

In Step ST5203, the base station notifies the UE of information on the set CBS (hereinafter may be referred to as "CBS information").

The UE that has received the CBS information in Step ST5203 notifies the base station of a CBS-information notice response in Step ST5204. The CBS-information notice response in Step ST5204 may be omitted.

The base station that has received the CBS-information notice response in Step ST5204 transmits cal-RSs on the CBS in Step ST5205. Specifically, the base station maps cal-RSs of a transmission antenna for calibration to the CBS, and transmits the cal-RSs on the CBS.

In Step ST5206 the base station obeys the CBS setting and performs a normal operation after the CBS.

The UE that has notified the base station of the CBS-information notice response in Step ST5204 stops reception on the CBS in Step ST5207. Specifically, the UE stops reception during the CBS, using the obtained CBS information.

In Step ST5208, the UE resumes the reception after the CBS. In Step ST5209, the base station and the UE perform normal communication after the CBS.

The sequence illustrated in FIG. 33 is more effective when the immediacy of notifying the UE is not required. In Step ST5202, for example, the base station causes the RRC to set the CBS. In Step ST5203, the RRC notifies the UE of the CBS information included in the RRC signaling.

The UE that has received the RRC signaling may perform reception-stop control on the CBS through the RRC, using the obtained CBS information. The RRC in the UE may notify the MAC or the PHY processing unit of the timing of the CBS to stop receiving data on the subframe. Accordingly, the control by the RRC becomes possible.

For example, when information is sent individually to the UEs being served, each of the UEs may notify the base station of the CBS-information notice response, whereas when information is broadcast to the UEs being served, each of the UEs may not notify the base station of the CBS-information notice response. Accordingly, the UEs can stop reception during the CBS.

Accordingly, the UE can prevent occurrence of a malfunction caused by receiving the CBS despite no transmission of an RS for demodulation and a control CH on the subframe, and wrongly receiving the subframe based on the assumption of the presence of transmission data despite no actual transmission of the data. Thus, the base station can calibrate the multi-element antenna with the necessary timing, without causing the UE to malfunction.

The UE may communicate with another base station (cell) during a calibration-specific subframe. Alternatively, the UE may measure the other base station (cell). The operations of the UE during the calibration-specific subframe may be predetermined as a system. Alternatively, the base station may determine the operations of the UE during the calibration-specific subframe and notify the UE of the operations. This notice may be notified together with information on the calibration-specific subframe. Accordingly, the UE can use the subframe for other applications.

Furthermore, the base station may notify adjacent base stations of information on a calibration-specific subframe. This notice may be notified by the X2 signaling. Accordingly, the adjacent base stations can recognize the existence of the calibration-specific subframe, and resources on the time axis or the frequency axis. Furthermore, the adjacent base stations can recognize the absence of transmission data and the absence of a CH and an RS to be transmitted irrespective of the transmission data, on the calibration-specific subframe. Thus, for example, data for the UEs being served can be scheduled using the subframe, without any concern about interference with adjacent base stations.

Furthermore, the base station may notify a core network side node of information on the calibration-specific subframe. During the calibration in the base station, the core network side node may notify the information on the calibration-specific subframe that is obtained from the base station, to a base station that requires some special operations. These notices may be notified by the S1 signaling. Accordingly, the same advantages as those when information on the calibration-specific subframe is notified to the adjacent base stations can be produced.

The fifth embodiment may be applied not only to the self-calibration but also to the OTA calibration. In the OTA, for example, the base station transmits signals for calibration (cal-RSs), and the UE receives the signals and derives a calibration value. Thus, transmitting information on the signals for calibration from the base station enables the UE to receive the signals and derive the calibration value from the received signals.

For example, in Step ST5107 of FIG. 32, the UE may receive the signals for calibration during the calibration-specific subframe, without stopping reception. The UE derives the calibration value using the received signals for calibration.

Furthermore, similarly in Step ST5207 of FIG. 33, the UE may receive the signals for calibration on the CBS, without stopping reception on the CBS. The UE derives the calibration value using the received signals for calibration on the CBS. The UE may notify the base station of the derived calibration value. Accordingly, the base station can perform the OTA calibration of a transmission system antenna.

When a reception system is calibrated, the base station may instruct the UE to transmit signals for calibration. The base station may include the instruction information in information on the signals for calibration or information on a calibration-specific subframe and then may notify the UE of the information. Alternatively, the information may be notified by another signaling.

The UE that has received the instruction information, for example, transmits the signals for calibration on the subframe derived from the obtained information on the calibration-specific subframe. Upon receipt of the signals for calibration transmitted from the UE on the calibration-specific subframe, the base station derives the calibration value.

For example, in Step ST5104 of FIG. 32, the base station notifies the UE of information on the calibration-specific subframe which includes information instructing transmission of the signals for calibration on the subframe. The UE that has received the information transmits the signals for calibration on the calibration-specific subframe in Step ST5107.

The base station may receive the signals for calibration on the calibration-specific subframe in Step ST5105. The base station derives the calibration value using the received signals for calibration.

Similarly in Step ST5203 of FIG. 33, the base station notifies the UE of information on the CBS which includes information instructing transmission of the signals for calibration on the subframe. The UE that has received the information transmits the signals for calibration on the calibration-specific subframe in Step ST5207.

The base station may receive the signals for calibration on the calibration-specific subframe in Step ST5205. The base station derives the calibration value using the received signals for calibration. Accordingly, the base station can perform the OTA calibration of a transmission system antenna.

As described above, application of the fifth embodiment to the OTA calibration enables ease of coordination for calibration between the base station and the UE, for example, ease of matching the calibration timing and the recognition of resources, etc. Thus, the OTA calibration can be easily performed during the operations.

As described above, a communication terminal is configured not to receive a subframe in which cal-RSs are arranged, according to the fifth embodiment. Accordingly, a malfunction of the communication terminal can be prevented.

First Modification of the Fifth Embodiment

The first modification will disclose another method for solving the problems in the fifth embodiment. The base station configures the UEs being served thereby not to receive a calibration-specific subframe. The DRX is used in this setting. The base station configures the DRX so that the UEs being served thereby do not receive data on a calibration-specific subframe. The base station configures the DRX so that the UEs being served thereby are in inactivity on the calibration-specific subframe.

Alternatively, the base station configures the DRX so that the UEs being served thereby are not active on the calibration-specific subframe. Furthermore, the base station may not transmit data to the UEs being served thereby on the calibration-specific subframe to enable configuration of the calibration-specific subframe during inactivity of the configured DRX.

The base station notifies the UEs being served thereby of the DRX configuration. The notification method defined in the conventional standards can be applied to this notification of the DRX configuration.

The UEs being served do not receive data from the own cells during inactivity of the configured DRX. Thus, the UEs do not receive data while the base station is executing calibration.

Accordingly, the UE can prevent occurrence of a malfunction caused by receiving the calibration-specific subframe despite no transmission of an RS for demodulation and a control CH on the subframe, and wrongly receiving the subframe based on the assumption of the presence of transmission data despite no actual transmission of the data. Thus, the base station can calibrate the multi-element antenna with the necessary timing, without causing the UE to malfunction.

Furthermore, the UE does not need any special processes on the calibration, with the use of the existing function. Furthermore, using the existing notification method, there is no need to notify the UE of particular signaling for calibration.

Another setting method will be disclosed. A measurement gap is used as the setting method. The base station configures a measurement gap so that the UEs being served thereby do not receive data on a calibration-specific subframe. The base station configures a measurement gap to include a calibration-specific subframe, for the UEs being served thereby.

The base station notifies the UEs being served thereby of the measurement gap configuration. The notification method defined in the conventional standards can be applied to this notification of the measurement gap configuration. When the DL is used for calibration, a measurement gap for the DL may be configured. When the UL is used for calibration, a measurement gap for the UL may be configured.

The UEs being served do not receive data from the own cells during the configured measurement gap. Thus, the UEs do not receive data while the base station is executing calibration. The UEs can produce the same advantages as described above.

Although the DRX is configured only in the DL, the measurement gap can be set also in the UL. Thus, even when calibration is performed in the UL, using the measurement gap is effective.

The methods disclosed in the fifth embodiment and the first modification thereof are applicable not only to the OFDM as an access scheme but also to the other access schemes.

Sixth Embodiment

The third embodiment discloses arranging RSs for calibration, and other CHs or other RSs in the same subframe. The sixth embodiment will disclose the specific examples.

A base station uses a physical downlink shared channel region for transmitting cal-RSs. The base station maps the cal-RSs to the physical downlink shared channel region. A physical downlink shared channel is not mapped to the symbols to which the cal-RSs are mapped. The rate matching and coding may be performed so that the physical downlink shared channel is not mapped to the symbols to which the cal-RSs are mapped.

Alternatively, after mapping a physical downlink shared channel to a physical downlink shared channel region, the base station may replace the symbols to which cal-RSs are mapped with the cal-RSs. The base station does not transmit the physical downlink shared channel on the symbols to which the cal-RSs are mapped.

Accordingly, the RSs for calibration can be orthogonal to the other CHs and the other RSs in a frequency domain and a time domain. Thus, the RSs for calibration, the other CHs, and the other RSs can be arranged in the same subframe, and calibration can be performed during communication.

Figure 34:
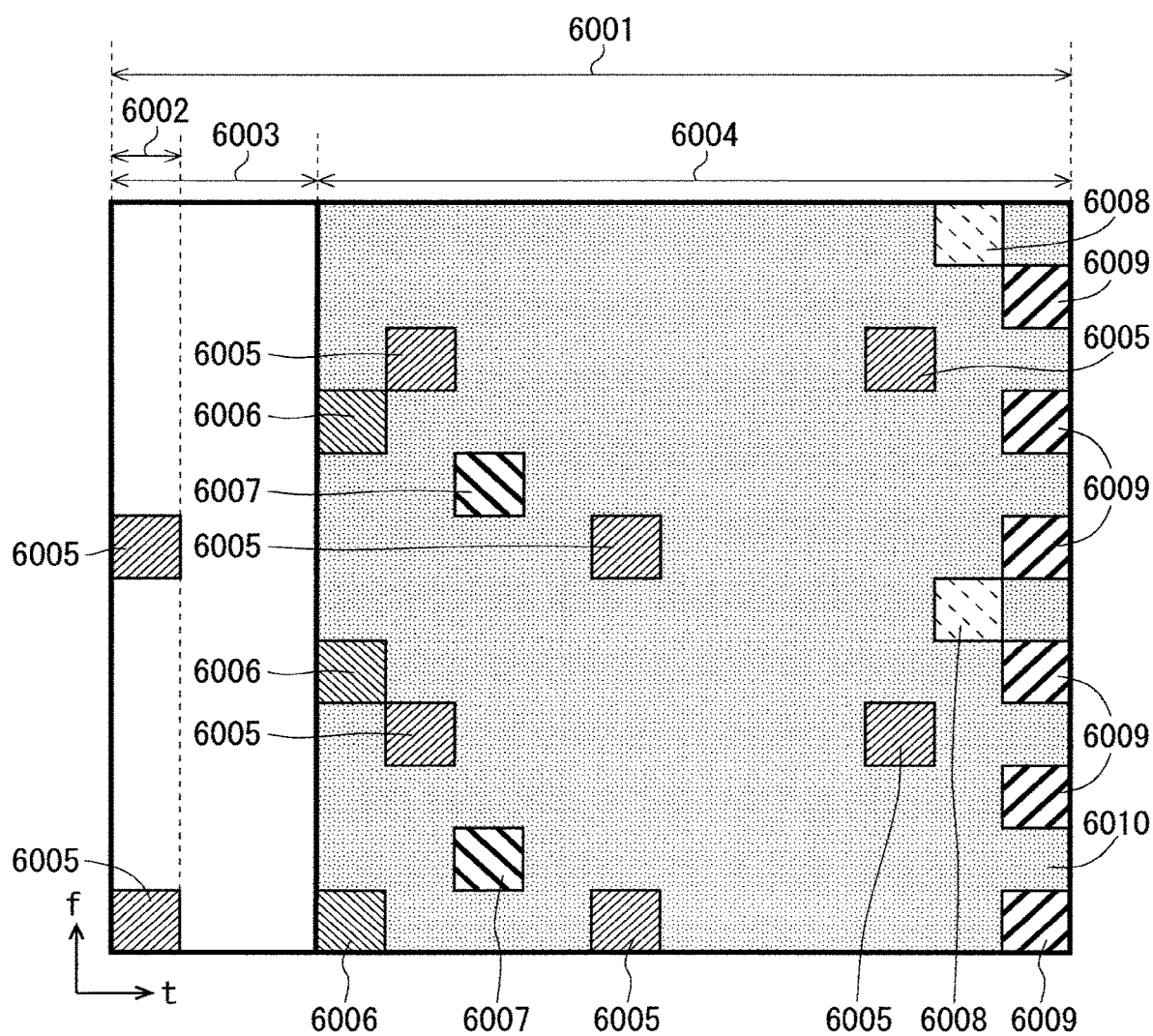
FIG. 34 illustrates an example configuration of a subframe when cal-RSs are mapped to a physical downlink shared channel region.

FIG. 34 illustrates an example configuration of a subframe when cal-RSs are mapped to a physical downlink shared channel region. The horizontal axis represents a time t, and the vertical axis represents a frequency f in FIG. 34. FIG. 34 illustrates an example in the LTE. In FIG. 34, a reference "6001" denotes a subframe, and a reference "6002" denote symbol timing. In one subframe, the first 3 symbols form a PDCCH region 6003, and the subsequent 11 symbols form a PDSCH region 6004.

CRSs 6005 are mapped over the PDCCH region 6003 and the PDSCH region 6004. A PDCCH and a PCFICH, etc. are mapped to the PDCCH region 6003. PDSCHs are mapped to the PDSCH region 6004.

FIG. 34 illustrates an example of mapping cal-RSs to the PDSCH region 6004. Cal-RSs 6006 of a first antenna element #1, cal-RSs 6007 of a second antenna element #2, cal-RSs 6008 of a third antenna element #3, and cal-RSs 6009 of a fourth antenna element #4 are mapped to the PDSCH region 6004. PDSCHs 6010 are mapped to the other symbols.

Such mapping of the cal-RSs 6006 to 6009 to the PDSCH region 6004 enables mapping of the cal-RSs 6006 to 6009, the PDSCHs 6010, the PDCCH, and the CRSs 6005 within the same subframe. The base station can transmit the cal-RSs 6006 to 6009, the PDSCHs, the PDCCH, and the CRSs 6005 on the same subframe. Thus, calibration is possible during the data communication with the UE.

Another method will be disclosed. The base station may not map a physical downlink shared channel to a slot or a subframe to which cal-RSs are mapped. The methods disclosed in the fourth embodiment and the second modification of the fourth embodiment may be applied to handling of the transmission data on the subframe.

The base station may map cal-RSs to a subframe except for subframes to which physical downlink shared channels where a paging channel, a broadcast channel, or a random access response is mapped are mapped. The base station may not map a physical downlink shared channel over the entire frequency domain with the symbol timing to map the cal-RSs. The base station may map the cal-RSs with the symbol timing different from that of a synchronization signal, a physical broadcast channel, or the other RSs.

Figure 35:
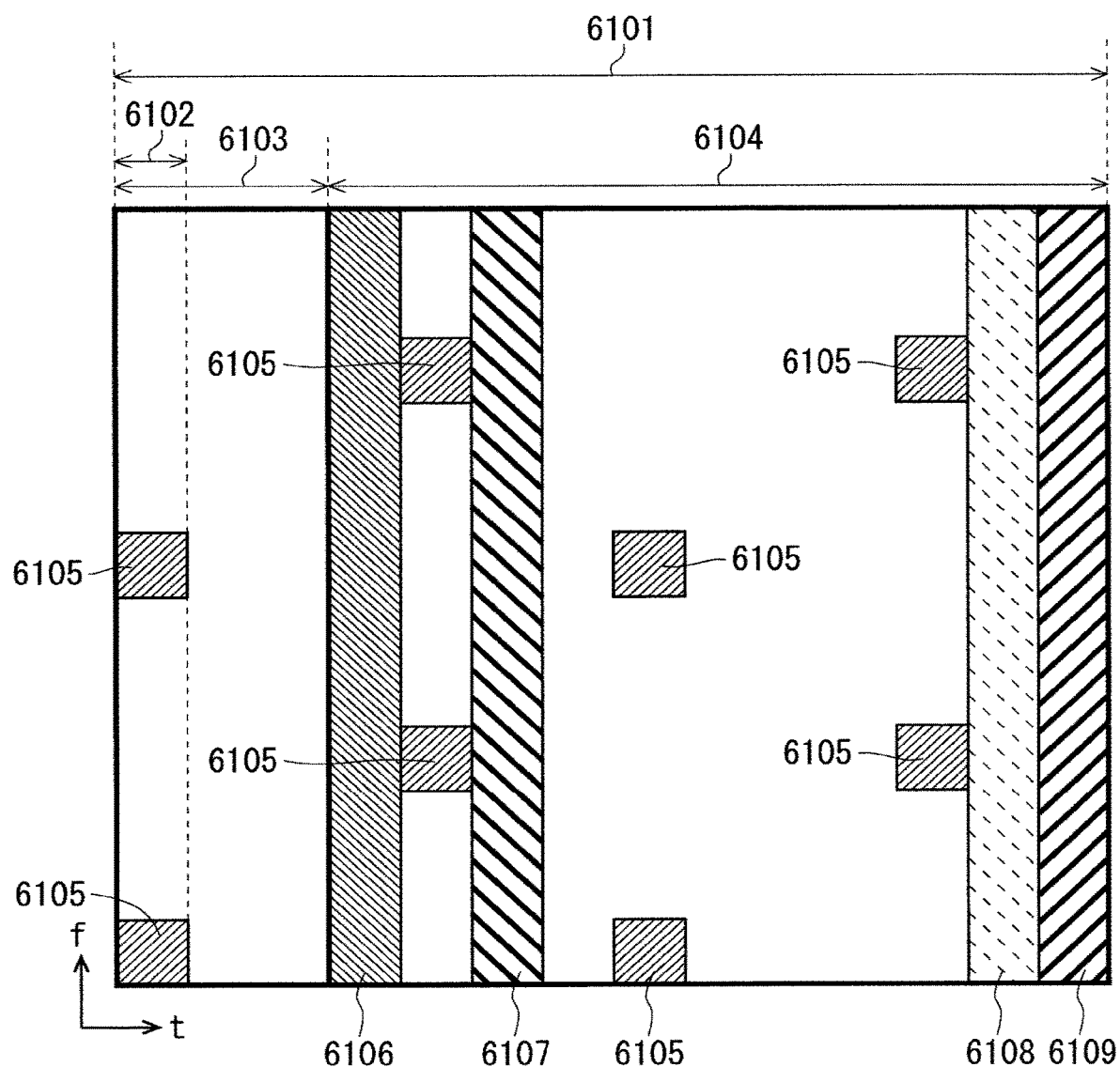
FIG. 35 illustrates another example configuration of a subframe when cal-RSs are mapped to a physical downlink shared channel region.

FIG. 35 illustrates another example configuration of a subframe when cal-RSs are mapped to a physical downlink shared channel region. The horizontal axis represents a time t, and the vertical axis represents a frequency f in FIG. 35. FIG. 35 illustrates an example in the LTE. In FIG. 35, a reference "6101" denotes a subframe, and a reference "6102" denotes symbol timing. In one subframe, the first 3 symbols form a PDCCH region 6103, and the subsequent 11 symbols form a PDSCH region 6104.

CRSs 6105 are mapped over the PDCCH region 6103 and the PDSCH region 6104. A PDCCH and a PCFICH, etc. are mapped to the PDCCH region 6103.

FIG. 35 illustrates an example of mapping cal-RSs to the PDSCH region 6104 without mapping a PDSCH. A cal-RS 6106 of the first antenna element #1, a cal-RS 6107 of the second antenna element #2, a cal-RS 6108 of the third antenna element #3, and a cal-RS 6109 of the fourth antenna element #4 are mapped to the PDSCH region 6104 without mapping any PDSCH. FIG. 35 illustrates an example in which the base station maps the cal-RSs over the entire frequency domain with the symbol timing to map the cal-RSs 6106 to 6109.

Such mapping of the cal-RSs 6106 to 6109 to the PDSCH region 6104 enables mapping of the cal-RSs 6106 to 6109, the PDCCH, and the CRSs 6105 within the same subframe. The base station can transmit the cal-RSs 6106 to 6109, the PDCCH, and the CRSs 6105 on the same subframe. Since the control channel and the signals used in demodulation and measurement are transmitted, the base station can execute calibration during communication with the UE.

Furthermore, the base station does not schedule the UE using the PDCCH. Accordingly, the UE does not need to receive the PDSCH, and occurrence of a malfunction in the UE can be reduced.

Another example will be disclosed. Instead of the physical downlink shared channel, a multimedia broadcast multicast service single frequency network (MBSFN) region is used. Furthermore, although a PMCH and a PDSCH are mapped to the MBSFN region, both the PMCH and the PDSCH may replace the PDSCHs described above.

Accordingly, the RSs for calibration can be orthogonal to the other CHs and the other RSs in a frequency domain and a time domain. Thus, the RSs for calibration, the other CHs, and the other RSs can be arranged in the same subframe, and calibration can be performed during communication.

Figure 36:
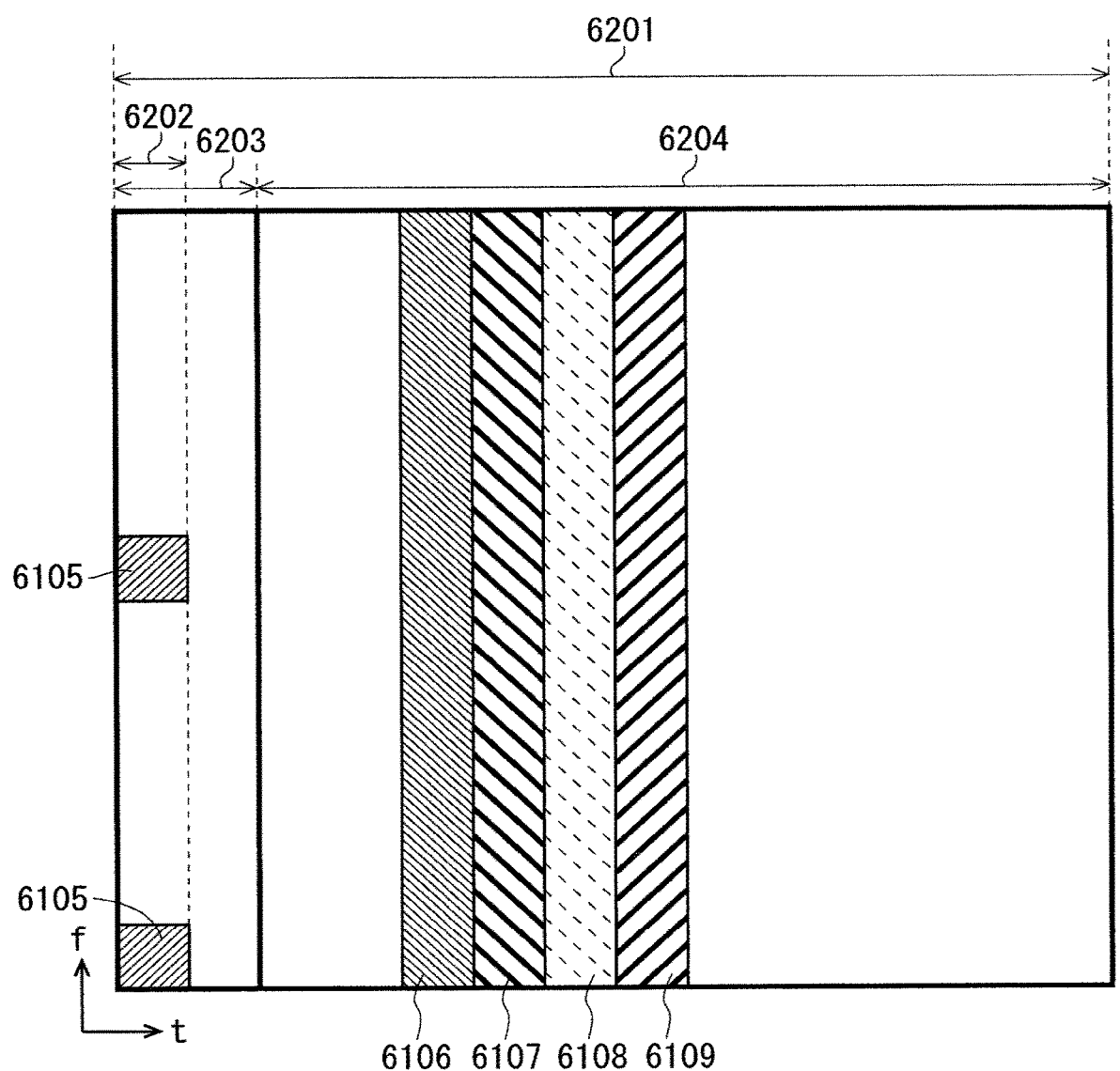
FIG. 36 illustrates an example configuration of a subframe when cal-RSs are mapped to an MBSFN region.

FIG. 36 illustrates an example configuration of a subframe when cal-RSs are mapped to an MBSFN region. The horizontal axis represents a time t, and the vertical axis represents a frequency f in FIG. 36. FIG. 36 illustrates an example in the LTE. In FIG. 36, a reference "6201" denotes the MBSFN subframe, and a reference "6202" denotes symbol timing. In one subframe, the first 2 symbols form a non-MB SFN region 6203, and the subsequent 12 symbols form an MBSFN region 6204.

The CRSs 6105 are mapped to the non-MBSFN region 6203. A PDCCH and a PCFICH, etc. are mapped to the non-MBSFN region 6203. A PMCH and a PDSCH can be mapped to the MBSFN region 6204.

FIG. 36 illustrates an example of mapping cal-RSs to the MBSFN region 6204 without mapping any PMCH. The cal-RS 6106 of the first antenna element #1, the cal-RS 6107 of the second antenna element #2, the cal-RS 6108 of the third antenna element #3, and the cal-RS 6109 of the fourth antenna element #4 are mapped to the MBSFN region 6204 without mapping any PMCH and any PDSCH. FIG. 36 illustrates an example in which the base station maps the cal-RSs over the entire frequency domain with the symbol timing to map the cal-RSs 6106 to 6109.

Such mapping of the cal-RSs 6106 to 6109 to the MBSFN region 6204 enables mapping of the cal-RSs 6106 to 6109, the PDCCH, and the CRSs 6105 within the same subframe. The base station can transmit the cal-RSs 6106 to 6109, the PDCCH, and the CRSs 6105 on the same subframe. Since the control channel and the signals used in demodulation and measurement are transmitted, the base station can execute calibration during communication with the UE.

Furthermore, the base station does not schedule the UE using the PDCCH. Accordingly, the UE does not need to receive the PDSCH, and occurrence of a malfunction in the UE can be reduced.

When the PMCH is not transmitted in the MBSFN region 6204, the base station does not transmit an RS for MBSFN. Thus, when neither the PMCH nor the PDSCH is mapped to the MBSFN region 6204, nothing is mapped to the MBSFN region 6204. Accordingly, resources can be allocated to calibration more than those when the PDSCH region is used.

Furthermore, the MBSFN subframe is not configured in a subframe to which a synchronization signal, a physical broadcast channel, or a paging channel is mapped. Thus, configuring an MBSFN subframe and mapping cal-RSs to the MBSFN subframe enables the base station to eliminate a process of mapping cal-RSs to a symbol or a subframe except for symbols to which the synchronization signal and the physical broadcast channel are mapped and subframes to which a paging channel is mapped, if such a process exists. Accordingly, the processes performed by the base station can be simplified.

Another example will be disclosed. An almost blank subframe (ABS) is used. The ABS is a subframe to which the other CHs and RSs than the CRSs are not mapped. Mapping the RSs for calibration to a resource to which the CRSs of the ABS are not mapped enables orthogonalization of the RSs for calibration with the other RSs (CRSs) in a frequency domain and a time domain. Thus, the RSs for calibration and the other RSs can be arranged in the same subframe, and calibration can be performed during communication.

Figure 37:
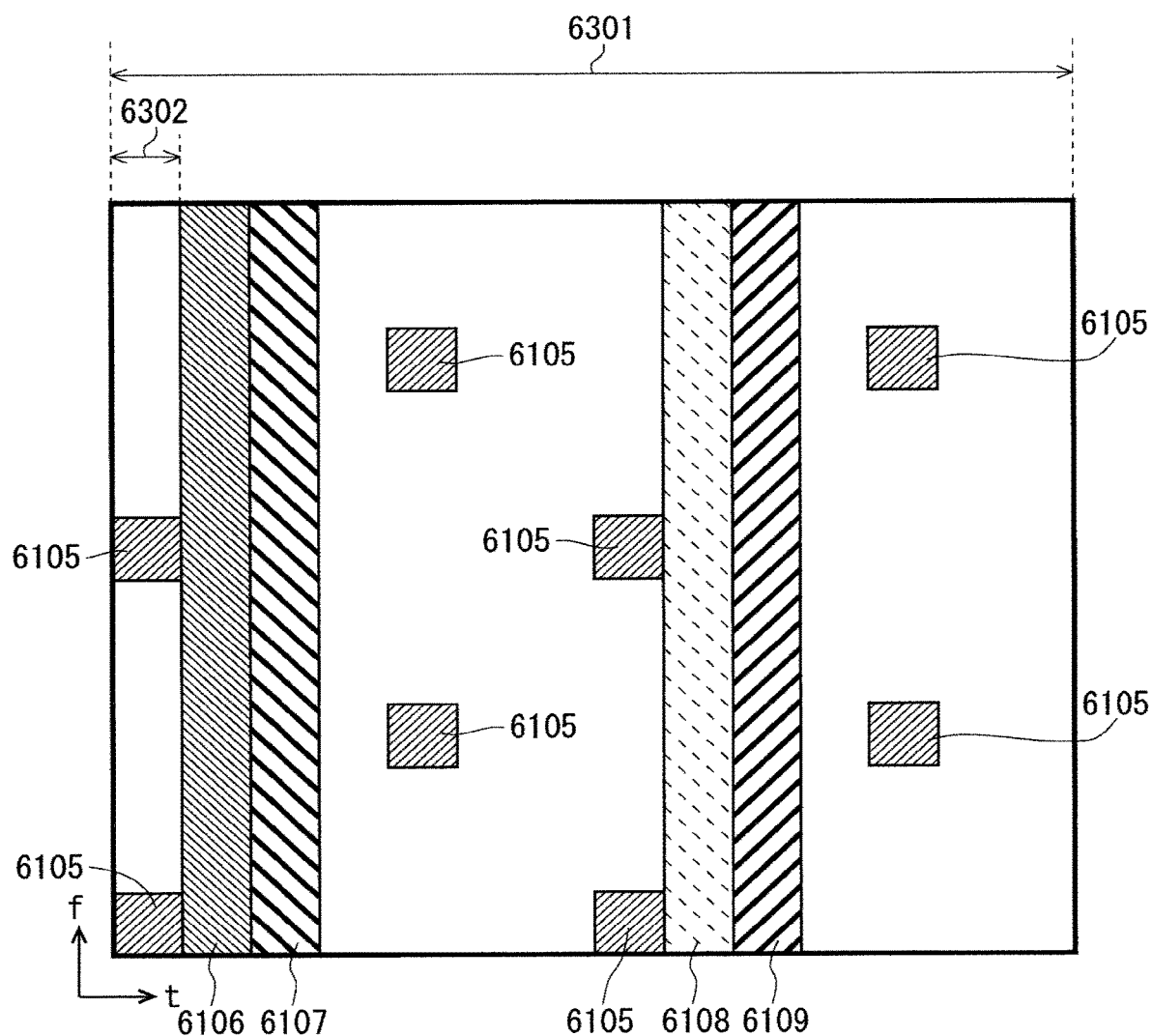
FIG. 37 illustrates an example configuration of a subframe when cal-RSs are mapped to an ABS region.

FIG. 37 illustrates an example configuration of a subframe when cal-RSs are mapped to an ABS region. The horizontal axis represents a time t, and the vertical axis represents a frequency f in FIG. 37. FIG. 37 illustrates an example in the LTE. In FIG. 37, a reference "6301" denotes the ABS region, and a reference "6302" denotes symbol timing.

The CRSs 6105 are mapped to the ABS region 6301. The cal-RS 6106 of the first antenna element #1, the cal-RS 6107 of the second antenna element #2, the cal-RS 6108 of the third antenna element #3, and the cal-RS 6109 of the fourth antenna element #4 are mapped to a resource where the CRSs 6105 are not mapped in the ABS region 6301. FIG. 37 illustrates an example in which the base station maps the cal-RSs over the entire frequency domain with the symbol timing to map the cal-RSs 6106 to 6109.

Such mapping of the cal-RSs 6106 to 6109 to the ABS region 6301 enables mapping of the cal-RSs 6106 to 6109 and the CRSs 6105 within the same subframe. The base station can transmit the cal-RSs 6106 to 6109 and the CRSs 6105 on the same subframe. Since the signals used in demodulation and measurement are transmitted, the base station can execute calibration during communication with the UE.

Furthermore, any PDCCH is not transmitted in the ABS region 6301. If the ABS has been configured, the UE that is notified of the configuration of the ABS from the base station does not have to receive the ABS. The UE does not need to receive the ABS, and occurrence of a malfunction in the UE can be reduced.

Furthermore, neither a PDCCH nor a PCFICH is transmitted in the ABS region 6301. Since the PDCCH region can also be used as a resource for calibration, resources can be allocated to calibration more than those when the PDSCH region is used.

Furthermore, the ABS is not configured in a subframe to which a synchronization signal, a physical broadcast channel, or a paging channel is mapped. Thus, configuring an ABS and mapping cal-RSs to the ABS enables the base station to eliminate a process of mapping cal-RSs to a symbol or a subframe except for symbols to which the synchronization signal and the physical broadcast channel are mapped and subframes to which a paging channel is mapped, if such a process exists. Accordingly, the processes performed by the base station can be simplified.

Furthermore, the UE that performs calibration may not be notified of, particularly, information on cal-RSs from the base station, with the method disclosed in the fifth embodiment. The UE may follow the scheduling by the PDCCH, the setting of the MBSFN subframe, and the setting of the ABS as conventionally performed. Thus, the UE neither needs to recognize the calibration nor needs any special processes on the calibration. Accordingly, the processes performed by the UE can be simplified.

The base station may specify information on the cal-RSs to the UE. The base station may notify the UE of the information on the cal-RSs. Examples of the information on the cal-RSs include a radio frame, a subframe, a resource, and a sequence to which the cal-RSs are mapped. Examples of the resource include a resource block, a resource element, and a resource unit, etc.

Examples of the notification method includes notification by the RRC signaling, the MAC signaling, and the PDCCH. For example, when cal-RSs are mapped to a PDSCH region, the base station notifies the UE of information on the cal-RSs. Accordingly, the UE can recognize a subframe, a resource, and a sequence to be calibrated. For example, the UE can determine the absence of a PDSCH in a resource to which the cal-RSs are mapped, among the received subframes.

Thus, the UE can perform a process of, for example, not receiving the resource or discarding a result of demodulation on the resource. Accordingly, the UE can accurately receive the resource of the PDSCH.

The same holds true when the MBSFN subframe is used. The base station may notify the UE of information on the MBSFN subframe to which the cal-RSs are mapped. The configuration of the MBSFN subframe may be notified including the information on the MBSFN subframe to which the cal-RSs are mapped. For example, the UE can determine the absence of a PMCH or a PDSCH in a resource to which the cal-RSs are mapped, among the MBSFN subframes.

Thus, the UE can perform a process of, for example, not receiving the resource or discarding a result of demodulation on the resource. Accordingly, the UE can accurately receive the resource of the PMCH or the PDSCH.

The same holds true when the ABS is used. The base station may notify the UE of information on the ABS to which the cal-RSs are mapped. The configuration of the ABS may be notified including the information on the ABS to which the cal-RSs are mapped. Accordingly, the UE can recognize a subframe to be calibrated.

Thus, even if the UE can receive RSs for calibration, it can recognize that the signals are for calibration. Thus, the UE can perform a process of, for example, not receiving the resource or discarding a result of demodulation on the resource. Accordingly, it is possible to prevent the UE from wrongly receiving the ABS.

Furthermore, the base station may notify the adjacent base stations of information on the cal-RSs, information on the MBSFN subframe to which the cal-RSs are mapped, and information on the ABS to which the cal-RSs are mapped. This notice may be notified by the X2 signaling.

Normally, the adjacent base stations do not recognize transmission of the cal-RSs on a normal subframe, the MBSFN subframe, and the ABS. In the case where the cal-RSs have to be transmitted with high power for calibration, the signals may interfere the adjacent base stations.

Thus, notifying, from the base station, the adjacent base stations of the information on the cal-RSs, the information on the MBSFN subframe to which the cal-RSs are mapped, and the information on the ABS to which the cal-RSs are mapped enables the adjacent base stations to recognize the existence of the cal-RSs and the resources on the time axis or the frequency axis. Consequently, for example, the adjacent base stations can avoid data scheduling of the UEs being served thereby, based on the assumption of the interference from the base station.

Furthermore, the base station may notify the core network side node of information on the cal-RSs, information on the MBSFN subframe to which the cal-RSs are mapped, and information on the ABS to which the cal-RSs are mapped.

During the calibration in the base station, the core network side node may notify the information on the cal-RSs, the information on the MBSFN subframe to which the cal-RSs are mapped, and the information on the ABS to which the cal-RSs are mapped all of which are obtained from the base station, to a base station that requires some special operations.

These notices may be notified by the S1 signaling. Accordingly, the same advantages as those in the previous embodiments can be produced even when the base station notifies the core network side node of the information on the cal-RSs, the information on the MBSFN subframe to which the cal-RSs are mapped, and the information on the ABS to which the cal-RSs are mapped.

Seventh Embodiment

The second, third, and sixth embodiments disclose calibrating every antenna element using RSs for calibration. According to these embodiments, as the number of the antenna elements increases, the cal-RSs also increases. Thus, when all the antenna elements are calibrated, the time to adjust the phase and the amplitude of each of the antenna elements increases. Furthermore, as the cal-RSs increases, the overhead increases. Accordingly, a physical region for downlink available for actual communication decreases, and thus a problem with incapability to guarantee the communication performance that is originally expected occurs. The seventh embodiment will disclose a method for solving such problems.

The antenna elements included in a multi-element antenna of the base station are grouped. Examples of the method for grouping the antenna elements include a grouping method relying on adjustment results obtained through calibration executed to form beams by the multi-element antenna before shipment, before setting, and during operations, and a grouping method based on a structure of the multi-element antenna.

When the antenna elements are grouped according to the adjustment results obtained through calibration, data of amplitude adjustment values and phase adjustment values obtained as the adjustment results are stored as calibration values obtained from the calibration in the past, and the antenna elements having the adjustment values within a predetermined range are grouped. Examples of the predetermined range include a range of ±1 bit of adjustment results obtained from a digital phase shifter used in adjusting the phase. Thus, the antenna elements whose adjustment results from the digital phase shifter fall within the range of ±1 bit are handled as the same group.

In addition to this, in a multi-element antenna for transmission, transmission signals output from the respective antenna elements can be grouped according to signal levels received by a reference reception system. Furthermore, in a multi-element antenna for reception, grouping according to signal levels obtained by receiving, through the respective antenna elements, a transmission signal output from a reference transmission system is possible.

Here, the reference reception system and the reference transmission system are included in an arbitrary antenna element in the multi-element antenna. The arbitrary antenna element is, for example, an antenna element located in the center of all the antenna elements, an antenna element each located at the four corners of a set of all the antenna elements, one antenna element in horizontal and vertical arrays of antenna elements, or an antenna element located in the center of antenna elements formed per sub-array antenna.

Examples of the method for grouping the antenna elements based on a structure of the multi-element antenna include grouping every antenna elements at an equal distance from a reference antenna element, grouping every antenna elements collocated in the horizontal or vertical direction, grouping antenna elements according to the power distribution in a tapered sub-array antenna, and grouping antenna elements every vertically polarized waves and every horizontally polarized waves when a polarized wave antenna is configured.

With application of the grouping method according to a distance from a reference antenna element, a permissible accuracy can be relaxed in adjustment performed every antenna group. The tapered sub-array antenna is configured with weighting of the power distribution within the multi-element antenna, in order to reduce the side lobe level in an antenna radiation pattern. Thus, main antenna elements that determine the beam shape, are positioned in the center, and have larger output in transmission are grouped, and only these main antenna elements are calibrated. Accordingly, the time to adjust the phase and the amplitude of each of the antenna elements can be shortened.

Since in the configuration of the polarized wave antenna, the radio waves in the vertically polarized waves and in the horizontally polarized waves are orthogonal to one another in their relationship, signals simultaneously transmitted and received are less subject to mutual interference. Thus, grouping antenna elements for every polarized waves enables simultaneous calibration of a vertical antenna and a horizontal antenna.

A method for calibrating an antenna element group obtained by such grouping will be hereinafter described.

When a multi-element antenna for transmission is calibrated, any one of the antenna elements in each antenna group transmits cal-RSs, and a result of the calibration obtained by receiving the signals through a reference reception system is reflected on all the antenna elements in the same group.

When a multi-element antenna for reception is calibrated, any one of the antenna elements in the group receives cal-RSs output from a reference transmission system. Then, a result of the calibration obtained through the reception is reflected on all the antenna elements in the same group.

Figure 38:
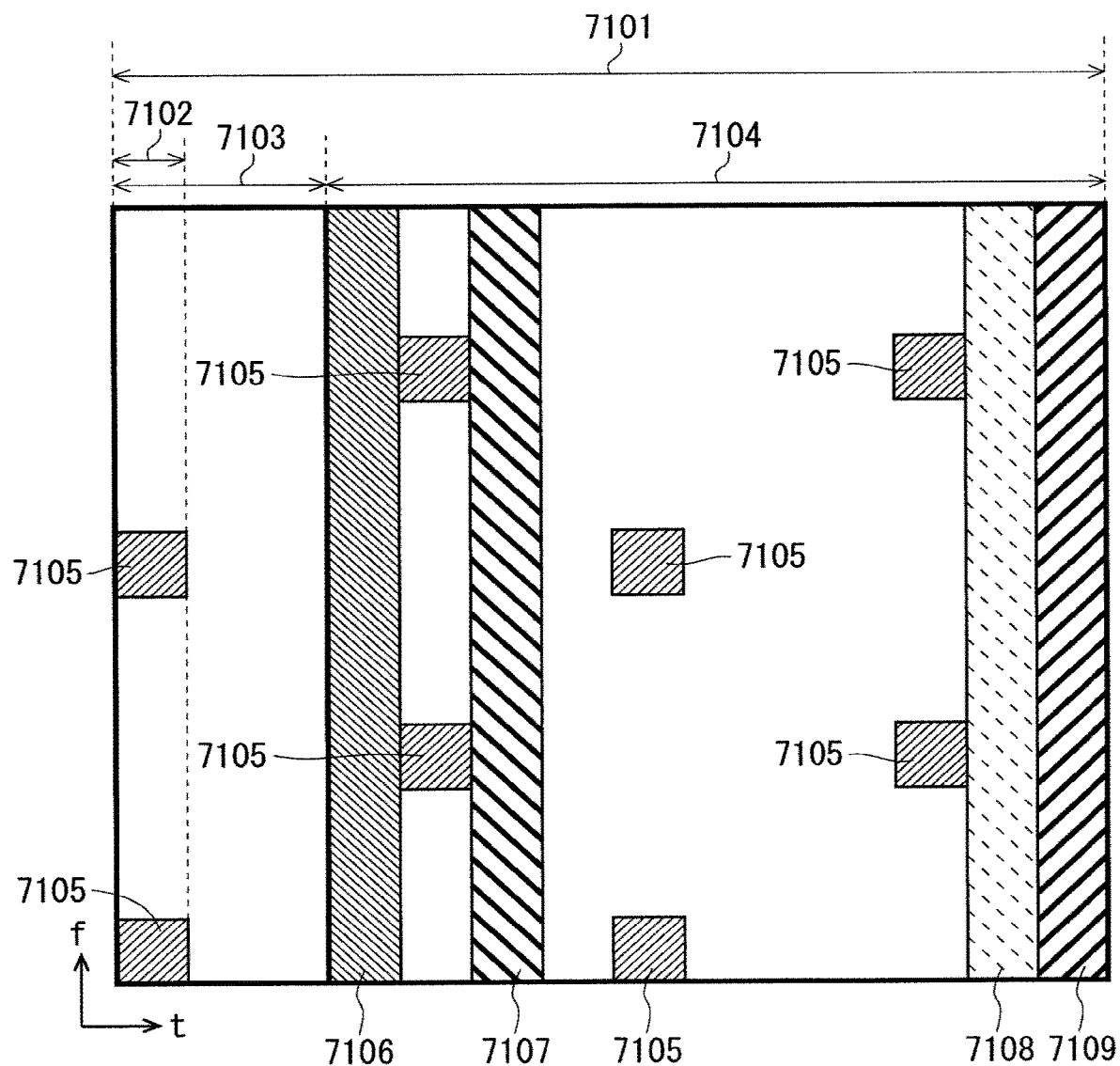
FIG. 38 illustrates an example configuration of a subframe when cal-RSs of each antenna group are mapped to a physical downlink shared channel region according to a seventh embodiment.

FIG. 38 illustrates an example configuration of a subframe when cal-RSs of each antenna group are mapped to a physical downlink shared channel region according to the seventh embodiment. The horizontal axis represents a time t, and the vertical axis represents a frequency fin FIG. 38.

In FIG. 38, a reference "7101" denotes a subframe, a reference "7102" denotes symbol timing, and a reference "7105" denotes a CRS. In one subframe, the first 3 symbols form a PDCCH region 7103, and the subsequent 11 symbols form a PDSCH region 7104.

In contrast to the example disclosed in the sixth embodiment of mapping the cal-RSs to a physical downlink shared channel region in the LTE, FIG. 38 illustrates an example of arranging cal-RSs for each antenna group. Since the configuration of the physical downlink channel except for the cal-RSs is the same as that in FIG. 35, the description thereof will be omitted.

FIG. 38 illustrates an example of mapping the cal-RSs for each antenna group, without mapping a PDSCH. A cal-RS 7106 of a first antenna group #1, a cal-RS 7107 of a second antenna group #2, a cal-RS 7108 of a third antenna group #3, and a cal-RS 7109 of a fourth antenna group #4 are mapped to the PDSCH region 7104 without mapping a PDSCH.

FIG. 38 illustrates an example in which the base station maps the cal-RSs over the entire frequency domain with the symbol timing to map the cal-RSs 7106 to 7109 for each antenna group.

Since the antenna elements are grouped and the cal-RSs are set for each antenna group as described above, the number of the cal-RSs can be reduced more than that when the cal-RSs are used for each of the antenna elements. Accordingly, the time to adjust the phase and the amplitude of each of the antenna elements can be shortened. Furthermore, reduction in the number of the cal-RSs can prevent degradation in the communication performance caused by overhead.

Furthermore, using both the grouping method relying on adjustment results obtained through calibration and the grouping method based on the structure of the multi-element antenna can, for example, relax the accuracy in adjusting the phase and the amplitude of each of the antenna elements and simplify such adjustment. Accordingly, the time required for calibration can be shortened.

According to the seventh embodiment, the PHY processing unit that is a calibration unit divides a plurality of antenna elements into groups, and sets the cal-RSs for each of the groups. Accordingly, increase in the cal-RSs can be suppressed. Thus, increase in the time required for calibration can be suppressed. Furthermore, it is possible to prevent decrease in the physical region for downlink available for actual communication and guarantee the communication performance.

Eighth Embodiment

The eighth embodiment will disclose an example of partially thinning out the cal-RSs mapped over the entire frequency domain with the symbol timing and arranging the cal-RSs, in each of the antenna elements included in the multi-element antenna according to the second, third, and sixth embodiments.

Figure 39:
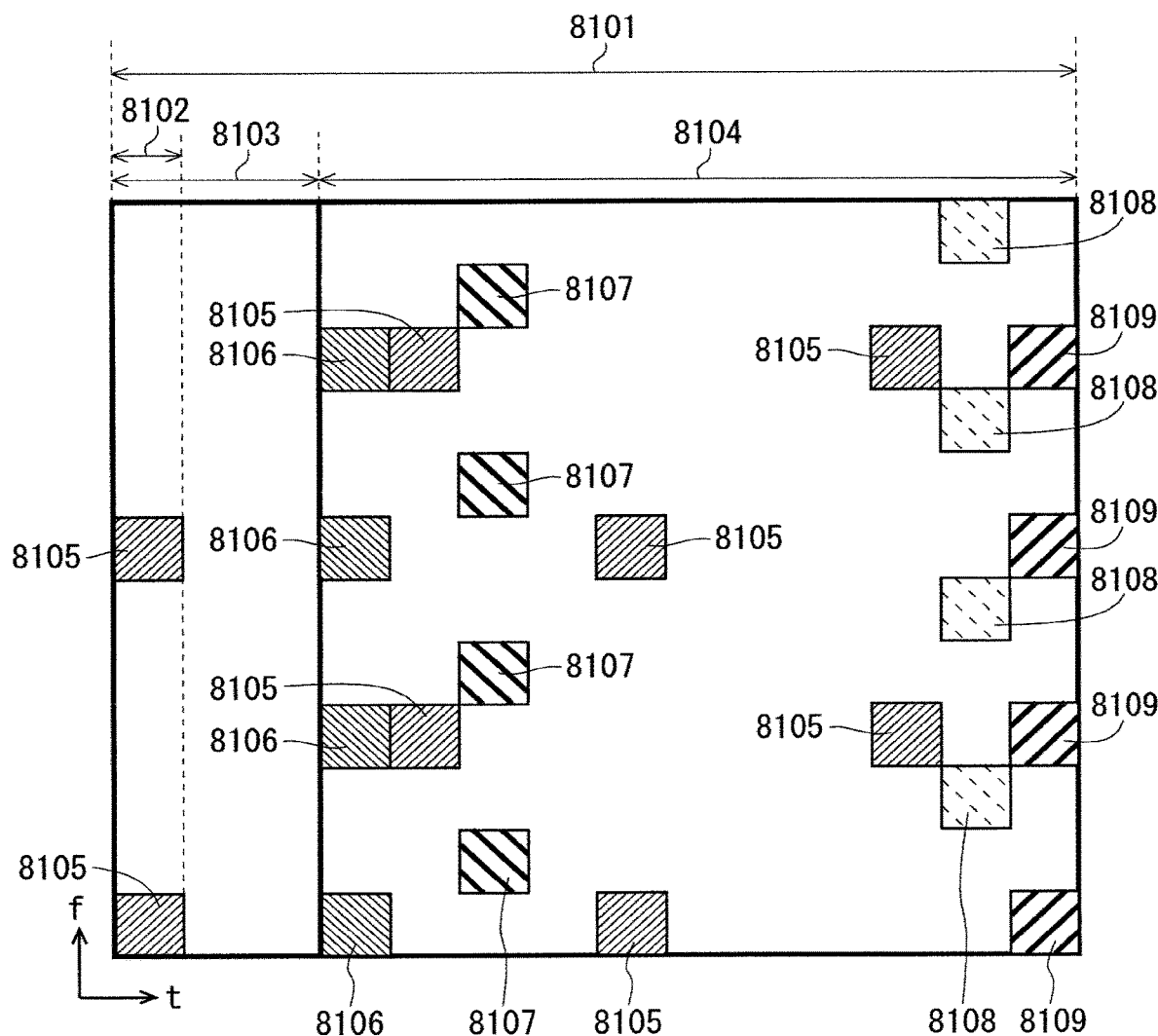
FIG. 39 illustrates an example configuration of a subframe when cal-RSs are mapped to a part of the frequency axis in a physical downlink shared channel region according to an eighth embodiment.

FIG. 39 illustrates an example configuration of a subframe when cal-RSs are mapped to a part of the frequency axis in a physical downlink shared channel region according to the eighth embodiment. The horizontal axis represents a time t, and the vertical axis represents a frequency f in FIG. 39.

In FIG. 39, a reference "8101" denotes a subframe, a reference "8102" denotes symbol timing, and a reference "8105" denotes a CRS. In one subframe, the first 3 symbols form a PDCCH region 8103, and the subsequent 11 symbols form a PDSCH region 8104.

FIG. 39 illustrates an example of thinning out and arranging the cal-RSs on the frequency axis, in contrast to the example disclosed in the sixth embodiment of mapping the cal-RSs to a physical downlink shared channel region in the LTE over the entire frequency domain. Since the configuration of the physical downlink channel except for the cal-RSs is the same as that in FIG. 35, the description thereof will be omitted.

FIG. 39 illustrates an example of periodically thinning out the cal-RSs of the antenna elements on the frequency axis and mapping the cal-RSs to the PDSCH region 8104 without mapping a PDSCH. Cal-RSs 8106 of the first antenna element #1, cal-RSs 8107 of the second antenna element #2, cal-RSs 8108 of the third antenna element #3, and cal-RSs 8109 of the fourth antenna element #4 are periodically thinned out and mapped to the PDSCH region 8104 with the symbol timing on the frequency axis, without mapping a PDSCH.

The cal-RSs for each antenna element may be arranged at fixed frequencies according to the frequency characteristics of each of the antenna elements, instead of the method for periodically thinning out and arranging the cal-RSs on the frequency axis.

Accordingly, thinning out the cal-RSs of each of the antenna elements on the frequency axis reduces the number of the cal-RSs arranged in a physical downlink shared channel region. Thus, another channel can be arranged, and degradation in the communication performance caused by overhead can be prevented.

Figure 40:
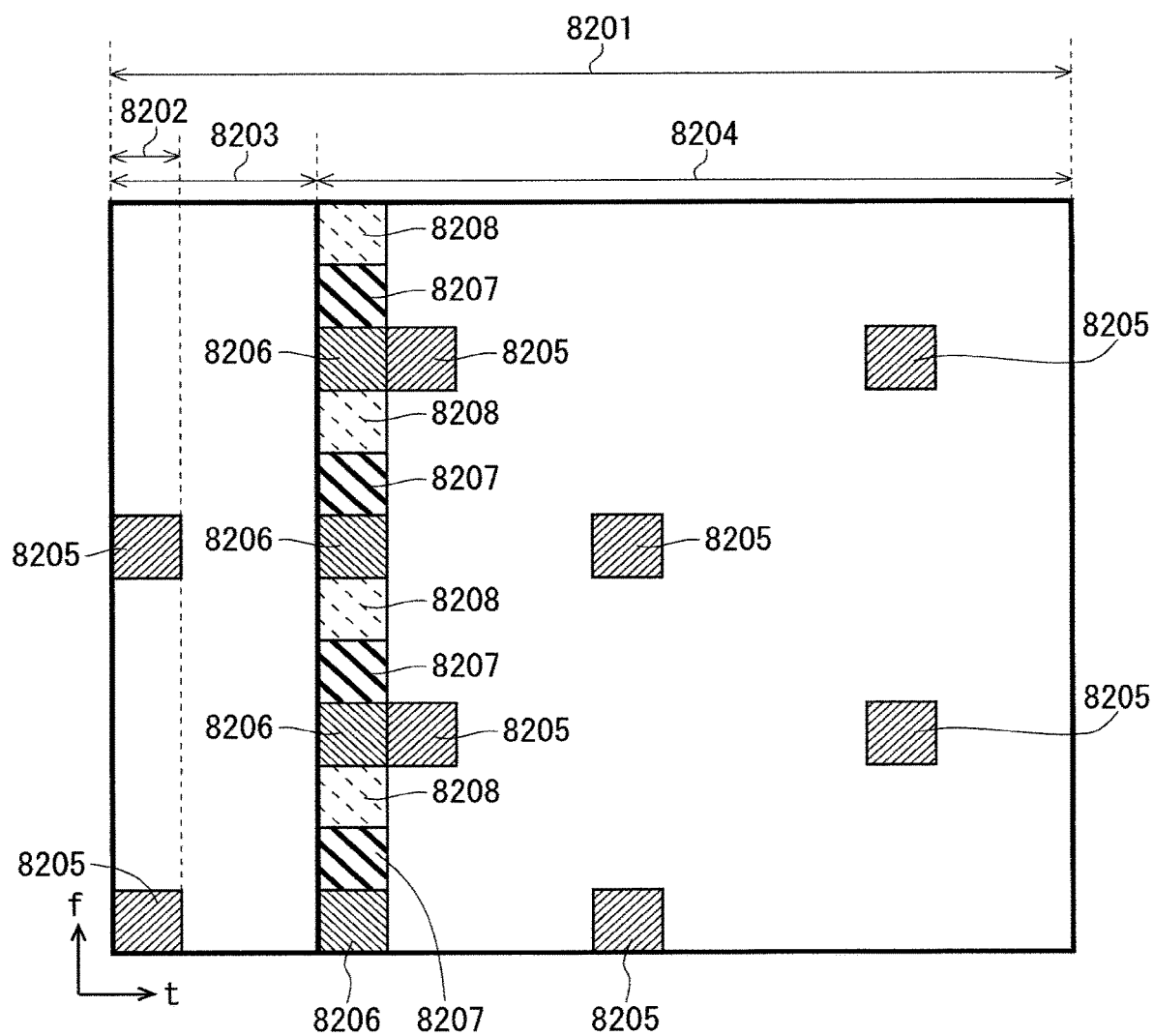
FIG. 40 illustrates another example configuration of a subframe when cal-RSs are mapped to a part of the frequency axis in a physical downlink shared channel region according to the eighth embodiment.

FIG. 40 illustrates another example configuration of a subframe when cal-RSs are mapped to a part of the frequency axis in a physical downlink shared channel region according to the eighth embodiment. FIG. 40 illustrates arranging cal-RSs of a plurality of antenna elements within the same symbol timing when the cal-RSs of each of the antenna elements are periodically thinned out and arranged on the frequency axis.

The horizontal axis represents a time t, and the vertical axis represents a frequency f in FIG. 40. In FIG. 40, a reference "8201" denotes a subframe, a reference "8202" denotes symbol timing, and a reference "8205" denotes a CRS. In one subframe, the first 3 symbols form a PDCCH region 8203, and the subsequent 11 symbols form a PDSCH region 8204.

In FIG. 40, cal-RSs 8206 of the first antenna element #1, cal-RSs 8207 of the second antenna element #2, and cal-RSs 8208 of the third antenna element #3 are periodically arranged within the same symbol timing in the PDSCH region 8204 on the frequency axis, without mapping a PDSCH to the PDSCH region 8204.

Accordingly, arranging the cal-RSs of a plurality of antenna elements within the same symbol timing can process the cal-RSs per symbol timing, and reserve a substantial channel region. Accordingly, the processing load can be reduced, and the communication performance can be improved.

Furthermore, with the combination of the seventh and eighth embodiments, it is possible to group antenna elements having the same frequency characteristics, and execute calibration using cal-RSs for each of the antenna element groups each of which is obtained by thinning out the cal-RSs of any one of the antenna elements and arranging the the cal-RSs on the frequency axis.

Figure 41:
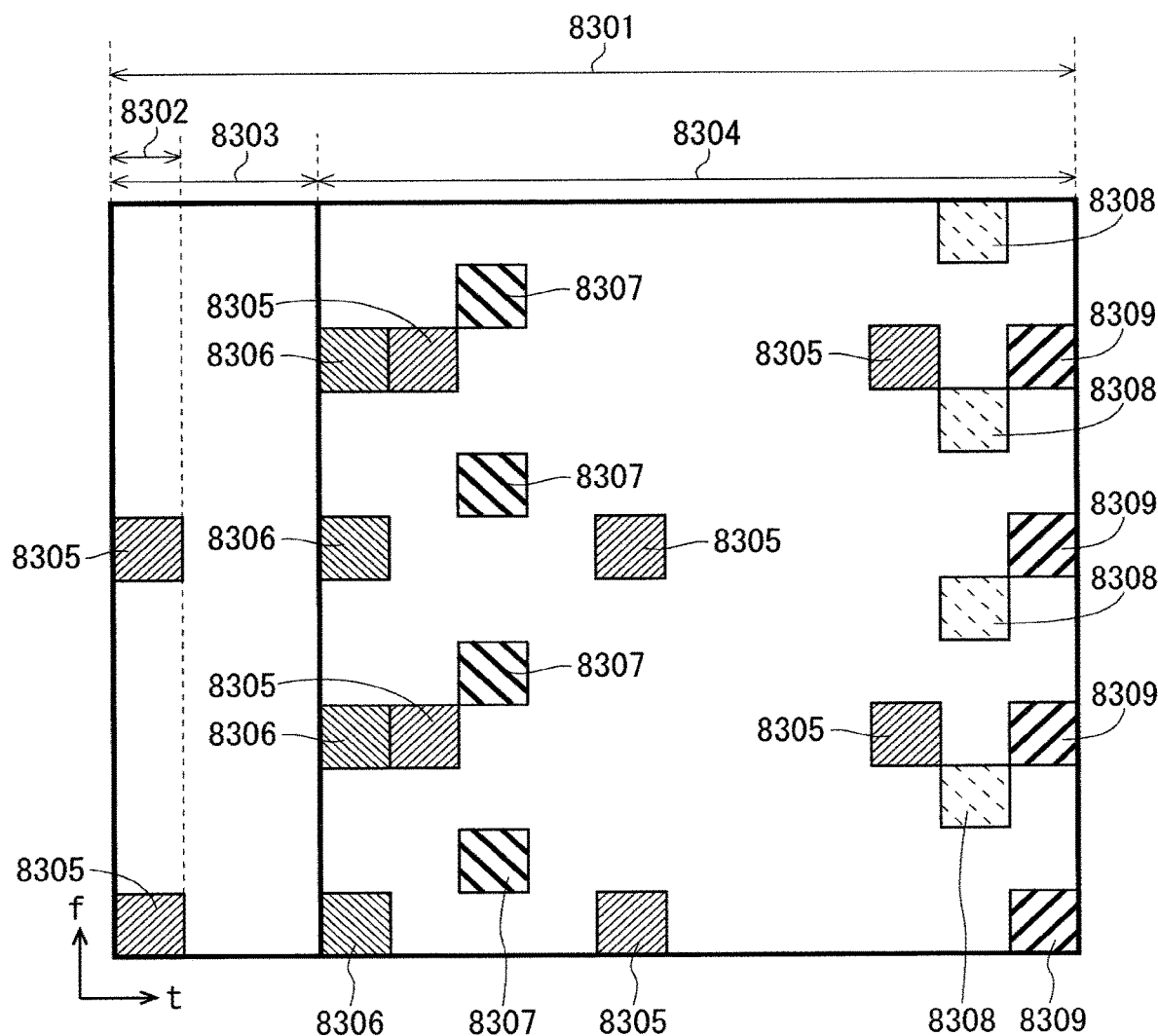
FIG. 41 illustrates an example configuration of a subframe when cal-RSs for each antenna group are mapped to a part of the frequency axis in a physical downlink shared channel region according to the eighth embodiment.

FIG. 41 illustrates an example configuration of a subframe when cal-RSs for each antenna group are mapped to a part of the frequency axis in a physical downlink shared channel region according to the eighth embodiment. The horizontal axis represents a time t, and the vertical axis represents a frequency f in FIG. 41. In FIG. 41, a reference "8301" denotes a subframe, a reference "8302" denotes symbol timing, and a reference "8305" denotes a CRS. In one subframe, the first 3 symbols form a PDCCH region 8303, and the subsequent 11 symbols form a PDSCH region 8304.

FIG. 41 illustrates an example of arranging the cal-RSs thinned out on the frequency axis for each antenna group, in a physical downlink shared channel region in the LTE.

In FIG. 41, cal-RSs 8306 of the first antenna group #1, cal-RSs 8307 of the second antenna group #2, cal-RSs 8308 of the third antenna group #3, and cal-RSs 8309 of the fourth antenna group #4 are thinned out and arranged in the PDSCH region 8304 on the frequency axis, without mapping a PDSCH.

With such a configuration, the number of the cal-RSs arranged in a physical downlink shared channel region is reduced. Accordingly, the time required for calibration can be shortened, and degradation in the communication performance caused by overhead can be prevented.

Furthermore, making null the regions other than the cal-RSs thinned out and arranged on the frequency axis can increase the transmission power and improve the SNR. Accordingly, the communication performance can be improved.

As described above, the PHY processing unit that is a calibration unit arranges the cal-RSs in a part of the entire frequency domain of a subframe, according to the eighth embodiment. In other words, the PHY processing unit partially thins out and arranges cal-RSs mapped over the entire frequency domain. Accordingly, the time required for calibration can be reduced. Furthermore, degradation in the communication performance caused by overhead can be prevented.

Although the previous embodiments describe a case where the unit of resource to be set for calibration is a subframe, not limited to the subframe but the unit of transmission time in a system may be the unit of resource. The unit of resource may be, for example, a TTI, a slot, or a symbol. Furthermore, the unit of resource may be an integer multiple of the unit of transmission time.

Although the previous embodiments describe a case where the unit of resource for cal-RSs is a symbol, not limited to the symbol but the basic time unit in a system may be the unit of resource. Furthermore, the unit of resource may be an integer multiple of the basic time unit. For example, the unit of resource may be the timing of fast Fourier transform (FFT) in the OFDM. For example, the unit of resource may be the basic time unit (Ts) in the LTE.

Accordingly, flexible calibration can be performed on the time axis. Thus, execution of the calibration during operation is facilitated, and accuracy in the calibration can be improved. Thus, the performance of the MIMO and the beamforming using the multi-element antenna can be further improved.

The embodiments and the modifications thereof are merely illustrations of the present invention and can be freely combined within the scope of the invention. Also, any constituent elements of the embodiments and the modifications thereof can be appropriately modified or omitted. Such free combination of the embodiments and the modifications thereof and appropriate modification or omission of any constituent elements of the embodiments and the modifications thereof enable appropriate calibration according to an operational environment, and further improvement in the performance of the MIMO and the beamforming using the multi-element antenna.

While the invention has been described in detail, the foregoing description is in all aspects illustrative and not restrictive. It is therefore understood that numerous modifications and variations can be devised without departing from the scope of the invention.

DESCRIPTION OF REFERENCES 801, 901, 901A PHY, 802, 909 first antenna element, 803, 922 second antenna element, 804 third antenna element, 805, 935 n-th antenna element, 806, 9411, 9412 control unit, 902, 902A first encoder unit, 903 first transmission data generating unit, 904 first calibration RS mapping unit, 905 first transmission power setting unit, 9061 first transmission correction processing unit, 9062 first transmission phase rotation unit, 907 first modulating unit, 908 first switching unit, 910 first demodulating unit, 911, 911A first decoder unit, 9121 first reception correction processing unit, 9122 first reception phase rotation unit, 913 first calibration RS extracting unit, 914 first response characteristics calculating unit, 915, 915A second encoder unit, 916 second transmission data generating unit, 917 second calibration RS mapping unit, 918 second transmission power setting unit, 9191 second transmission correction processing unit, 9192 second transmission phase rotation unit, 920 second modulating unit, 921 second switching unit, 923 second demodulating unit, 924, 924A second decoder unit, 9251 second reception correction processing unit, 9252 second reception phase rotation unit, 926 second calibration RS extracting unit, 927 second response characteristics calculating unit, 928, 928A n-th encoder unit, 929 n-th transmission data generating unit, 930 n-th calibration RS mapping unit, 931 n-th transmission power setting unit, 9321 n-th transmission correction processing unit, 9322 n-th transmission phase rotation unit, 933 n-th modulating unit, 934 n-th switching unit, 936 n-th demodulating unit, 937, 937A n-th decoder unit, 9381 n-th reception correction processing unit, 9382 n-th reception phase rotation unit, 939 n-th calibration RS extracting unit, 940 n-th response characteristics calculating unit.

The invention claimed is:

1. A communication system comprising
a base station device and a communication terminal device between which a signal is transmitted and received through a multi-element antenna including a plurality of antenna elements,
wherein at least one of the base station device and the communication terminal device includes:
a calibrating circuitry that performs calibration of phases and amplitudes of beams formed by the antenna elements when the signal is transmitted and received; and
a controlling circuitry that instructs, according to a predetermined trigger, the calibration circuitry to start the calibration,
wherein the predetermined trigger includes at least one of:
a difference between currently set values and correction values for the phases and the amplitudes;
an instruction from a core network;
a situation where a surrounding base station is not performing the calibration;
a temperature variation of the at least one of the base station device and the communication terminal device; and
a request from a corresponding apparatus.

2. A base station device configured to transmit and receive a signal through a multi-element antenna including a plurality of antenna elements, the base station device comprising:
a calibrating circuitry that performs calibration of phases and amplitudes of beams formed by the antenna elements when the signal is transmitted and received; and
a controlling circuitry that instructs, according to a predetermined trigger, the calibration circuitry to start the calibration,
wherein the predetermined trigger includes at least one of:
a difference between currently set values and correction values for the phases and the amplitudes;
an instruction from a core network;
a situation where a surrounding base station is not performing the calibration;
a temperature variation of the base station device; and
a request from a corresponding apparatus.

3. A communication terminal device configured to transmit and receive a signal through a multi-element antenna including a plurality of antenna elements, the communication terminal device comprising:
a calibrating circuitry that performs calibration of phases and amplitudes of beams formed by the antenna elements when the signal is transmitted and received; and
a controlling circuitry that instructs, according to a predetermined trigger, the calibration circuitry to start the calibration,
wherein the predetermined trigger includes at least one of:
a difference between currently set values and correction values for the phases and the amplitudes;
an instruction from a core network;
a situation where a surrounding base station is not performing the calibration;
a temperature variation of the communication terminal device; and
a request from a corresponding apparatus.

4. The communication system according to claim 1, wherein the predetermined trigger is a difference between currently set values and correction values for the phases and the amplitudes.

5. The communication system according to claim 1, wherein the predetermined trigger is an instruction from a core network.

6. The communication system according to claim 1, wherein the predetermined trigger is a situation where a surrounding base station is not performing the calibration.

7. The communication system according to claim 1, wherein the predetermined trigger is a temperature variation of the at least one of the base station device and the communication terminal device.

8. The communication system according to claim 1, wherein the predetermined trigger is a request from a corresponding apparatus.

* * * * *